United States Patent
Balmin et al.

(10) Patent No.: US 7,895,189 B2
(45) Date of Patent: Feb. 22, 2011

(54) INDEX EXPLOITATION

(75) Inventors: Andrey Balmin, San Jose, CA (US); Sauraj Goswami, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 234 days.

(21) Appl. No.: 11/770,607

(22) Filed: Jun. 28, 2007

(65) Prior Publication Data

US 2009/0006314 A1    Jan. 1, 2009

(51) Int. Cl.
G06F 7/00 (2006.01)
G06F 17/30 (2006.01)

(52) U.S. Cl. ............... 707/715; 707/741; 707/743; 707/746

(58) Field of Classification Search ............ 707/6, 707/715, 741, 743, 746
See application file for complete search history.

(56) References Cited

U.S. PATENT DOCUMENTS

| | | | |
|---|---|---|---|
| 5,237,678 A | 8/1993 | Kuechler et al. | |
| 6,182,029 B1 | 1/2001 | Friedman | |
| 6,260,039 B1 | 7/2001 | Schneck et al. | |
| 6,339,776 B2 | 1/2002 | Dayani-Fard et al. | |
| 6,366,926 B1 | 4/2002 | Pohlmann et al. | |
| 6,401,241 B1 | 6/2002 | Taylor | |
| 6,466,940 B1 | 10/2002 | Mills | |
| 6,538,673 B1 | 3/2003 | Maslov | |
| 6,539,371 B1 * | 3/2003 | Bleizeffer et al. | 707/2 |
| 6,549,922 B1 | 4/2003 | Srivastava et al. | |
| 6,850,933 B2 | 2/2005 | Larson et al. | |
| 6,982,708 B1 * | 1/2006 | Mah et al. | 345/418 |
| 7,107,282 B1 | 9/2006 | Yalamanchi | |
| 2002/0138353 A1 | 9/2002 | Schreiber et al. | |
| 2002/0170070 A1 | 11/2002 | Rising, III et al. | |
| 2003/0088558 A1 | 5/2003 | Zaharioudakis et al. | |
| 2003/0167352 A1 | 9/2003 | Hoshiai et al. | |
| 2003/0212664 A1 * | 11/2003 | Breining et al. | 707/3 |
| 2003/0212670 A1 * | 11/2003 | Yalamanchi et al. | 707/3 |
| 2004/0010752 A1 | 1/2004 | Chan et al. | |
| 2004/0010754 A1 | 1/2004 | Jones | |

(Continued)

FOREIGN PATENT DOCUMENTS

EP    1280053 A1    1/2003

OTHER PUBLICATIONS

Andrey Balmin, Fatma Özcan, Kevin S. Beyer, Roberta J. Cochrane and Hamid Pirahesh., "A Framework for Using Materialized XPath Views in XML Query Processing", Proceedings of the 30th VLDB Conference, Toronto, Canada, 2004, pp. 60-71.

(Continued)

*Primary Examiner*—John E Breene
*Assistant Examiner*—Mark E Hershley
(74) *Attorney, Agent, or Firm*—Janet M. Skafar; Ingrid M. Foerster; Elissa Y. Wang

(57) ABSTRACT

Various embodiments of a computer-implemented method, computer program product, and data processing system are provided that generate an index plan that produces a superset of data comprising the query result. In some embodiments, a computer-implemented method, computer program product, and data processing system produce a maximal-index-satisfiable query tree.

21 Claims, 28 Drawing Sheets

U.S. PATENT DOCUMENTS

| | | | |
|---|---|---|---|
| 2004/0068487 | A1 | 4/2004 | Barton et al. |
| 2004/0181543 | A1 | 9/2004 | Wu et al. |
| 2004/0261019 | A1 | 12/2004 | Imamura et al. |
| 2005/0022115 | A1 | 1/2005 | Baumgartner et al. |
| 2005/0060647 | A1 | 3/2005 | Doan et al. |
| 2005/0097084 | A1 | 5/2005 | Balmin et al. |
| 2006/0106758 | A1 | 5/2006 | Chen et al. |
| 2006/0218194 | A1 | 9/2006 | Yalamanchi |
| 2006/0224582 | A1* | 10/2006 | Hogue ........................... 707/6 |
| 2006/0235811 | A1 | 10/2006 | Fairweather |
| 2006/0277474 | A1 | 12/2006 | Robarts et al. |
| 2007/0005636 | A1* | 1/2007 | Rowley ...................... 707/102 |
| 2007/0038985 | A1 | 2/2007 | Meijer et al. |
| 2007/0088697 | A1* | 4/2007 | Charlebois et al. ............. 707/6 |
| 2007/0276825 | A1* | 11/2007 | Dettinger et al. ............... 707/6 |
| 2008/0040320 | A1 | 2/2008 | Dettinger et al. |
| 2008/0065590 | A1* | 3/2008 | Castro et al. .................... 707/2 |
| 2008/0114803 | A1* | 5/2008 | Chinchwadkar et al. .... 707/102 |
| 2008/0154873 | A1* | 6/2008 | Redlich et al. .................. 707/5 |
| 2008/0319942 | A1 | 12/2008 | Courdy et al. |

OTHER PUBLICATIONS

Andrey Balmin, Kevin S. Beyer, Fatma Özcan, and Matthias Nicola, "On the Path to Efficient XML Queries", VLDB '06, Sep. 12-15, 2006, Seoul, Korea, pp. 1117-1128.

K. Beyer et al, "DB2 goes hybrid: Integrating native XML and XQuery with relational data and SQL", [online] Jan. 2006 [Retrieved on Feb. 9, 2007] Retrieved from the Internet: <URL: http://www.research.ibm.com/journal/sj/452/beyer.pdf>, IBM Systems Journal, vol. 45, No. 2, 2006, pp. 271-298.

Qi Cheng, Jarek Gryz, Fred Koo, Cliff Leung, Linqi Liu, Xiaoyan Qian, Bernhard Schiefer, "Implementation of Two Semantic Query Optimization Techniques in DB2 Universal Database", [online] 1999 [Retrieved on Jan. 24, 2007] Retrieved from the Internet: <URL: http://www.cse.yorku.ca/~jarek/papers/vldb99/paper.pdf>, Proceedings of the 25th VLDB Conference, Edinburgh, Scotland, 1999, <12 pages>.

W3C, XML Path Language (XPath), Version 1.0, W3C Recommendation Nov. 16, 1999 [online] Nov. 16, 1999 [Retrieved on Jan. 20, 2007] Retrieved from the Internet: <URL: http://www.w3.org/TR/xpath> <32 pages>.

XPath—Wikipedia [online] last modified Jun. 5, 2007 [Retrieved on Jun. 22, 2007] Retrieved from the Internet: <URL: http://en.wikipedia.org/wiki/XPath> <7 pages>.

Srinivas Pandrangi, Alex Cheng, Dr. Hui Zhang, Qidong Xu and Jim Gan, "Introduction to XQuery (Part 1 of 4)" [online] Copyright 2005 Jupitermedia Corporation [Retrieved on Jan. 2, 2007] Retrieved from the Internet: <URL: http://www.devx.com/xml/Article/8046/1954?pf=true> <4 pages>.

Srinivas Pandrangi, Alex Cheng, Dr. Hui Zhang, Qidong Xu and Jim Gan, "Introduction to XQuery (Part 2 of 4)" [online] Copyright 2005 Jupitermedia Corporation [Retrieved on Jan. 2, 2007] Retrieved from the Internet: <URL: http://www.devx.com/xml/Article/8062/1954?pf=true> <5 pages>.

Srinivas Pandrangi, Alex Cheng, Dr. Hui Zhang, Qidong Xu and Jim Gan, "Introduction to XQuery (Part 3 of 4)" [online] Copyright 2005 Jupitermedia Corporation [Retrieved on Jan. 2, 2007] Retrieved from the Internet: <URL: http://www.devx.com/xml/Article/8066/1954?pf=true> <6 pages>.

Srinivas Pandrangi, Alex Cheng, Dr. Hui Zhang, Qidong Xu and Jim Gan, "Introduction to XQuery (Part 4 of 4)" [online] Copyright 2005 Jupitermedia Corporation [Retrieved on Jan. 2, 2007] Retrieved from the Internet: <URL: http://www.devx.com/xml/Article/8068/1954?pf=true> <5 pages>.

Balmin et al, "XPath Query Containment for Index and Materialized View Matching", Nov. 2002, pp. 1-12.

Miklau et al., "Containment and Equivalence for an Xpath Fragment", ACM PODS, Jun. 2002, pp. 65-76.

Cheng et al., "XML and DB2", IBM Santa Teresa Laboratory, Proc. of 16th Intern. Conference on Data Engineering, Feb. 2000, pp. 1-5.

Neven, "Automata Theory for XML Researchers", Database Principles, vol. 31, No. 3, Sep. 2002, pp. 39-46.

Braga et al., "A Tool for Extracting XML Association Rules", Proc. of the 14th IEEE Confer. on Tools with Artificial Intelligence, 2002, pp. 57-64.

Final Office Action for U.S. Appl. No. 11/770,573 dated Jan. 25, 2010 <28 pages>.

Non-Final Office Action for U.S. Appl. No. 11/770,573 dated Sep. 3, 2010 <24 pages>.

Non-Final Office Action for U.S. Appl. No. 11/770,573 of Jul. 10, 2009 <21 pages>.

Notice of Allowance for U.S. Appl. No. 10/698,622 of Aug. 23, 2007 <2 pages>.

Non-Final Office Action for U.S. Appl, No. 10/698,622 of Jul. 13, 2007 <12 pages>.

Final Office Action for U.S. Appl. No. 10/698,622 of Jan. 24, 2007 <14 pages>.

Non-Final Office Action for U.S. Appl. No.10/698,622 of May 2, 2006 <11 pages>.

* cited by examiner

290 ⟶
/restaurant/distance [self::node AND self::node]
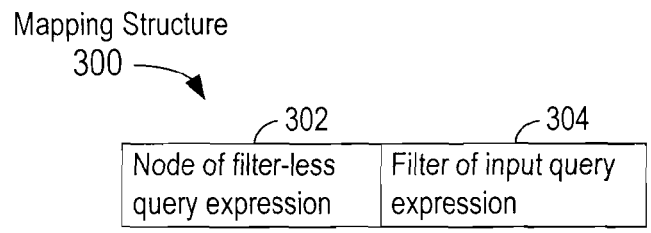
FIG. 13
Mapping Structure
300 ⟶
| Node of filter-less query expression | Filter of input query expression |
|---|---|
FIG. 14
Index-match structure
310 ⟶
| Node | Filter | List of Index(es) |
|---|---|---|
FIG. 15
320 ⟶
{ N, F, IndexList }
Index-match tuple
FIG. 16
Exemplary index-match structure
330 ⟶
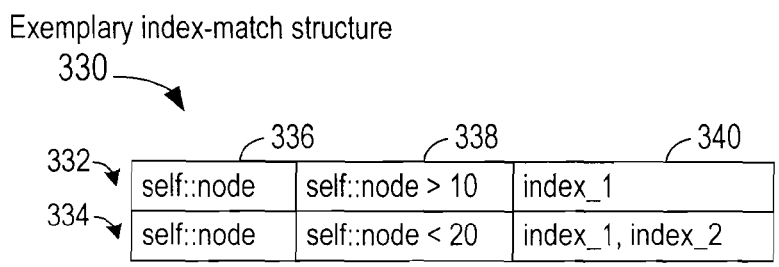
| | self::node | self::node > 10 | index_1 |
|---|---|---|---|
| | self::node | self::node < 20 | index_1, index_2 |
FIG. 17

400 ⬅

/restaurant[@rating ≥ 2 AND @rating ≤ 4]

FIG. 22A 410-1 ⬅

411-1 ➡
{ /restaurant/@rating node of first filter,
  @rating ≥ 2, ⬅ 412-1
  IndexList1, ⬅ 413-1
  Attribute, ⬅ 414-1
  PointerToAnd, ⬅ 415-1
416-1 ⬅ rating }

FIG. 22B 410-2 ⬅

411-2 ➡
{ /restaurant/@rating node of second filter,
  @rating ≤ 4, ⬅ 412-2
  IndexList2, ⬅ 413-2
  Attribute, ⬅ 414-2
  PointerToAnd, ⬅ 415-2
416-2 ⬅ rating }

[self::node/self::node/@rating ≥ 2 ] AND @rating<4

FIG. 23A 420-1 ⬅

421-1 ➡
{ self::node/self::node/@rating,
  self::node/self::node/@rating ≥ 2, ⬅ 422-1
  IndexList3, ⬅ 423-1
  ExtendedAttribute, ⬅ 424-1
  PointerToAnd, ⬅ 425-1
426-1 ⬅ rating }

FIG. 23B 420-2 ⬅

421-2 ➡
{ @rating,
  @rating < 4, ⬅ 422-2
  IndexList4, ⬅ 423-2
  Attribute, ⬅ 424-2
  PointerToAnd, ⬅ 425-2
426-2 ⬅ rating }

/restaurant/distance[self::node>10 AND self::node<20]

FIG. 24A 430-1 ⇘
                                431-1 ⇙
{ restaurant/distance/self::node,
    self::node>10, ⬅ 432-1
    IndexList5, ⬅ 433-1
    Self_Node, ⬅ 434-1
    PointerToAnd, ⬅ 435-1
436-1 ⬅ NULL }

FIG. 24B 430-2 ⇘
                                431-2 ⇙
{ restaurant/distance/self::node,
    self::node<20, ⬅ 432-2
    IndexList6, ⬅ 433-2
    Self_Node, ⬅ 434-2
    PointerToAnd, ⬅ 435-2
436-2 ⬅ NULL }

/a/b/c[./././. > 10 AND ././. <20]

FIG. 25A 440-1 ⇘

{ /a/b/c/././., ⬅ 441-1
    ./././.>10, ⬅ 442-1
    IndexList7, ⬅ 443-1
    Self_Path, ⬅ 444-1
    PointerToAnd, ⬅ 445-1
446-1 ⬅ NULL }

FIG. 25B 440-2 ⇘

{ /a/b/c/././., ⬅ 441-2
    ././.<20, ⬅ 442-2
    IndexList8, ⬅ 443-2
    Self_Path, ⬅ 444-2
    PointerToAnd, ⬅ 445-2
446-2 ⬅ NULL }

FIG. 25C

570 →
/a/b/c[@attr > 10 AND @attr < 20]
FIG. 31
Query tree
FIG. 32
Filter-less query tree
FIG. 33
610 →
| BT1 | BT2 |
list of matched between tuples
FIG. 34
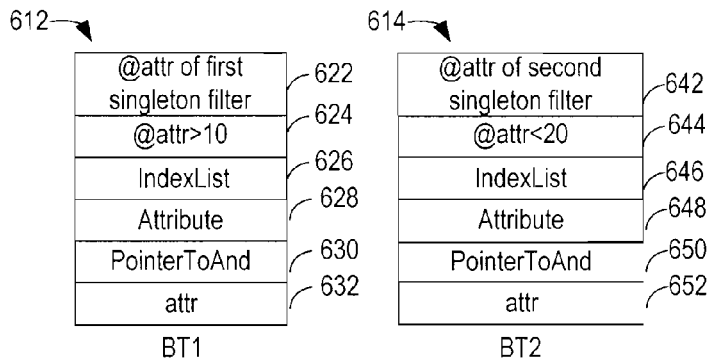
FIG. 35
552 → index_1: /a/*/c/@attr
554 → index_2: /a/b/c/@*
FIG. 36
556 →  558 →
a    a
|    |
*    b
|    |
c    c
|    |
@attr @*
Index path
FIG. 37

741

$\forall f_i \in p_i$ and $f_j \in p_j$, LCA($f_i, f_j$) is an AND node

842 ⟶
Index (I): //a//*
FIG. 49
852 ⟶
/a/b [self::node="abcd"]/c [self::node = 10]
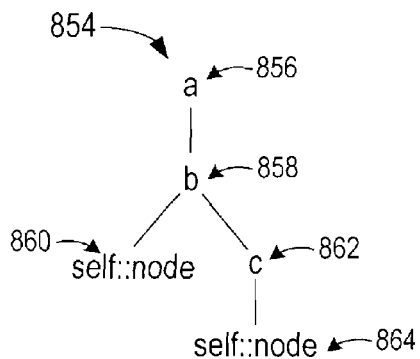
FIG. 50
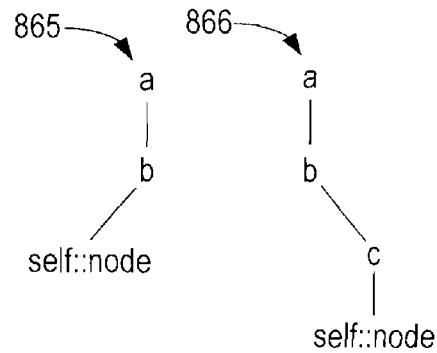
FIG. 51
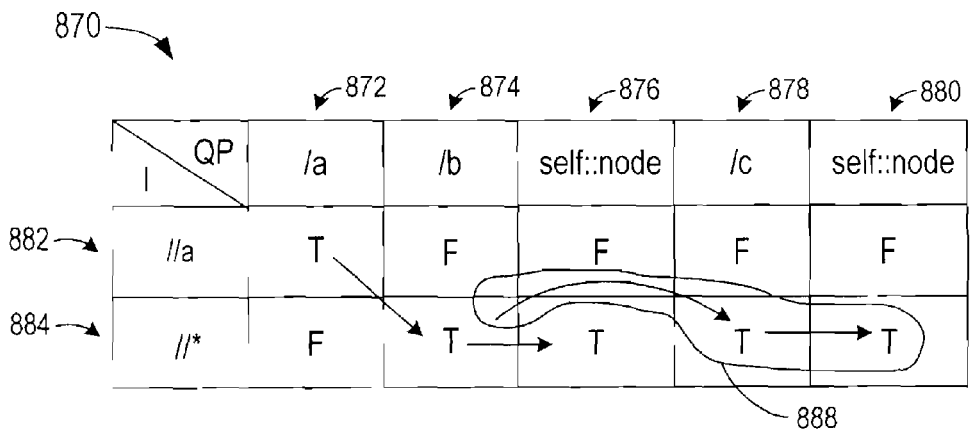
FIG. 52

INDEX EXPLOITATION

CROSS-REFERENCE TO RELATED APPLICATIONS

This patent application is related to co-pending U.S. application Ser. No. 11/770,573, entitled "Between Matching," filed on the same date herewith, by Andrey Balmin and Sauraj Goswami, assigned to the assignee of the present invention, and incorporated herein by reference in its entirety.

In co-pending U.S. application Ser. No. 10/698,622, entitled "XPath Containment For Index and Materialized View Matching," filed Oct. 31, 2003, by Andrey L. Balmin, Kevin S. Beyer, Roberta Jo Cochrane, Fatma Ozcan, and Mir Hamid Pirahesh, assigned to the assignee of the present invention, and incorporated herein by reference in its entirety, various embodiments of index matching are described. Although not limited thereto, various embodiments of the present invention employ some embodiments of index matching.

BACKGROUND OF THE INVENTION 1.0 Field of the Invention

This invention relates to index exploitation; and in particular, this invention relates to index exploitation to process queries in a database management system.

2.0 Description of the Related Art

Database management systems allow data to be accessed quickly and conveniently. An eXtensible Mark-up Language (XML) database stores XML documents. In some XML databases, the XML documents may be organized into collections.

XML is a markup language for representing structured data. XML is also a meta-language for defining markup languages. XML is used as a format for documents, referred to as XML documents. The XML documents may be published, for example, on the World Wide Web or other networks.

A query language is used to access data in XML documents of an XML database. XQuery is one example of a query language for XML documents. In addition, extensions to the Structured Query Language (SQL) are provided in SQL/XML to allow access to data in XML documents in a database management system. In this description, any query which accesses XML documents will also be referred to as an XML query.

An XML query specifies desired data in the XML documents. The XML query typically specifies the desired data using a path expression. The path expression is typically expressed using a path language. One example of a path language is the XML Path language, which is also referred to as XPath. A path expression which is expressed using XPath is referred to as an XPath expression. An XML document can be represented as a tree structure. An XPath expression can be used to describe the location of information in an XML document based on a path through a tree structure representing the XML document.

XPath may be embedded in a host language such as XQuery or SQL/XML. XPath expressions may define a complex path through an XML document, and processing queries may be expensive in time and resources, especially when a query is performed over a large number of XML documents.

A query typically comprises at least one conditional expression. A conditional expression may use comparison operators and logical operators. Examples of comparison operators comprise less than "<", greater than ">", equal "=", "greater than or equal" "≧" "less than or equal" "≦", and "not equal" "≠". Examples of logical operators comprise "AND", "OR", and "NOT".

In one conventional relational database management system, with respect to non-XML documents, an explicit between predicate can be used to select rows of a table for which a specified column has a value that is between two other values. For example, using SQL, one syntax of an explicit between predicate is as follows:

column1 BETWEEN value1 AND value2.

In the explicit between predicate above, "column1" is a name of a column of the database table, and value1 and value2 are specified values, such as integers. The column "column1" does not contain an XML document.

For example, assume that a table named PRODUCTS has a product identifier column called ID, and a price column called PRICE. The price column contains integer values. Using SQL, a query may be specified as follows:

SELECT ID, PRICE FROM PRODUCTS
WHERE (PRICE BETWEEN 100 AND 200)

In the above query, the expression "(PRICE BETWEEN 100 AND 200)" following "WHERE" is an explicit between predicate.

Currently, the XQuery language and the SQL/XML language do not have an explicit between predicate such as illustrated above.

Therefore, there is a need for a technique to identify and process a between predicate in an XML query. It is also desirable that this technique identify and process a between predicate which is implicitly expressed in an XML query. In addition, it is desirable that an index plan which is generated based on the between predicate of the XML query perform a single index scan of an index that is used to process the between predicate.

An XML query may specify desired data using multiple conditional expressions which are connected by "AND" and "OR" operators. At least one index may also be defined on the XML documents of a database. There is a need for a technique to process the XML query using at least one index such that a superset comprising the data that satisfies the query will be produced for further evaluation to provide the query result.

Furthermore, a given path expression of an XML query may have m conditional expressions and n indexes which can be used to process the query. Using a conventional query tree, time and resources are used traversing the query to identify those portions of the query that may be able to be processed using indexes. Therefore, there is a need for a technique to more quickly identify those portions of a query that may be processed using an index.

SUMMARY OF THE INVENTION

To overcome the limitations in the prior art described above, and to overcome other limitations that will become apparent upon reading and understanding the present specification, various embodiments of a method, computer program product and data processing system are provided that exploit indexes.

Various embodiments of a method, computer program product and data processing system are provided that generate an index plan that produces a superset of data comprising the query result. In response to receiving a query of a database, the query having an expression, the expression comprising a plurality of filters, the expression comprising at least one AND operator and at least one OR operator connecting said plurality of filters: A tree representing the expression is provided. The tree comprises a first plurality of nodes. The at least one AND operator is associated with at least one AND node of the first plurality of nodes, respectively. The at least one OR operator is associated with at least one OR node of the first plurality of nodes, respectively. The plurality of filters is associated with a second plurality of nodes of the first plurality of nodes, respectively. At least one index is matched to at least a portion of the expression thereby identifying at least one eligible index to satisfy one or more filters of the plurality of filters. A partition set comprising a plurality of partitions is created. Each partition comprises at least one filter of the plurality of filters. For the partition set, one partition is merged with another partition based on a filter of the one partition having a least common ancestor that is an AND node with a filter of another partition, thereby reducing a number of partitions of the partition set. An index plan is generated based on, at least in part, an eligible index matched with at least one filter of each partition of the partition set.

Various embodiments of a method, computer program product and data processing system are provided that generate a maximal-index-satisfiable query tree. A query of a database comprising a plurality of mark-up language documents is received. The query has an expression comprising at least one filter. A tree is created based on the expression. The tree comprises a plurality of nodes. A position of the nodes of the query tree is recorded. At least one index is matched to the query to provide one or more matching nodes and one or more non-matching nodes of the tree for the query to that index. A representation of the tree is pruned to remove at least one non-matching node based on the position of the at least one non-matching node to at least one matching node, wherein the representation of the tree includes only those branches that match at least one index. At least one index plan is generated based on, at least in part, the pruned representation of the tree.

In this way, various embodiments of a technique process a query using at least one index such that a superset comprising the data that satisfies the query will be produced for further evaluation to provide the query result. In some embodiments, a technique is provided to identify those portions of a mark-up language query that can be processed using at least one index.

BRIEF DESCRIPTION OF THE DRAWINGS

The teachings of the present invention can be readily understood by considering the following description in conjunction with the accompanying drawings, in which:

FIG. 13 depicts a filter-less representation of the XPath expression of FIG. 10;

FIG. 14 depicts an embodiment of a mapping structure that is maintained by various embodiments of an index matching component;

FIG. 15 depicts an embodiment of an index-match structure that records the correspondence between a node, a singleton filter associated with the node, and a list of one or more indexes that can be used to satisfy that filter;

FIG. 16 depicts an embodiment of an index-match tuple;

FIG. 17 depicts an exemplary index-match structure that records the correspondence between the exemplary original XPath expression of FIG. 10 and the exemplary filter-less expression of FIG. 13;

FIG. 22A depicts an exemplary XPath expression that has an implicit between filter;

FIG. 22B depicts an exemplary between tuple for the "@rating≧2" filter of the XPath expression of FIG. 22A;

FIG. 22C depicts an exemplary between tuple for the "@rating≦4" filter of the XPath expression of FIG. 22A;

FIG. 23A depicts another exemplary XPath expression that has an implicit between filter;

FIG. 23B depicts an exemplary between tuple for a first singleton filter of the XPath expression of FIG. 23A;

FIG. 23C depicts an exemplary between tuple for a second singleton filter of the XPath expression of FIG. 23A;

FIG. 24A depicts yet another exemplary XPath expression that has an implicit between filter;

FIG. 24B depicts an exemplary between tuple for the first singleton filter of FIG. 24A;

FIG. 24C depicts an exemplary between tuple for the second first singleton filter of FIG. 24A;

FIG. 25A depicts another exemplary XPath expression that has an implicit between filter;

FIG. 25B depicts an exemplary between tuple for the first singleton filter of FIG. 25A;

FIG. 25C depicts an exemplary between tuple for the second singleton filter of FIG. 25A;

FIG. 31 depicts an exemplary path expression of a query;

FIG. 32 depicts an exemplary query tree based on the path expression of the query of FIG. 31;

FIG. 33 depicts an exemplary filter-less query tree based on the query tree of FIG. 32;

FIG. 34 depicts an exemplary list of matched between tuples based on the exemplary path expression of the query of FIG. 31;

FIG. 35 depicts the exemplary between tuples of the list of matched between tuples of FIG. 34;

FIG. 36 depicts exemplary first and second XML indexes;

FIG. 37 illustratively depicts first and second index paths of the exemplary first and second XML indexes, respectively, of FIG. 36 using a tree representation;

FIG. 49 depicts an exemplary index expression and a tree representation of that index;

FIG. 50 depicts an exemplary path expression of a query and a filter-less tree representation of the path expression;

FIG. 51 depicts trees illustrating structural matches of the index of FIG. 49 with the query tree of FIG. 50;

FIG. 52 depicts an illustrative match matrix that will be used to illustrate the structural matches between the index of FIG. 49 and the path expression of the query of FIG. 50;

To facilitate understanding, identical reference numerals have been used, where possible, to designate identical elements that are common to some of the figures.

DETAILED DESCRIPTION

Figure 1:
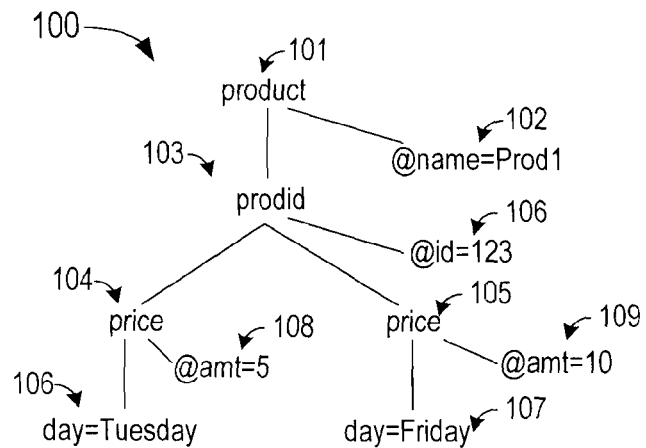
FIG. 1 depicts an illustrative tree data model of an exemplary XML document.

After considering the following description, those skilled in the art will clearly realize that the teachings of the various embodiments of the present invention can be utilized to identify a between predicate in a query, and process the query based on the between predicate. In response to receiving a query of at least one mark-up language document, the query comprising a plurality of singleton filters, at least one group of the plurality of singleton filters are identified. Each group comprises at least two singleton filters, wherein each group is semantically equivalent to a range filter having a start value and a stop value. The start value and stop value are based on at least two singleton filters of each group. A query plan is generated to process the query based on, at least in part, a range defined by the start value and the stop value of said at least two singleton filters of the each group. In various embodiments, the range filter is a between predicate.

In this description, a between predicate is also referred to as a between filter. In various embodiments, a least common ancestor (LCA) technique is applied to the query to identify those singleton filters that may form a between filter based on those filters having a least common ancestor that is a conjunction, and any steps along a path between the singleton filters and the conjunction being one of a self axis and another conjunction. A conjunction refers to a logical "AND" operation. A disjunction refers to a logical "OR" operation. In some embodiments, a least common ancestor (LCA) technique is applied to a query of a mark-up language (ML) document to identify those singleton filters that may form a between filter based on those filters having a least common ancestor that is an "AND" node, and any nodes along a path between the singleton filters and the "AND" node being a self node or another "AND" node.

In various embodiments, an arbitrary query of mark-up language documents may have multiple singleton filters connected by an arbitrary mix of "AND" and "OR" operators. To identify a between filter in an arbitrary query, various embodiments use distributive between matching.

In addition, some embodiments of the present invention can be utilized to process a query using at least one mark-up language index such that a superset comprising the data that satisfies a path expression of the query will be produced for further evaluation to provide the query result. In this way, all data that satisfies the query will be returned in the query result, and qualified data will not be omitted.

Various embodiments of the present invention can be utilized to identify those portions of a query that may be processed using at least one index. In these various embodiments, a maximal-index-match query tree which does not contain any nodes that do not have an index match is generated. In some embodiments, the optimizer uses the maximal-index-match query tree to more quickly identify those portions of the query that can be satisfied by an index, rather than traversing the entire query tree.

Various embodiments of the present invention will be described with reference to XML documents. However, the invention is not meant to be limited to XML documents, and in other embodiments, other languages and mark-up language documents may be used. In various embodiments, the present invention can be used with any language that can be used to navigate a mark-up language document. In some embodiments, the present invention can be used with any document that can be navigated with a path language, such as XPath, no matter what markup language the document is described in. A query of a mark-up language documents is also referred to as a mark-up language (ML) query.

An XML document is expressed using tags such as a start tag "<elementname>" and an end tag "</elementname>", where elementname is the name of the element associated with the tag. The element may also have an attribute which is designated as follows <elementname attr="attributeValue">, in which attr is the attribute and "attributeValue" is the value of that attribute. An exemplary XML document is shown in Table 1 below:

TABLE 1

Exemplary XML document

```
<product name="Prod1">
    <prodid id="123">
        <price amt="5">
            <day>Tuesday </day>
        </price>
        <price amt="10">
            <day>Friday</day>
        </price>
    </prodid>
</product>
```

XML documents are typically represented as and processed according to a tree data model, such as the XQuery data model or the Document Object Model (DOM). Using the tree data model, an XML document comprises nodes, and various nodes are associated with various elements and attributes.

FIG. 1 depicts an illustrative tree data model 100 of the exemplary XML document of Table 1. In the tree 100, node 101 corresponds to the "product" element and has a child attribute node called "name" with a value of "Prod1" 102. A "@" precedes the name of an attribute and is used to designate the attribute. Node 103 corresponds to the "prodid" element and "prodid" has two child nodes, 104 and 105, for the "price" element. Node 103 also has a child attribute node 106 called "id" with a value of "123". Each "price" node 104 and 105 has a "date" node 106 and 107 with values of "Tuesday" and "Friday", respectively. Each "price" node 104 and 105 has a child attribute node 108 and 109 called "amt" with a value of "5" and "10", respectively.

Figure 2A:
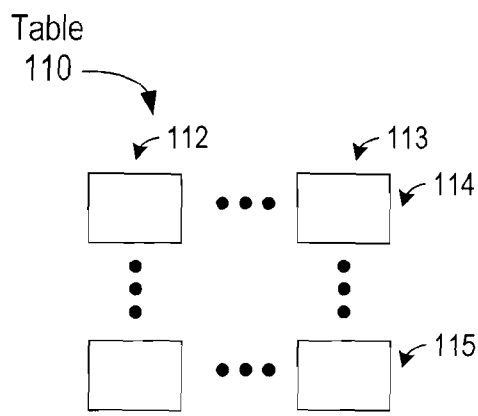
FIG. 2A depicts an illustrative table of a relational database management system that stores XML documents.

FIG. 2A depicts an illustrative table 110 of a relational database management system that can store XML documents. The table has at least one column 112, 113, and a plurality of rows 114, 115. At least one column 112 of the table 110 is designated with an XML data type and the designated column(s) stores XML documents. The designated XML column stores XML data, for example, the XML document of Table 1. In various embodiments, each row 114, 115 of the XML column stores a single XML document. In some embodiments, the table 110 has a single column 112 that is designated as storing XML documents. In other embodiments, multiple columns of a table are designated as storing XML documents, and each of the designated XML columns of a row contains a different XML document. In some embodiments, a plurality of columns of a table store ML documents, and the ML documents may be expressed using the same markup language or different markup languages. In other embodiments, XML documents of an XML database are not stored in tables.

In response to an XML query, a database management system may scan the XML documents to provide a query result. Scanning a large number of XML documents may be time consuming and may use considerable resources. It is typically desirable to use an index to reduce the amount of time and resources consumed in processing a query. An XML index may be created to more quickly access information in the XML documents of an XML database. An XML database may have one or more XML indexes.

In various embodiments, an XML index over XML data is specified using a path expression language, such as XPath. Multiple XML indexes may be created on an XML document. Because multiple parts of an XML document may satisfy a path expression, an XML index may have multiple index entries for a single XML document.

Figure 2B:
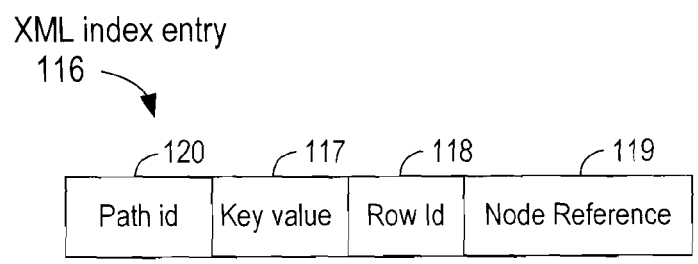
FIG. 2B depicts an illustrative XML index entry.

FIG. 2B depicts an embodiment of an XML index entry 116. In various embodiments, an XML index contains a plurality of index entries, and each XML index entry comprises a key value 117, a row identifier (Row ID) 118 indicating a row of the table associated with the index that contains the XML document having the key value 117, and in some embodiments, a node reference (Node Reference) 119 of an XML document. The key value 117 is typically a typed value and has a data type. Examples of the data type include, and are not limited to, DOUBLE, VARCHARS, and DATETIME. The node reference 119 is an identifier which can be used to directly access the node containing the associated key value 117. In some embodiments, the index entry contains the key value 117 and a document identifier, rather than the row identifier 118. For example, an index may use a document identifier to identify documents which are organized in a collection.

A path expression typically comprises at least one step, and in some embodiments a sequence of steps, describing a path from a current node, also referred to as a context node, to one or more nodes. A path character, typically a forward slash "/", separates the steps. A step has an axis. In various embodiments, a step has a node test, and in some embodiments a step has zero or more predicates. In this description, a "singleton filter" is one type of predicate.

The axis refers to the relationship between a context node and another node or nodes in a tree. For example, an axis of "self" refers to the context node, and is also referred to as a self axis or a self node. In this description, a self node is also referred to using the following notation "self::node". An axis of "child" refers to the children of the context node. An axis of "parent" refers to the parent node of the context node.

The node test may comprise a specific node name, or one or more general expressions.

In various embodiments, attributes are identified by their path. For example, if an index is defined by a path expression of "//@*", and a document has a path such as "/ABC/DEF/GHK/@day", then the key value corresponding to the "@day" attribute entry of that document in the index is associated with a unique path identifier for "/ABC/DEF/GHK/@day" which describes the location of that "@day" attribute in the document. In various embodiments, the index also has a column that stores the path identifier (Path id) 120.

In various embodiments, an XML index contains key values that are used to answer at least a portion of a query, and in some embodiments the entire query. In various embodiments, the key value(s) of an XML index that satisfy at least a portion of a query are identified, and the row or alternately, a document identifier(s) associated with the key value(s) are used to identify and access XML documents which are evaluated to provide the query result. In some embodiments, the node reference associated with a key value of an XML index is used to process a query by providing direct access to an individual node in an XML document that would otherwise be retrieved by navigating through the XML document.

For example, assume that a relational database management system has a table called "prodinfo", and the "prodinfo" table has a column called "prods" which is designated as storing an XML document. The exemplary XML document of Table 1 is stored in the "prods" column of a row. In some embodiments, an exemplary XML index, called "index1", is created on the amount (amt) attribute as follows: CREATE INDEX index1 on prodinfo(prods)

GENERATE KEY USING XMLPATTERN'/prodname/
prodid/price/@amt'
  AS SQL DOUBLE

The index definition of "index1" above is '/prodname/ prodid/price/@amt'. In various embodiments, the rows or entries of the "index1" index comprise the value of the "amt" attribute and a row identifier that identifies a row in the "prod-info" table which contains the XML document in the "prods" column. Table 2 below depicts the exemplary "index1" index which is created in response to the CREATE INDEX statement above based on the exemplary XML document of Table 1 and FIG. 1.

TABLE 2

Exemplary index, "index1"

| Path Id | Key Value | Row Identifier | Node Reference |
|---------|-----------|----------------|-----------------|
| pathid1 | 5 | 1 | Node identifier 1 |
| pathid2 | 10 | 1 | Node identifier 2 |

The exemplary index, "index1", of Table 2 comprises a path identifier (Path Id), key value (Key Value), a row identifier (Row Identifier) and node reference (Node Reference) columns. The exemplary index, "index1" has two entries for the XML document of Table 1 and FIG. 1.

In this example, users may want to retrieve information based on the amount (amt) attribute of the "price" element. For example, assume that a user issues a query on the database containing the XML document of FIG. 1. An exemplary XML query called Q1 using XQuery to find amounts (amt) greater than 2 is expressed as follows:

Q1: for $i in db2-fn:xmlcolumn("prodinfo.prods")/product/prodid/price/[@amt>2] return $i The path expression of the query Q1 is "/product/prodid/price/[@amt>2]" and in this example is the selection criteria. In this example, because the path expression of the query matches the index of "index1" and because the data type of the desired key values of the index is compatible with the specified data of the path expression of the query, index1 is an eligible index which contains key values that will satisfy query Q1. The key values for the "@amt" nodes that satisfy the filter, "@amt>2", of the path expression are identified in index1; the row identifier and node reference associated with those key values are retrieved from index1; and the XML documents are accessed based on the retrieved row identifier and node reference.

In some embodiments, a query has one path expression. In other embodiments, a query has a plurality of path expressions. In some embodiments, one path expression specifies the data to select and another path expression specifies the ordering of the selected data. In addition, a query may be other than to select data; a query may insert or update data. For example, a query may insert data into XML documents that meet specified selection criteria.

Figure 3:
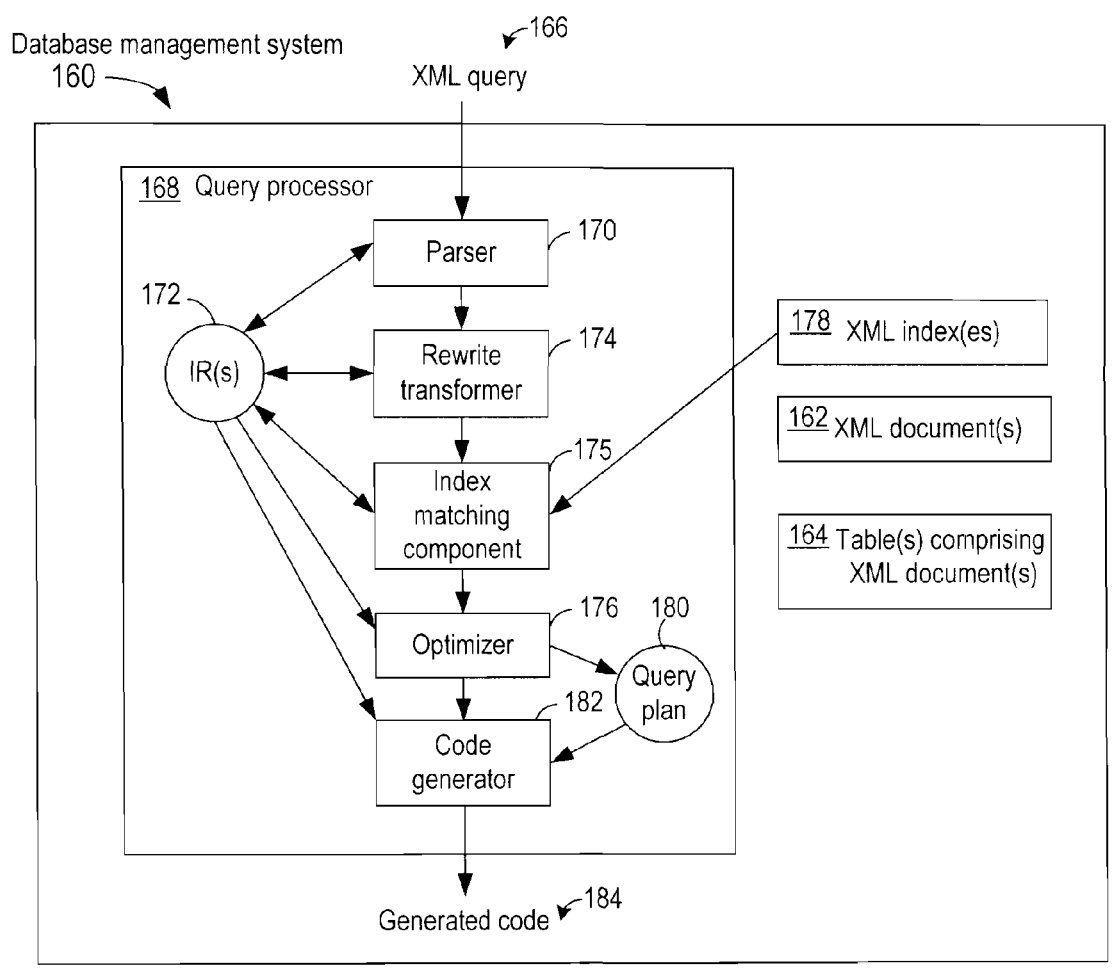
FIG. 3 depicts a diagram of an embodiment of a database management system in accordance with various embodiments of the present invention.

FIG. 3 depicts a diagram of an embodiment of a database management system 160 in accordance with various embodiments of the present invention. In some embodiments, the database management system 160 is a native XML database management system which operates on XML documents 162. In other embodiments, the database management system 160 is a hybrid relational database management system which operates on conventional database tables and database tables 164 which contain XML documents. In some embodiments, the hybrid relational database management system is the IBM® (IBM is a registered trademark of International Business Machines Corporation) DB2® (DB2 is a registered trademark of International Business Machines Corporation) database management system. The XML documents 162 and tables 164 may be part of the database management system 160. Alternately, the XML documents 162 and tables 164 may be outside the database management system 160. In some embodiments, the XML documents 162 are stored in at least one collection.

Figure 4:
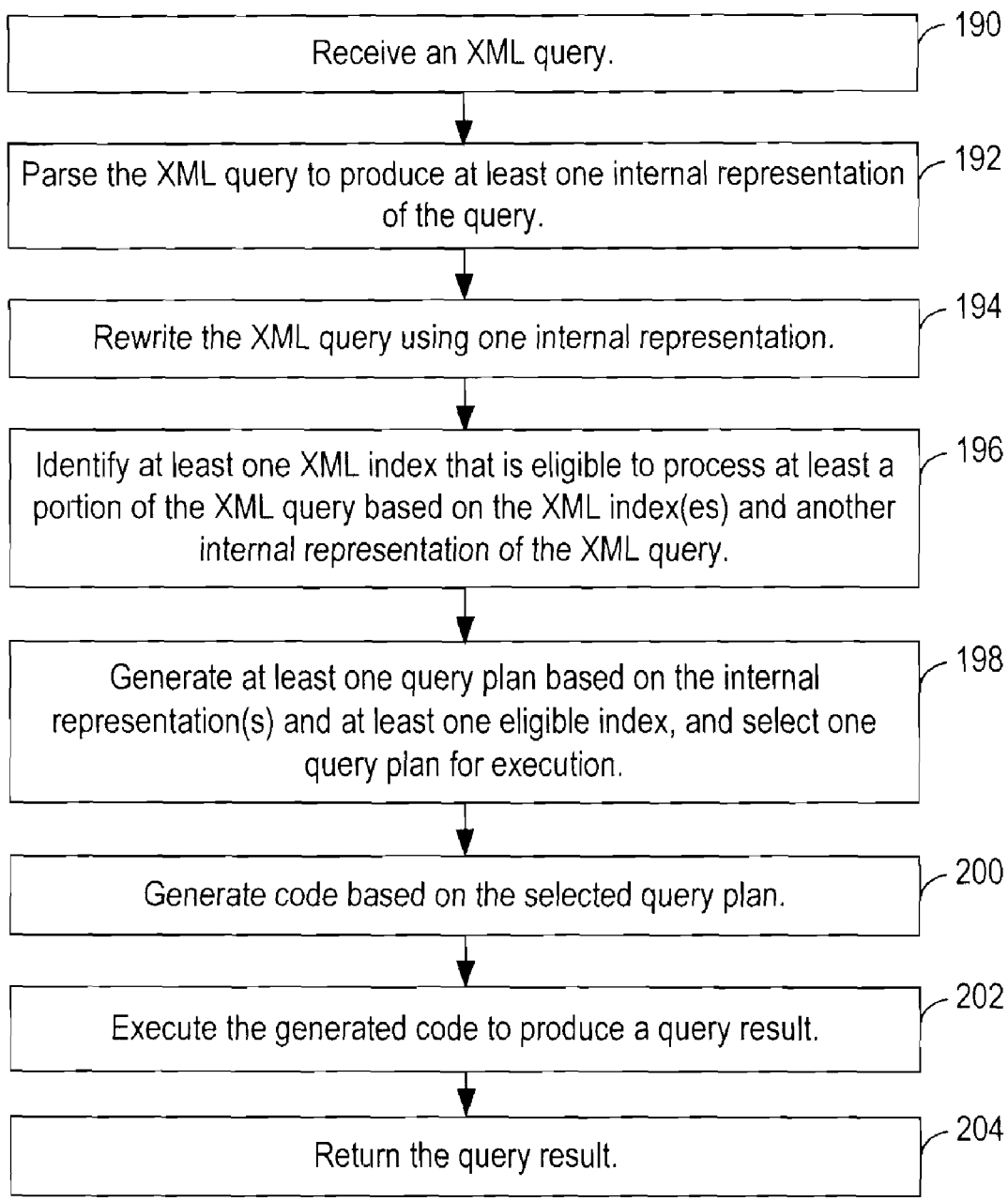
FIG. 4 depicts a flowchart of an embodiment of processing performed by the database management system of FIG. 3.

FIG. 4 depicts a flowchart of an embodiment of processing performed by the database management system 160 of FIG. 3. Referring to FIGS. 3 and 4, an embodiment of the processing of the database management system will be described.

In step 190, an XML query 166 is received by a query processor 168 of the database management system. The XML query 166 may be issued by a user or an application program. In various embodiments, the query processor 168 is a query compiler, for example, a SQL and/or XQuery compiler. In the query processor 168, a parser 170 receives the XML query 166.

In step 192, the parser 170 parses the XML query to produce at least one internal representation (IR(s)) 172 of the XML query. In various embodiments, one internal representation of the XML query is an internal flow graph 172 referred to as a Query Graph Model (QGM). In this description, Query Graph Model refers to a QGM that can be used to process XML queries. The QGM comprises operations and arcs that represent the data flow between operations. In some embodiments, the QGM is the Query Graph Model used by the IBM DB2 database management system. However, in other embodiments, other query graph models may be used. In various embodiments, the parser 170 also produces an internal representation(s) that is a tree representation of the XML, query. In some embodiments, other representations of the XML query are produced. The parser 170 may be a SQL/XML parser to process queries written in the SQL/XML language, an XQuery parser to process queries written in XQuery, or contain both a SQL/XML parser and an XQuery parser.

In step 194, in the query processor 168, a rewrite transformer (Rewrite transformer) 174 rewrites the XML query using the internal representation. In some embodiments, the rewrite transformer consolidates some operations, eliminates some redundant computation and applies a logical transformation to the QGM. In some embodiments, the rewrite transformer 174 normalizes the QGM so that the optimizer 176 receives the same graph as input for semantically equivalent queries. In some embodiments, the rewrite transformer 174 pushes down predicates of a where clause into binding path expressions, enabling XML index matching for value and general comparisons.

The database management system 160 has at least one XML index 178. In various embodiments, an XML index indexes a portion of an XML document. In some embodiments, the XML index indexes entire XML documents.

In step 196, an index matching component 175 identifies at least one XML index that is eligible to process at least a portion of the XML query based on the XML index(es) and a representation of the query. The index matching component 175 performs index matching to match an index to the XML query or portion of the XML query to identify any index(es) that is (are) eligible to process the XML query. An XML index is eligible to process a query if it contains key values that satisfy at least a portion of the query. In various embodiments, an XML index is eligible to process a query if the XML index contains key values that satisfy at least a portion of the query and the row identifiers associated with the key values are used to access the documents of a table to process the query. In some embodiments, an XML index is eligible to process a query if the XML index contains key values that satisfy at least a portion of the query and the row identifiers and node references associated with the key values are used to access the documents and particular nodes within the documents of the table to process the query. In various embodiments, an XML index is eligible to process a query if the XML index contains key values that satisfy at least a portion of the query and the document identifiers associated with the key values are used to access documents to process the query.

In step 198, in the query processor, the optimizer 176 generates at least one query plan 180 based on the representation(s) of the query 172, and at least one eligible index, and selects one query plan for execution. Typically the optimizer 176 generates multiple query plans and selects a least cost query plan 180. An XML query can be processed by scanning the XML documents of a database to identify the desired data that satisfies the query. Using at least one XML index to process the XML query is typically more efficient because the XML index may contain the data that answers the XML query to provide the query result and the document scan may be avoided. Even if the XML index does not contain the data to answer the XML query, the XML index may provide a row identifier to, and/or a node reference into, an XML document allowing the data to answer the XML query to be retrieved quickly. The XML index may provide a document id that can be used to access the documents to more quickly retrieve the desired information. A query plan that uses an index to process the query is referred to as an index plan. In some embodiments, an index plan will use at least one eligible XML index to provide the entire query result without scanning any documents. In various embodiments, the index plan will use at least one eligible XML index to identify key values that satisfy at least a portion of the XML query, retrieve row identifiers and in some embodiments node references, associated with the key values that satisfy the portion of the query, and access documents, and in some embodiments a node within the documents based on the row identifiers and node references, respectively. In other embodiments, the query plan will use a combination of an index plan and a document scan to provide a query result.

In step 200, in the query processor 168, a code generator 182 generates code based on the selected query plan 180. In step 202, the query processor 168 executes generated code to produce a query result. In step 204, the query processor 168 returns the query result to the user or application that issued the XML query. The query result depends on the XML query and may comprise entire documents or a portion of the data of the documents.

XML index matching, also referred to as index matching, refers to determining whether a query can make use of an XML index or indexes. To perform index matching, various embodiments of the present invention operate in the context of a general matching technique that structurally matches a first XPath representation to a second XPath representation. In some embodiments, the first XPath representation is an index definition and the second XPath representation is a query or a portion of a query. Various embodiments of the present invention use the index matching technique described in U.S. application Ser. No. 10/698,622, entitled "XPath Containment For Index and Materialized View Matching," filed Oct. 31, 2003, by Andrey L. Balmin, Kevin S. Beyer, Roberta Jo Cochrane, Fatma Ozcan, and Mir Hamid Pirahesh, assigned to the assignee of the present invention, and incorporated herein by reference in its entirety.

A conditional expression has the form "g op probe", or alternately "probe op g". The filter-compare expression "g" is typically an attribute or element, and is typically indexable. A comparison expression is a type of conditional expression which has a comparison operator (op) such as "less than" "<", "greater than" ">", equal "=", "greater than or equal" "≧", "less than or equal" "≦", and "not equal" "≠". An expression of the form "x opr y", that uses at logical operator (opr) such as "AND" and "OR" is referred to as a logical expression. In some embodiments, a logical expression may also comprise "NOT" such as "(NOT x opr y)". In some embodiments, "x" and "y" comprise at least one conditional expression.

An XML query typically comprises at least one path expression. A path expression typically has at least one conditional expression. In some embodiments, an XML query also comprises at least one logical expression. A singleton filter is a conditional expression having the form of "g op probe" or "probe op g", where "g" represents a filter-compare expression, "op" is a comparison operator, and "probe" represents a probe expression. In some embodiments, the side of the filter comprising "g" is referred to as the filter-compare side, and the side of the filter comprising "probe" is referred to as the probe side.

The filter-compare expression typically comprises an attribute or element. In various embodiments, an element is a self: node. In some the filter-compare expression comprises a function.

In various embodiments, a probe expression is an expression that can be computed during query execution to a probe value, without executing the remainder of the query. In some embodiments the probe expression is a constant, such as a value of "1". In other embodiments, the probe expression comprises a host variable such as "$1" which can be passed from an application when it executes the query, for example, "(DOC)/a[b>$i". In yet other embodiments, the probe expression comprises a query variable that is defined elsewhere in the query, for example "for $i in 1, 2, 3 return (DOC)/a[b>$i]". In some other embodiments, the probe expression comprises a function of: a constant, a host variable, a query variable or any combination thereof.

In some embodiments, the comparison operator "op" of a singleton filter comprises less than "<", greater than ">", less than or equal to "≦", and greater than or equal to "≧". In other embodiments, the comparison operator "op" of a singleton filter comprises equal "=", "not equal" "≠", "less than" "<", "greater than" ">", "less than or equal to" "≦", and "greater than or equal to" "≧".

A between filter has at least two singleton filters which compare the same filter-compare expression. In various embodiments, a between filter has two singleton filters, the first singleton filter is "g1 op1 v1" and the second single filter is "g1 op2 v2", where "g1" is the filter-compare expression, "v1" is less than "v2", "op1" is "greater than" ">" or "greater than or equal" "≧", and "op2" is "less than" "<" or "less than or equal" "<". In some embodiments, the filter-compare expression ("g1") of the between filter is an attribute or self node (self: node). The probe "v1" is a lower limit and the probe "v2" is the upper limit. Alternately, a between filter has two singleton filters of the form "v1 op2 g1" and "v2 op1 g1", where "g1" is the filter-compare expression, "v1" is greater than "v2". "op1" is "greater than" ">" or "greater than or equal" "≧" and "op2" is "less than" "<" or "less than or equal" "<". In another embodiment, a between filter has two singleton filters of the form "v1 op2 g1" and "g1 op2 v2", where "g1" is the filter-compare expression, "v1" is less than "v2", "op2" is "less than" "<" or "less than or equal" "<", and "v1" is the lower limit and "v2" is the upper limit. In yet another alternate embodiment, a between filter has two singleton filters of the form "v2 op1 g1" and "g1 op1 v1", where "g1" is the filter-compare expression, "v2" is greater than "v1", "op1" is "greater than" ">" or "greater than or equal" ">", and "v1" is the lower limit and "v2" is the upper limit. In various embodiments, the operators are normalized such that the filters have a predetermined form.

A between filter has a start key and a stop key based on the probe expressions of its singleton filters. In some embodiments, the lower limit is the start key and the upper limit is the stop key. Alternately, the upper limit is the start key and the lower limit is the stop key. The start and stop keys define a range.

Figure 5:
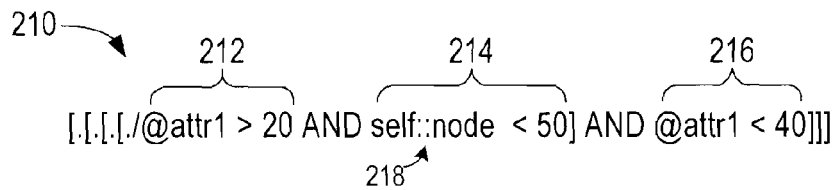
FIG. 5 depicts an exemplary XPath expression of a query.

FIG. 5 depicts an exemplary XPath expression 210 of an XML query. The XPath expression 210 of FIG. 5 comprises a plurality of singleton filters 212, 214 and 216. Singleton filter 212 specifies a condition on an attribute named "attr1". Singleton filter 216 specifies a condition on the attribute named "attr1".

The exemplary XPath expression of FIG. 5 has a between filter. The between filter is for the "attr1" attribute and comprises singleton filters 212 and 216. Assuming that the XPath expression 210 is used in an XML query to select data, the between filter will be satisfied by those key values of "attr1" in the index that are greater than 20 and less than 40 at the specified level of the XPath expression. For example, an XML query comprising the exemplary XPath expression 210 to select data will search an index to identify those key values that satisfy the between filter, retrieve the row identifiers associated with the key values, use the row identifiers to access XML documents, and return data of those XML documents.

Figure 6:
FIG. 6 depicts the XPath expression of FIG. 5 using alternate notation.

FIG. 6 depicts the XPath expression 220 of FIG. 5 using alternate notation. The XPath expression 220 of FIG. 6 uses a period "." 222 rather than the term "self::node" 218 of FIG. 5 to specify a self node.

Figure 7:
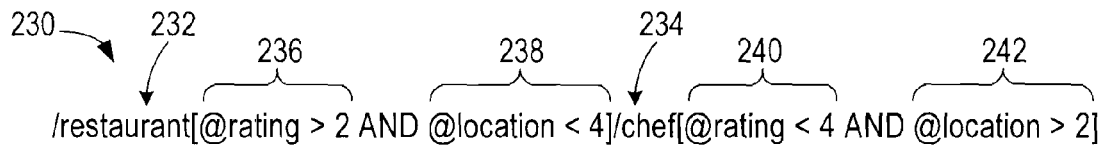
FIG. 7 depicts an exemplary XPath expression of a query that does not have any between filters.

FIG. 7 depicts an XPath expression 230 of an exemplary XML query that does not have any between filters. In the XPath expression 230, rating and location attributes are specified for different element nodes—the restaurant node and the chef node, 232 and 234, respectively. The restaurant node 232 one singleton filter 236 for a rating attribute and another singleton filter 238 for a location attribute. The chef node 234 has one singleton filter 240 for a rating attribute and another singleton filter 242 for a location attribute. Because the singleton filters for the rating and location attributes are for different nodes, the singleton filters for the rating attribute 236 and 240 and the singleton filters for the location attribute 238 and 242 do not form between filters.

Figure 8:
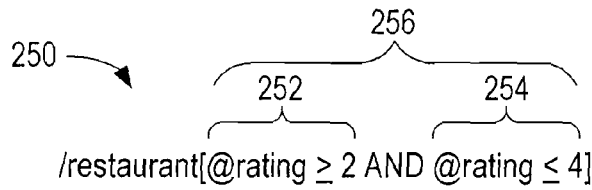
FIG. 8 depicts another exemplary XPath expression of another query.

FIG. 8 depicts yet another exemplary XPath expression 250 of another query. Assume that the query is to select data from the XML database. Assume that there are two XML indexes called index_1 and index_2. The indexes are defined using XPath expressions. Assume that index_1 is defined using the following XPath expression: "/restaurant/@rating"; therefore index_1 indexes those nodes of the XML documents that satisfy "/restaurant/@rating". Assume that index_2 indexes all attribute nodes, and index_2 is defined using the following XPath expression: "//@*". Thus, index_2 indexes the nodes of the XML documents that satisfy "//@*".

For XPath expression 250, one conventional index matching technique identifies both index_1 and index_2 as matching the singleton filters "@rating≧2" 252 and "@rating≦4" 254. This conventional index matching technique will not recognize the combination of the two singleton filters 252 and 254 as a between filter, with the result that the index plan generated by the optimizer that uses index1 consists of two index scans of index_1, one index scan for each singleton filter, followed by AND'ing the results of the two index scans to produce the query result. The AND'ing of the results of the two index scans identifies those key values or rows of the index that are common to the results of the two index scans, and that therefore satisfy both singleton filters. This conventional technique is inefficient because large portions of the index are scanned and the results produced by the two scans are AND'ed.

Various embodiments of the present invention determine that the two singleton filters 252 and 254 of FIG. 8 form a single composite filter that is a between filter 256. The between filter 256 is "@rating≧2 and @rating≦4". Using the between filter, the optimizer generates an index plan which has a single index scan of either index_1 or index_2 with start and stop keys, given by the values of 2 and 4, respectively. Thus efficiency is improved because a much smaller portion of an index can be scanned and no AND'ing of the results of two index scans is performed.

Figure 9:
FIG. 9 depicts yet another exemplary XPath expression of a query in which the XPath expression does not have a between filter.

FIG. 9 depicts another exemplary XPath expression 258 of an XML query that does not have a between filter. If this exemplary XPath expression 258 is applied to a parent "location" node that has two "distance" child nodes, one "distance" child node with a value of 80 and another "distance" child node with a value of 5, that parent "location" node qualifies as a valid result. Thus an index scan with the values of 10 and 20 as start and stop keys, respectively, for "distance", respectively, misses that qualifying parent "location" node. Therefore, various embodiments of the present invention perform between filter identification based on those singleton filters which comprise an attribute node, and in some embodiments, a self node.

Figure 10:
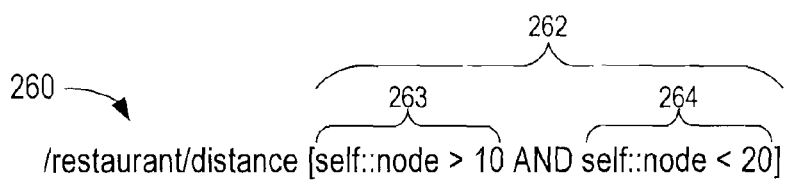
FIG. 10 depicts an exemplary XPath expression of a query in which the XPath expression has an implicit between filter.

FIG. 10 depicts another XPath expression 260 that has a between filter 262. The between filter 262 comprises a first singleton filter 263 and a second singleton filter 264. Using various embodiments of the present invention, in response to the XML query of FIG. 10, an index scan will be performed with the values of 10 and 20 as start and stop keys, respectively, for "distance", and will return all qualifying key values. In various embodiments, the index scan will return the row identifiers associated with the qualifying key values, and in some embodiments, the node references associated with the qualifying key values from the XML index.

Figure 11:
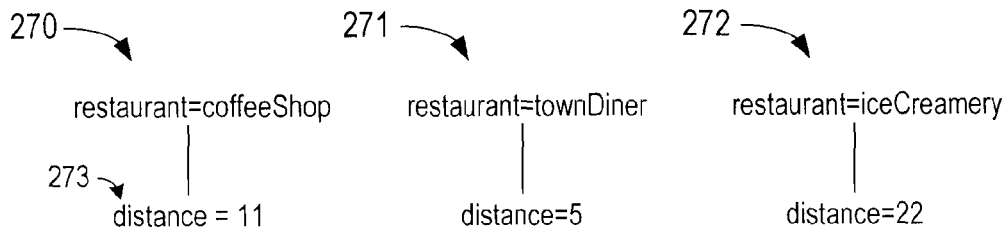
FIG. 11 illustratively depicts three exemplary XML documents of an XML database using a tree data model.

FIG. 11 depicts three exemplary XML documents 270, 271 and 272 of an XML database using a tree data model. Applying the between filter of FIG. 10 to the XML documents of FIG. 11 results in the value of 11 of the distance node 273 of XML document 270 satisfying the XPath expression 260 of FIG. 10, and in some embodiments, being returned. The values of the distance nodes of XML documents 271 and 272 do not satisfy the XPath expression 260 of FIG. 10 and will not be returned.

Various embodiments of a between matching technique of the present invention will identify a between filter in the exemplary XPath expressions of FIG. 5, FIG. 8 and FIG. 10, and will not identify a between filter in the exemplary XPath expressions of FIGS. 7 and 9.

Figure 12:
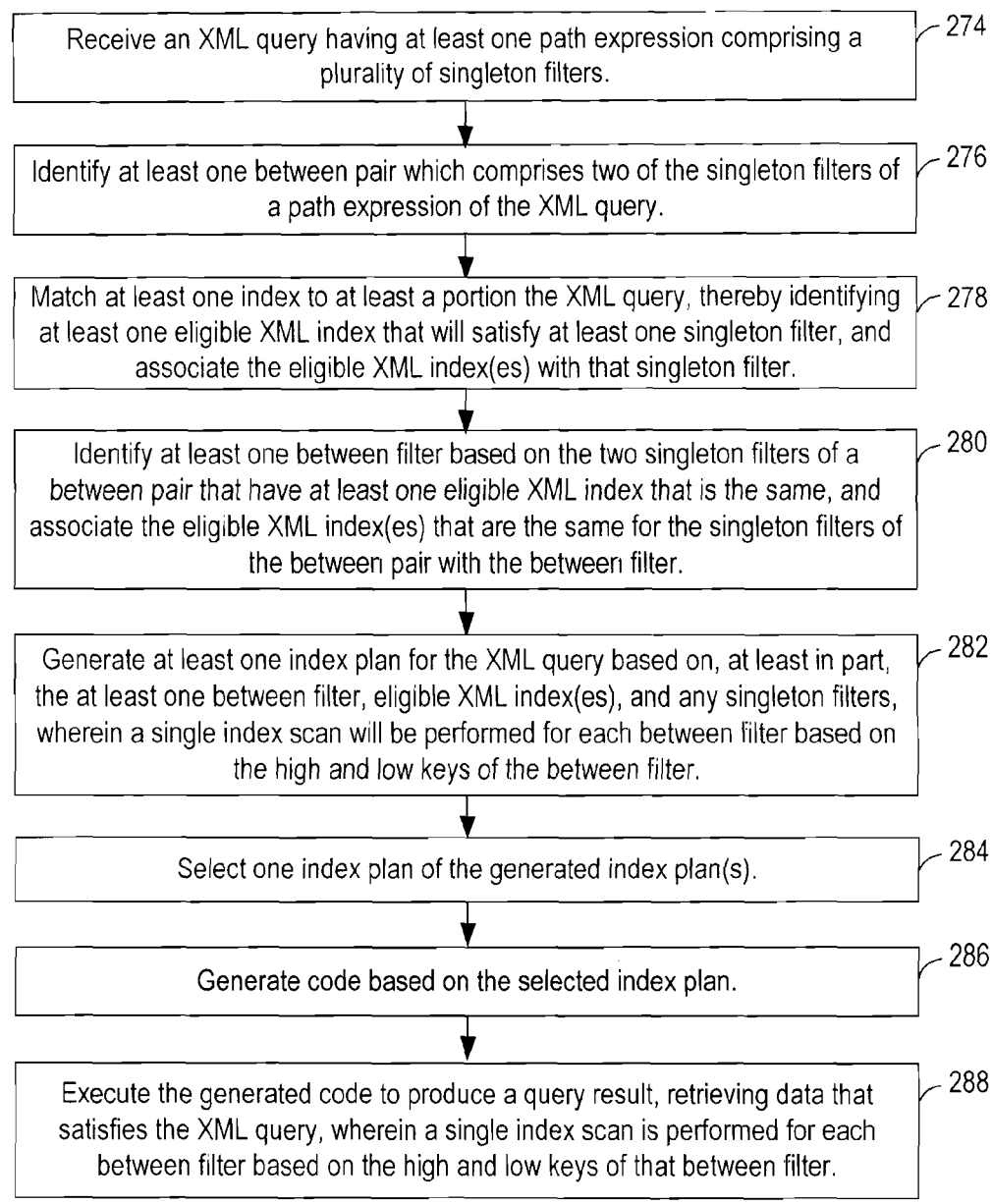
FIG. 12 depicts a high-level flowchart of an embodiment of processing an XML query that has an implicit between filter.

FIG. 12 depicts a high-level flowchart of an embodiment of processing an XML query that has a between filter. In various embodiments, the flowchart of FIG. 12 is performed by the query processor 168 of the database management system 160 of FIG. 3.

In step 274, the parser of the query processor receives an XML query having at least one path expression comprising a plurality of singleton filters. In some embodiments, the parser generates at least one internal representation of the XML query as described above with respect to step 192 of FIG. 4. In some embodiments, the query processor also performs step 194 of FIG. 4.

In step 276, the index matching component of the query processor identifies at least one between pair which comprises two singleton filters of a path expression of the XML query.

In step 278, the index matching component matches at least one index to at least a portion of the XML query thereby identifying at least one eligible index that will satisfy at least one singleton filter, and associates the eligible index(es) with that singleton filter. An XML index is matched to at least a portion of an XML query based on the structure of the XML index and at least a portion of the query being compatible, and in some embodiments, whether the data type of the key value of the index is the same as, or is compatible with, the data type of a singleton filter in the portion of the query being matched. In various embodiments, an eligible index has at least one key value that can be used to answer a query or a portion of a query. In some embodiments, an eligible index is considered to have key values that can be used to identify a particular row of a table or document, and in some embodiments a node within a document, that can be used to answer a query or a portion of the query. In some embodiments, the index matching component produces a list of the singleton filters of the query and for each singleton filter a list of indexes that will satisfy that filter.

In step 280, the index matching component identifies at least one between filter based on the two singleton filters of a between pair having at least one eligible index that is the same. The index matching component associates the eligible index(es) that are the same for the two singleton filters of the between pair with the between filter. In various embodiments, identifying at least one between pair of step 276, identifying the between filter, and at least one eligible index for that between filter is referred to as between matching. An eligible index for a between filter can be used to answer at least a portion of the XML query based on scanning the key values of the eligible index from the start key to the stop key of that between filter. In various embodiments, the index matching component produces a filter list comprising the identified between filter(s). Each between filter on the filter list is associated with at least one eligible index which can satisfy that between filter. In some embodiments, the filter list also comprises those singleton filters that are not part of a between filter, and each non-between singleton filter on the filter list is associated with at least one eligible index.

For example, an eligible index is searched for key values of an attribute, or alternately a self node, beginning with the key values of the start key and ending at the key values of the stop key. In various embodiments, the path identifiers associated with the key values in the eligible index are also scanned to identify the desired attribute, or self node.

In step 282, the optimizer generates at least one index plan for the XML query based on, at least in part, at least one between filter, eligible index(es), and any singleton filter(s) that are not part of a between filter, wherein a single index scan of an eligible index will be performed for each between filter based on the start and stop keys of the between filter. In various embodiments, the index plan for a between filter, when executed, will retrieve data from an index based on scanning the key values of the index from the start key to the stop key of the attribute or self node of the between filter. In this way, using a between filter, an index plan is generated in which a single scan of the key values of an eligible index is performed based on the start and stop keys of the between filter, rather than generating an index plan which scans the index twice, one scan for each filter, then determines the intersection of the retrieved index data from each scan to provide the query result. For example, key values of the XML index will be scanned from the start key to the stop key to produce the query result, or alternately, a superset comprising the query result which is further evaluated to produce the query result.

In step 284, the optimizer selects one index plan of the generated index plan(s). In some embodiments, steps 282 and 284 are combined. In step 286, the code generator generates code based on the selected index plan.

In step 288, the query processor executes the generated code to produce a query result, retrieving all data that satisfies the XML query, wherein a single index scan is performed for each between filter based on the start and stop keys of that between filter. The query processor returns the query result as described above with reference to step 204 of FIG. 4.

Various data structures used in some embodiments of between matching will be described.

FIG. 13 depicts a filter-less representation 290 of the path expression 260 of FIG. 10. In FIG. 13, the filter-less representation 290 is also an XPath expression. In some embodiments, the filter-less representation is a tree. The index matching component creates the filter-less representation 290 based on the XPath expression 260 of FIG. 10. Filter 263 of FIG. 10 corresponds to self::node 292 of FIG. 13. Filter 264 of FIG. 10 corresponds to self::node 294 of FIG. 13. The self::nodes 292 and 294 are connected by an "AND" operator 296.

FIG. 14 depicts an embodiment of a mapping structure 300 that is maintained, in some embodiments, by the index mapping component. The mapping structure 300 records the correspondence between the original query and its filter-less representation. In FIG. 14, the mapping structure 300 contains a reference to a node 302 of the filter-less representation and a reference to the filter 304 of the original query. The following mapping pairs are stored in the exemplary mapping structure 300 of FIG. 14: (self::node, self::node>10) 332 and (self::node, self::node<20) 334. The first item of the mapping pair is a reference to the query node 336 of the filter-less query representation which is, in this example, a self::node. The second item of the mapping pair 338 is a reference to the filter. In this description, for simplicity, the items which are referenced are shown in the mapping structure rather than the references. The mapping structure 300 is used to locate filters as the filter-less representation is navigated.

FIG. 15 depicts an embodiment of an index-match structure 310 that records the correspondence between a node in a node field 312, the singleton filter associated with the node in a filter field 314, and an index list 316 indicating the eligible index(es) for that filter. In some embodiments the node field 312 contains a reference to the node of the filter-less representation associated with the filter referenced by the filter field 314. In some embodiments, the index list has a single index name or identifier. In other embodiments, the index list has a plurality of index names or identifiers. In some embodiments, the list of eligible indexes 316 may not contain any index names and may be NULL.

FIG. 16 depicts an embodiment of an index-match tuple 320. An index-match tuple 320 comprises a reference to a node (N) 322, a reference to the singleton filter (F) associated with the node 324, and an index list indicating one or more eligible indexes (IndexList) 326 for that singleton filter. An index-match tuple represents an index-match structure 310 (FIG. 15). The node (N) 322 is a node from the filter-less representation tree associated with the singleton filter (F) 324.

FIG. 17 depicts an exemplary index-match structure 330 based on the exemplary filter-less XPath expression 290 of FIG. 13. The index-match structure 330 records the correspondence between the exemplary original XPath expression 310 of FIG. 10 and the exemplary filter-less XPath expression 290 of FIG. 13. The following node-filter pairs are stored in the index-match structure 330 of FIG. 17: (self::node, self::node>10) 332 and (self::node, self::node<20) 334. The first item in the node-filter pair is a reference to the query node 336 and in this example that query node is "self::node". The second item in the node-filter pair 338 is a reference to the filter and in this example, the filter is "self::node<20". In some embodiments, the index-match structure 330 is used to locate filters as the filter-less query representation is navigated.

A structural match refers to a match of the path of a specified index to a path of the path expression of an XML query. After finding all the structural matches, the index matching component generates the index list of one or more eligible indexes, if any, for each singleton filter. In various embodiments, the index matching component updates the index list 340 of the index-match structure 330 with the list of the names of the eligible index(es) for each filter. In this example, for the entry for node-filter pair 332, the list of indexes comprises an exemplary index name of index_1 and for the entry for the node-filter pair 334, the list of indexes comprises two exemplary index names of index_1 and index_2.

The index matching component identifies matches between an index expression and at least a portion of a query. The index expression is an index definition which is a path expression, and typically an XPath expression. In some embodiments, the index expression and the path expression of a query are represented using a tree.

Figure 18:
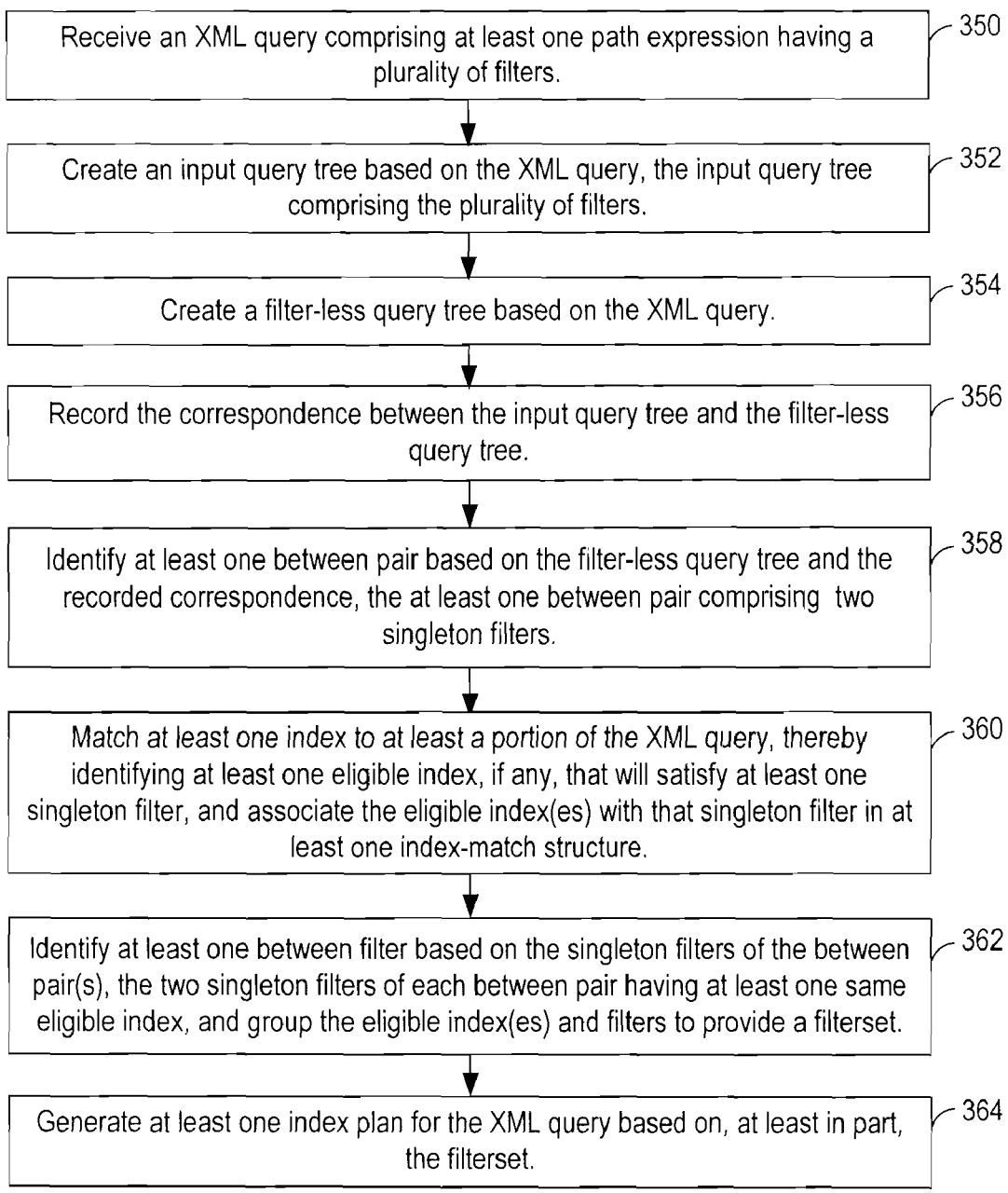
FIG. 18 depicts a flowchart of another embodiment of identifying and processing an implicit between filter of an XML query.

FIG. 18 depicts a flowchart of another embodiment of identifying and processing between filters in an XML query. In various embodiments, the flowchart of FIG. 18 is implemented in the query processor of FIG. 3.

In step 350, an XML query having at least one path expression comprising a plurality of filters is received.

In step 352, the parser creates an input query tree based on the XML query. The input query tree comprises the plurality of filters.

In step 354, the index matching component creates a filter-less query tree based on the query. The filters are extracted from the query and the filter-less query tree is created. In various embodiments, a filter-less representation of the query is created. In some embodiments, the filter-less representation is a path expression.

In step 356, the index matching component records the correspondence between the input query tree and the filter-less query tree. The index matching component records this correspondence in the mapping structure. The index matching component creates the mapping structure and associates nodes of the filter-less query tree with nodes that have filters in the input query tree.

In step 358, the index matching component identifies at least one between pair based on the filter-less query tree and the recorded correspondence between the query tree and the filter-less query tree. In some embodiments, the index matching component retrieves the recorded correspondence from the mapping structure. A typical between pair has two singleton filters which specify the same attribute, or which specify the same self node. In various embodiments, the index matching component identifies a between pair based on the singleton filters having a least common ancestor which is an AND node in the filter-less query tree, or in some embodiments the input query tree.

In step 360, the index matching component matches at least one index to at least a portion of the XML query, thereby identifying at least one eligible index, if any, that will satisfy at least one singleton filter. The index matching component associates the eligible index(es) with the at least one singleton filter using at least one index-match structure. A list of indexes comprising the name(s) of the eligible index(es) that will satisfy that a singleton filter is produced. In some embodiments, a top-down method is used to find matches between nodes of the XML index and nodes in the filter-less query representation, or alternately the representation of the input query, and these matches are referred to as structural matches.

In step 362, the index matching component identifies at least one between filter based on the singleton filters of the between pair(s). For each between pair, the index matching component determines whether the two singleton filters of that between pair have at least one same eligible index, and if so, those singleton filters of that between pair are identified as a between filter. The index matching component groups the eligible index(es) and filters to provide a filterset.

In step 364, the optimizer generates at least one index plan for the XML query based on, at least in part, the filterset. The index plan will perform a single index scan of an eligible index for each between filter based on the start and stop keys of the between filter. After step 364, steps 284, 286 and 288 of FIG. 12 are performed.

Various more-detailed embodiments of a between matching will now be described.

Figure 19:
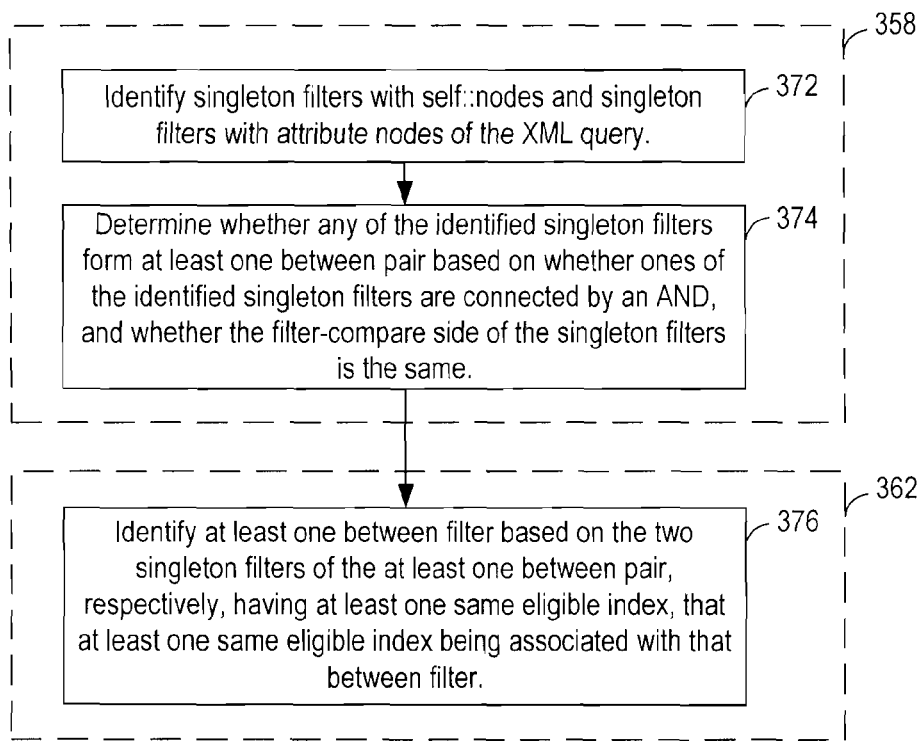
FIG. 19 depicts a more-detailed flowchart of an embodiment of a between matching technique.

FIG. 19 depicts a flowchart of another embodiment of between matching. In various embodiments, steps 372 and 374 of FIG. 19 are implemented in step 358 of FIG. 18. Various embodiments of the present invention evaluate singleton filters having attribute and self nodes to determine if a singleton filter is part of a between filter. The index matching component creates a between tuple to store information about a singleton filter that may be part of a between filter.

In step 372, the index matching component identifies singleton filters with a self::node and singleton filters with an attribute node of the XML query.

In step 374, the index matching component determines whether any of the identified singleton filters form at least one between pair based on whether ones of the identified singleton filters are connected by an "AND" node and whether the filter-compare side of the singleton filters is the same. A least common ancestor (LCA) technique is performed to identify a between pair using the between tuples.

In step 376, the index matching component identifies at least one between filter based on the two singleton filters of the at least one between pair, respectively, having at least one same eligible index. The eligible index(es) is(are) associated with the between filter. In various embodiments, step 376 is performed in step 362 of FIG. 18.

In various embodiments, steps 372 and 374 are performed as the index matching component traverses the filter-less query tree. In some embodiments, the traversal of the filter-less representation of the query is a pre-order traversal. In a pre-order traversal, starting at a root of a tree, the left subtree is traversed, followed by the right subtree. In other embodiments, other techniques of traversing a tree are used.

The filter-less query tree comprises nodes that are associated with the filter-compare sides of the filters. The filter-less query tree does not have the entire filter. Each AND operator and OR operator of a path expression is mapped to a node of the filter-less query tree. In step 374, for each "AND" node of the filter-less query tree, the index matching component determines whether any filters associated with child nodes to the left and right side of the "AND" node partially qualify as being part of a between filter.

In step 372, to determine whether a singleton filter partially qualifies as being part of a between pair or a between filter, the index matching component determines the path type of the filter-compare side of the singleton filter. Various embodiments determine whether the path type of the filter-compare side of the singleton filter is an attribute or self node based on the following grammar:

```
Self_Node : - self::node
Self_Path : - Self_Path/Self_Node | Self_Node
Attribute : - @Xml_Identifier
ExtendedAttribute : - Self_Path/Attribute
```

In various embodiments, based on the grammar above, a composite path type of the filter-compare side of the singleton filter is considered to be an attribute or an attribute node if the path type is Attribute or ExtendedAttribute. The composite path type of the filter-compare side of the singleton filter is considered to be a self node if the path type is Self_Node or Self_Path.

The non-terminal Self_Path includes those XPath expressions such as self: node/self: node/self::node. The non-terminal ExtendedAttribute includes those XPath expressions such as self: node/self::node/@attribute.

Figure 20:
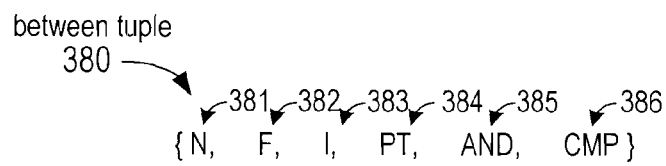
FIG. 20 depicts an embodiment of a between tuple.

FIG. 20 depicts an embodiment of a between tuple 380. The between tuple 380 is a data structure and comprises a plurality of fields. The fields comprise node (N) 381, filter (F) 382, list of indexes (I) 383, path type (PT) 384, pointer to an "AND" node (AND) 385, and compare (CMP) 386.

In the between tuple 380, the node (N) field 381 reference to a node of the query expression of the filter-less query tree, and the filter (F) 382 is a reference to the singleton filter of that node (N) 381. The list of indexes (I) 383 comprises a list of one or more indexes that structurally match the path to the node N and that will also satisfy the singleton filter (F). In some embodiments, the list of indexes (I) field contains a pointer to an index-match structure associated with the node (N) and filter (F) that forms the list of eligible indexes for the filter (F). The path type (PT) field 334 contains one of the path types of the grammar described above. The "AND" field 385 contains a pointer to the nearest ancestor "AND" node of node N in the query. When the path type (PT) field 384 is ExtendedAttribute, the compare (CMP) 386 points to the Attribute child of ExtendedAttribute. When the path type (PT) 384 is Attribute, the compare (CMP) field 386 points to the Xml_Identifier, such as the attribute name of the attribute.

In various embodiments, the AND field of a between tuple is always populated with a pointer to an AND node because a between tuple is not created for a singleton filter unless that singleton filter has an ancestor AND node in the query. If while traversing the query, the index matching component detects filters but no AND nodes, then no between tuples are created.

Figure 21:
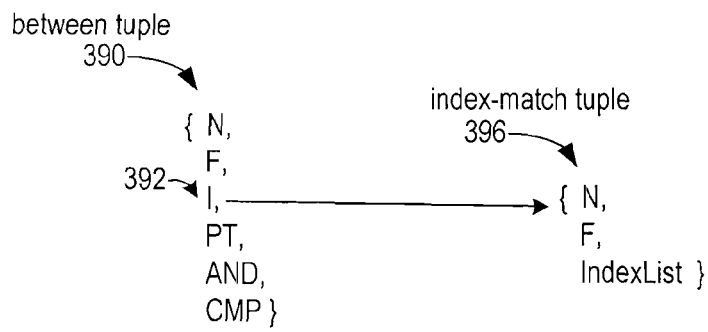
FIG. 21 depicts an alternate embodiment of a between tuple.

FIG. 21 depicts an alternate embodiment of a between tuple 390 in which the list of indexes (I) 392 of the between tuple 390 contains a pointer to an index-match tuple 396 or structure which is the head of a list of index-match structures identifying the eligible indexes for the node (N) and filter (F) pair.

FIG. 22A depicts an exemplary XPath expression 400 that has a between filter. The first filter is "@rating≧2" and the second filter is "@rating≦4".

FIG. 22B depicts an exemplary between tuple 410-1 for the "@rating≧2" filter of the XPath expression of FIG. 22A. The between tuple 410-1 has a node (N) field 411-1 containing a reference to the "/restaurant/@rating" node of the first filter, "rating≧2", of the filter-less query tree, and the filter (F) field 412-1 contains a reference to the filter "@rating≧2". The between matching technique retrieves this node and filter information from the mapping structure. The list of indexes (IndexList1) 413-1 is an index list that satisfies this filter. The path type (PT) 414-1 of node (N) is "Attribute". The "AND" field 415-1 contains a pointer to the nearest AND node (PointerToAnd) to the node (N) o 411-1 of the filter-less query tree. The compare (CMP) field 416-1 points to the Xml_Identifier which, in this example, is "rating".

FIG. 22C depicts an exemplary between tuple 410-2 for the "@rating≦4" filter of the XPath expression of FIG. 22A. The between tuple 410-2 has a node (N) field 411-2 containing a reference to the "/restaurant/@rating" node of the second filter, "@rating≦4", of the filter-less query tree, and the filter (F) field 412-2 contains a reference to the filter "@rating≦4". The list of indexes (IndexList2) 413-2 is an index list that satisfies this filter. The path type (PT) 414-2 of node (N) is "Attribute". The "AND" field 415-2 contains a pointer to the nearest AND node (PointerToAnd) to node (N) of the filter-less query tree. The compare (CMP) field 416-2 points to the Xml_Identifier which, in this example, is "rating".

FIG. 23A depicts another exemplary XPath expression 418 that has a between filter. The first filter is "@rating≧2", and the second filter is "@rating<4".

FIG. 23B depicts an exemplary between tuple 420-1 for the first filter of FIG. 23A. The node (N) field 421-1 contains a pointer to the "self::node/self::node/@rating" node of the first filter, "@rating≧2". The filter (F) field 422-1 a reference to the "self::node/self::node/@rating≧2" filter. The list of indexes 423-1 is IndexList3. The path type (PT) 424-1 is ExtendedAttribute. The AND field 425-1 is PointerToAnd which points to the "AND" node of a tree representation of the path expression 418 of FIG. 23A.

In this example, the path type 424-1 is ExtendedAttribute because of the self nodes preceding the filter. The compare field 426-1 points to "rating" because "rating" is the last child of ExtendedAttribute. In various embodiments, the compare field facilitates the comparison of two XPpath expressions, such as "self::node/self::node/@rating" and "@rating". In both XPath expressions the attribute is "rating" and the compare (CMP) fields are used to perform the comparison.

FIG. 23C depicts an exemplary between tuple 420-2 for the second filter of FIG. 23A. The node (N) field 421-2 contains a pointer to the "/@rating" node of the second filter, "@rating<4". The filter (F) field 422-2 a reference to the "rating<4" filter of the query tree. The list of indexes 423-2 is IndexList4. The path type (PT) 424-2 is Attribute. The AND field 425-2 is PointerToAnd which points to the "AND" node of a tree representation of the path expression 418 of FIG. 23A. The compare field 426-1 points to "rating".

FIG. 24A depicts yet another exemplary XPath expression 428 that has a between filter. The first filter is "self::node>101", and the second filter is "self::node<20".

FIG. 24B depicts an exemplary between tuple 430-1 for the first filter of FIG. 24A. The node (N) field 431-1 points to the node containing the filter-compare side of the first filter, "self::node>10". The filter (F) field 432-1 contains a pointer to the filter "self::node>10". The list of indexes 433-1 is IndexList5. The path type (PT) 434-1 is Self_Node. The AND field 435-1 is PointerToAnd which refers to an AND node of a tree representation of the path expression 428 (FIG. 24A). The compare (CMP) field 436-1 is NULL.

FIG. 24C depicts an exemplary between tuple for the second filter of the XPath expression 428 of FIG. 24A. The node (N) field 431-2 points to the node containing the filter-compare side of the second filter, "self::node<20". The filter (F) field 432-2 contains a pointer to the filter "self::node>10". The list of indexes 433-2 is IndexList6. The path type (PT)

434-2 is Self_Node. The AND field 435-2 is PointerToAnd which refers to an AND node of a tree representation of the path expression 428 (FIG. 24A). The compare (CMP) field 436-2 is NULL.

FIG. 25A depicts another exemplary XPath expression 438 that has a between filter. The XPath expression 438 is "/a/b/c[./././.>10 AND ././<20"]. The first filter is "./././.>10", and the second filter is "././<20".

FIG. 25B depicts an exemplary between tuple 440-1 for the first filter of FIG. 25A. The node (N) field 441-1 points to the node containing the filter-compare side of the first filter. The filter (F) field 442-1 contains a pointer to the first filter. The list of indexes 443-1 is IndexList7. The path type (PT) 444-1 is Self_Path. The AND field 445-1 is PointerToAnd which refers to an AND node of a tree representation of the path expression 438 (FIG. 25A). The compare (CMP) field 436-1 is NULL.

FIG. 25C depicts an exemplary between tuple 440-2 for the second filter of FIG. 25A. The node (N) field 442-1 points to the node containing the filter-compare side of the second filter. The filter (F) field 442-2 contains a pointer to the second filter. The list of indexes 443-2 is IndexList8. The path type (PT) 444-2 is Self_Path. The AND field 445-2 is PointerToAnd which refers to an AND node of a tree representation of the path expression 438 (FIG. 25A). The compare (CMP) field 436-2 is NULL.

Figure 26:
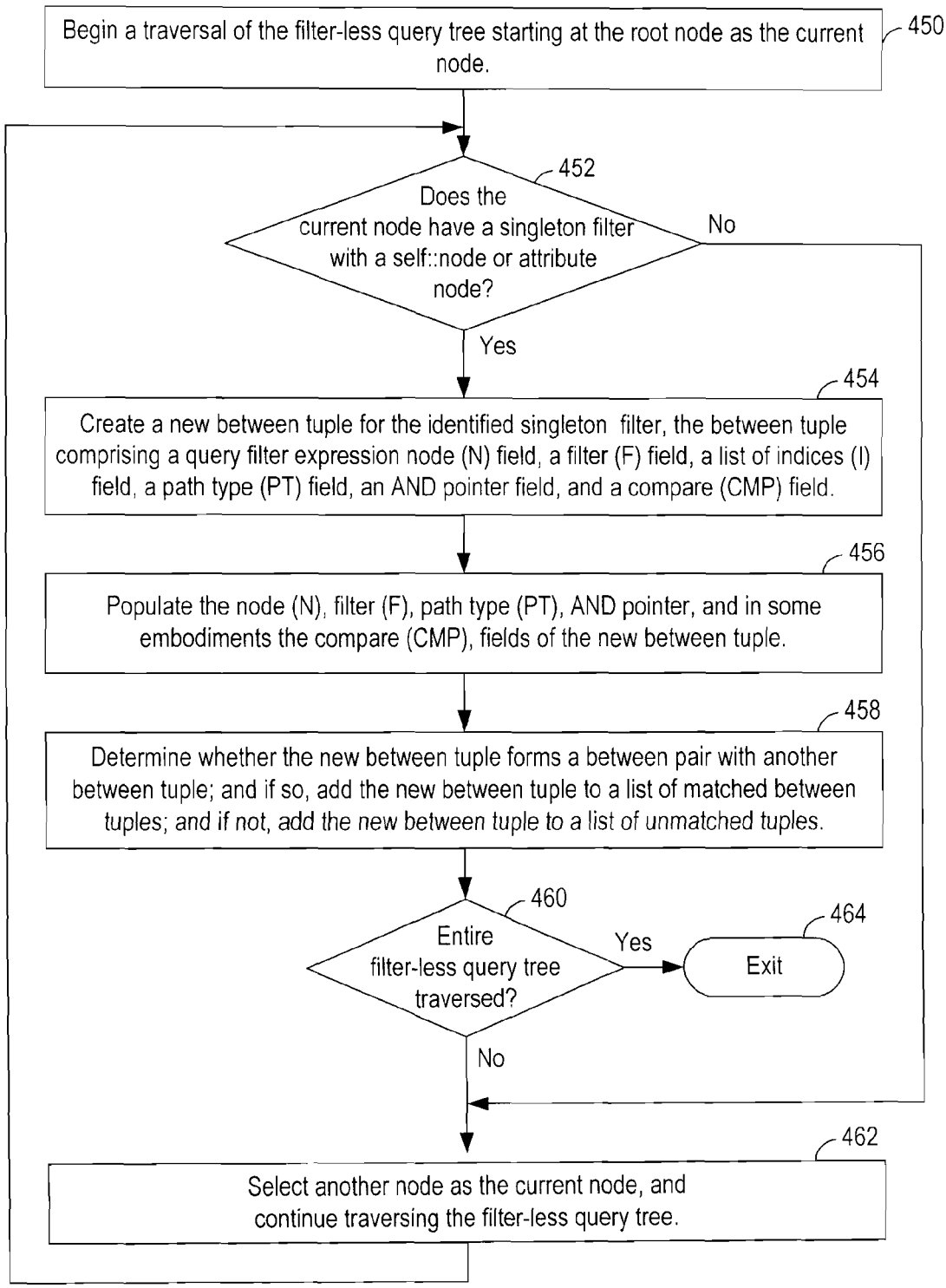
FIG. 26 depicts a flowchart of an embodiment of traversing the filter-less query tree and identifying a between pair.

FIG. 26 depicts a flowchart of an embodiment of traversing the filter-less query tree and identifying a between pair. In some embodiments, the flowchart of FIG. 26 is performed in step 276 of FIG. 12, and step 358 of FIG. 18.

In step 450, a traversal of the filter-less query tree begins, starting at the root node as the current node. Step 452 determines whether the current node has a singleton filter with a self: node or attribute-only node. An attribute-only node has no self-node or no chain of self::nodes in front of it in the path expression. In various embodiments, the mapping structure is accessed to determine whether the current node has a filter, and if so, that filter is retrieved. If so, in step 454, a new between tuple is created for the identified singleton filter, the between tuple comprising a query filter expression node (N) field, a filter (F) field, a list of indexes (I) field, a path type (PT) field, an AND pointer field, and a compare (CMP) field.

In step 456, the node (N), filter (F), path type (PT), And, and in some embodiments, the compare (CMP), fields of the new between tuple. The node (N) field is populated with a reference to the node of the filter-less query tree, or alternately of the query tree, for the identified filter. The filter (F) field is populated with a reference to the identified filter in the query tree. The path type (PT) field is populated based on the grammar as described above based on the filter-compare side of the identified filter. The AND field is populated with the pointer to the nearest ancestor AND node of node N. In some embodiments, the compare (CMP) field is populated.

Step 458 determines whether the new between tuple has a singleton filter that is part of a between pair, and if so, adds the new between tuple to a list of matched between tuples, and if not adds the new between tuple to a list of unmatched between tuples. A between tuple that is matched to another between tuple have singleton filters that form a between pair, and those singleton filters may form a between filter. In various embodiments, the flowchart of FIG. 27 is performed to make this determination.

Step 460 determines whether the entire filter-less query tree is traversed. If not, in step 462, another node is selected as the current node, and the traversing of the filter-less query tree continues to step 452. If step 460 determines that the entire filter-less query tree is traversed, in step 464, the flowchart exits.

In response to step 452 determining that the current node does not have a filter with a self::node or attribute only node, step 452 proceeds to step 462.

Figure 27:
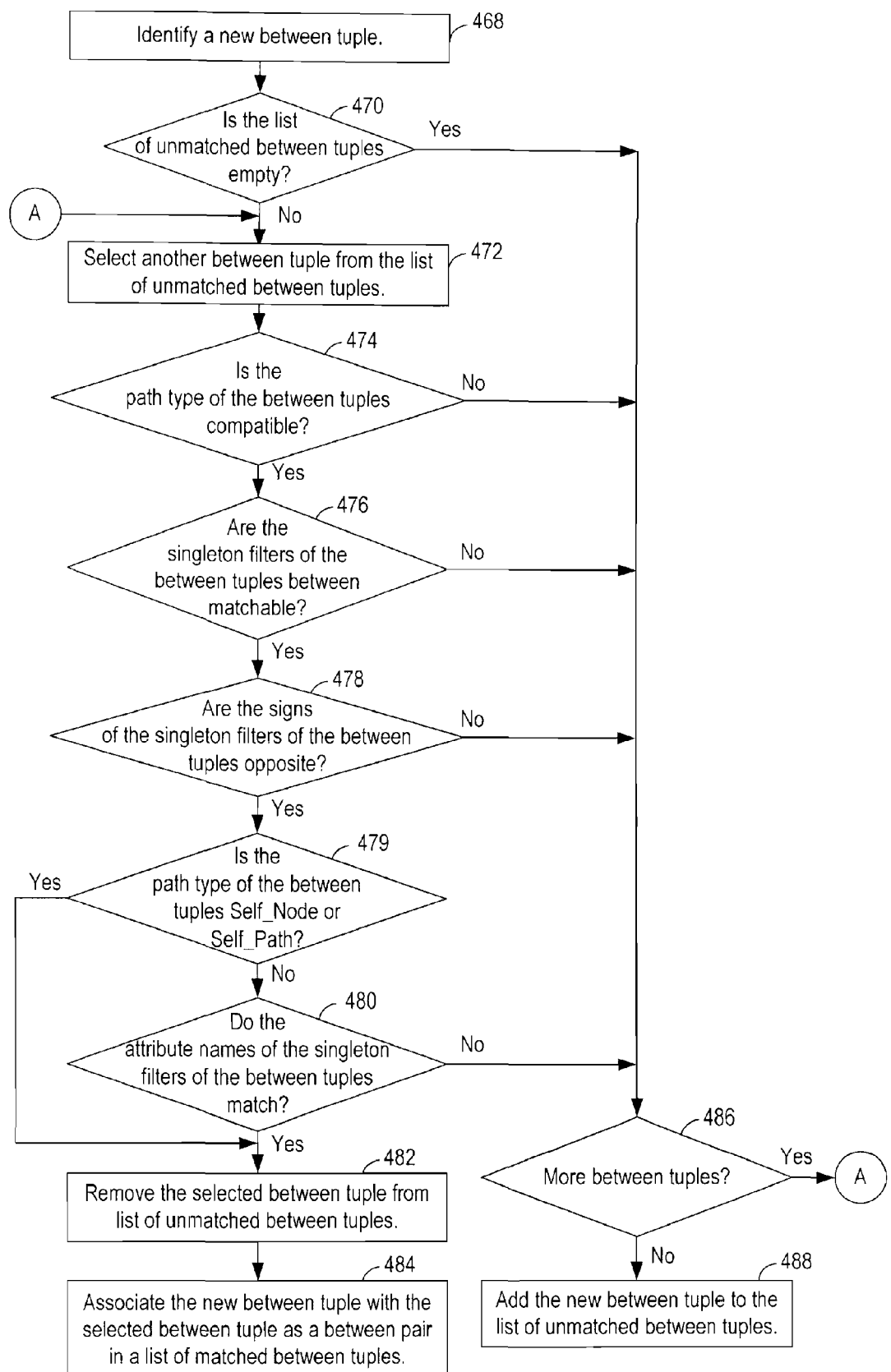
FIG. 27 depicts a flowchart of an embodiment of determining whether a between tuple forms a between pair with another between tuple.

FIG. 27 depicts a flowchart of an embodiment of determining whether a between tuple forms a between pair with another between tuple. In some embodiments, the flowchart of FIG. 27 is performed in step 458 of FIG. 26.

In step 468, a new between tuple is identified. In various embodiments, the new between tuple is the new between tuple of step 458 of FIG. 26.

Step 470 determines whether the list of unmatched between tuples is empty. If not, in step 472, another between tuple is selected from the list of unmatched between tuples.

Step 474 determines whether the path types of the between tuples are compatible. The path types of the new and selected between tuples are determined to be compatible if the path types are the same. The path types of the new and selected between tuples are also determined to be compatible if one path type is Attribute and the other path type is ExtendedAttribute. The path types of the new and selected between tuples are also determined to be compatible if one path type is Self_Node and the other path type is Self_Path.

Figure 28:
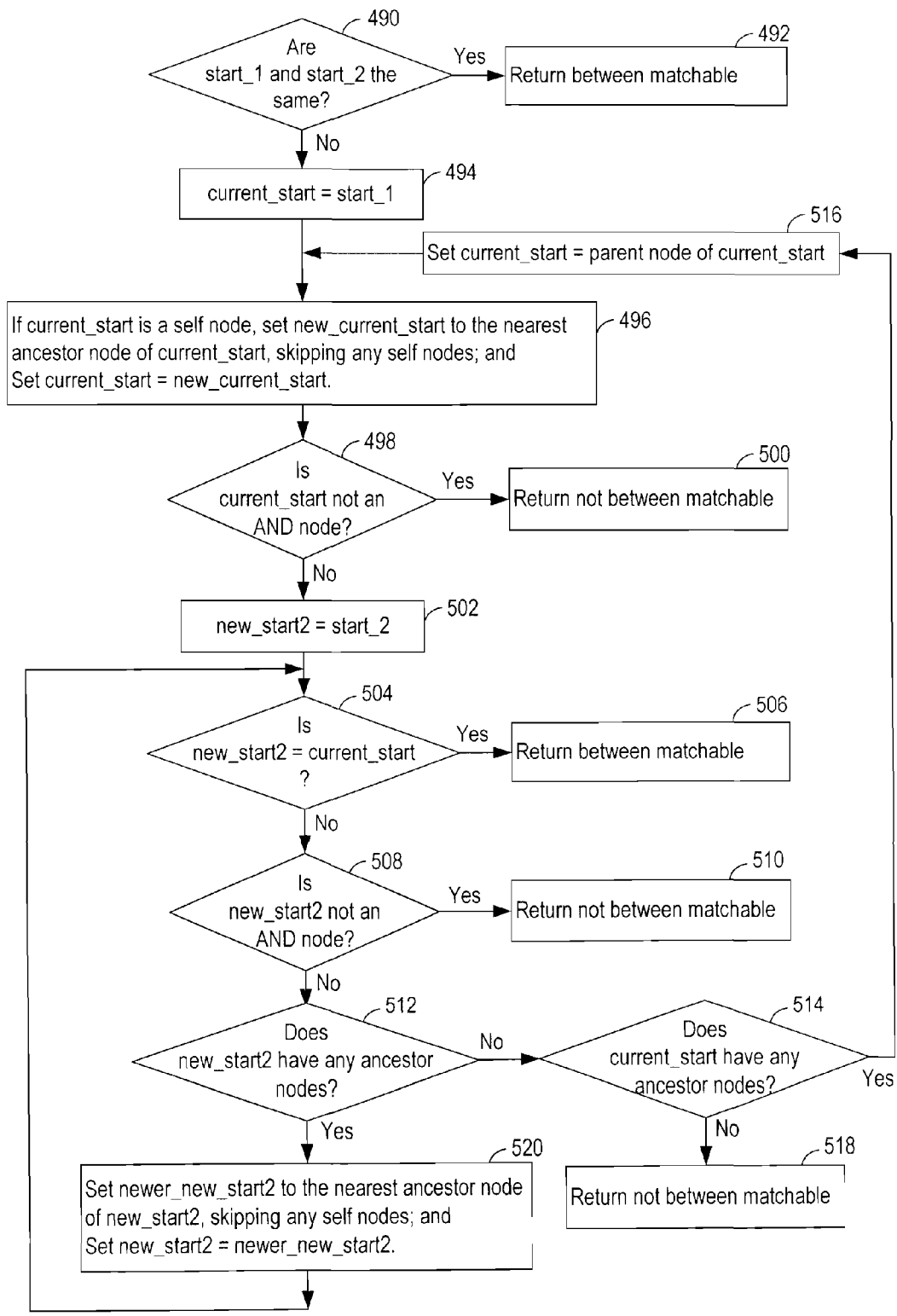
FIG. 28 depicts a flowchart of an embodiment of a least common ancestor technique to determine whether the filters of two between tuples are between matchable.

In response to a determination that the path types of the between tuples are compatible, step 476 determines whether the singleton filters of the between tuples are between matchable. Step 476 determines whether the singleton filters of the between tuples are between matchable if the singleton filters are under the same top level AND node. In various embodiments, a least common ancestor (LCA) technique is performed to determine whether the nodes of the two singleton filters of the between tuples are under the same top level AND node of the filter-less query tree. In some embodiments, an LCA module implements the LCA technique. The LCA module returns an indication of between matchable or an indication of not between matchable. The indication of between matchable is returned in response to the singleton filters of the new and selected between tuples being under the same top level AND node of the filter-less query tree and any nodes between the singleton filters and that same top level AND node being a self node or another AND node. The indication of not between matchable is returned in response to the two singleton filters of the between tuples not being under the same top level AND node of the filter-less query tree or if any nodes between the singleton filters and that same top level AND node are not either a self node or another AND node. In various embodiments, the flowchart of FIG. 28 is performed to determine whether the singleton filters are between matchable.

In response to step 476 determining that the singleton filters of the between tuples are between matchable, step 478 determines whether the signs of the singleton filters of the between tuples are opposite. The signs of the singleton filters are determined to be opposite if the comparison operator of one singleton filter is "less than" or "less than or equal" and the comparison operator of the other singleton filter is "greater than" or "greater than or equal". In some embodiments, the probe expressions of the singleton filters are also checked to determine that a range is defined, and if so, the signs of the singleton filters are determined to be opposite. In another embodiment, the signs of the singleton filters are determined to be opposite if the comparison operator of one singleton filter is "less than or equal" or "less than" and the comparison operator of the other singleton filter is also "less than or equal" or "less than" and if the probe expressions of the filter define a range. For example, the signs of the singleton filters are determined to be opposite for the following singleton filters: "2<g" and "g<9". In yet another embodiment, the signs of the singleton filters are determined to be opposite if the comparison operator of one singleton filter is "greater than or equal" or "greater than" and the comparison operator of the other singleton filter is also "greater than or equal" or "greater than" and if the probe expressions of the filter define a range.

In response to step 478 determining that the signs of the singleton filters are opposite, step 479 determines whether the path type of the between tuples filters is Self_Node or Self_Path. If so, step 479 proceeds to step 482.

In response to step 479 determining that the path type of the between tuples is not Self_Node or Self_Path, step 480 determines whether the attribute names of the singleton filters of the between tuples match. Step 480 also considers the namespace, and step 480 determines that the attribute names of the singleton filters of the between tuples match if the attribute names are the same and the attribute names are in the same namespace. In some embodiments, the data referenced by the pointers of the compare (CMP) fields of the between tuples are compared to determine whether the attribute names are the same.

In response to step 480 determining that the attribute names of the singleton filters of the between tuples match, the between tuples form a between pair and singleton filters may form a between filter. The attribute names match if the attribute names are the same. In step 482, the selected between tuple is removed from the list of unmatched between tuples. In step 484, the new between tuple is associated with the selected between tuple to form a between pair in a list of matched tuples. The singleton filters of the between tuples of the between pair are also considered to be a between pair.

In response to step 474 determining that the path types of the between tuples are not compatible, the singleton filters do not form a between filter, and step 474 proceeds to step 486. In response to step 478 determining that the signs of the singleton filters of the between tuples are not opposite, the singleton filters do not form a between filter and step 478 proceeds to step 486. In response to step 480 determining that the attribute names of the singleton filters of the between tuples do not match, the singleton filters do not form a between filter and step 480 proceeds to step 486.

Step 486 determines whether there are more between tuples in the list of unmatched between tuples to analyze. If so, step 486 proceeds via Continuator A to step 472 to select another between tuple.

In response to step 486 determining that there are no more between tuples in the list of unmatched between tuples to analyze, in step 488 the new between tuple is added to the list of unmatched between tuples.

In response to step 470 determining that the list of unmatched between tuples is empty, step 470 proceeds to step 486. Thus, if the list of unmatched between tuples is empty or if the new between tuple does not form a between pair with another between tuple, the new between tuple is added to the list of unmatched between tuples. The new between tuple may form a between pair with another between tuple in the future.

In some embodiments, when the new between tuple matches an existing unmatched between tuple, the path type (PT) field, top level AND field, compare node (CMP) field are not stored for the new between tuple thereby saving space in memory.

In various embodiments, a least common ancestor (LCA) technique is used in step 476 of FIG. 27 to determine whether the singleton filters of two between tuples are between matchable. In various embodiments, if the singleton filters of two between tuples have a least common ancestor that is an AND node and if that AND node is reached from each singleton filter only via other AND nodes and self::nodes then those singleton filters are determined to be between matchable and may form a between filter. For example, if the LCA technique is applied to the two "rating" filters of the XPath expression of FIG. 7, the LCA technique will encounter the "chef" node and determine that the two "rating" filters are not between matchable and will therefore not form a between filter.

FIG. 28 depicts a flowchart of an embodiment of the LCA technique. In various embodiments, the flowchart of FIG. 28 is implemented in step 476 of FIG. 27. In some embodiments, the flowchart of FIG. 28 is implemented in step 374 of FIG. 19. In some embodiments, an LCA module implements the LCA technique. In some embodiments, the LCA module is invoked in step 476 of FIG. 27. Variables, called start_1 and start_2 are initialized to reference the AND nodes specified in the AND field of the two different between tuples which are being evaluated. In other embodiments, start_1 and start_2 are initialized to reference the nearest AND node of the singleton filters. The LCA technique determines whether the singleton filters are under the same top level "AND" node, and therefore between matchable.

In step 490, the LCA technique determines whether start_1 and start_2 are the same. If so, the singleton filters have the same "AND" node and in step 492, the LCA technique returns between matchable. In various embodiments, the LCA technique returns an indication of between matchable.

In response step 490 determining that start_1 and start_2 are not the same, in step 494, a variable called current_start is set equal to start_1.

In step 496, if current_start is a self node, the LCA technique sets a variable called new_current_start to the nearest ancestor node of current_start, skipping any self nodes. The LCA technique identifies the nearest ancestor node of the filter-less query tree to current_start, and if that nearest ancestor node is a self node, the LCA technique identifies the next nearest ancestor node to current_start, if that next nearest ancestor node is also a self node, the LCA technique continues up the tree to retrieve ancestor nodes until the ancestor node is not a self node; and new_current_start is set equal to that ancestor node which is not a self node. The LCA technique sets current_start equal to new_current_start.

In step 498, the LCA technique determines whether current_start is not an AND node. If so, in step 500, the LCA technique returns not between matchable. In various embodiments, the LCA technique returns an indication of not between matchable.

In response to step 498 determining that current_start is an AND node, in step 502, new_start2 is set equal to start_2.

In step 504, the LCA technique determines whether new_start2 is equal to current_start. If so, in step 506, the LCA technique returns between matchable. In various embodiments, the LCA technique returns an indicator of between matchable.

In response to step 504 determining that new_start2 is not equal to current_start, in step 508, the LCA technique determines whether new_start2 is not an AND node. If so, in step 510, the LCA technique returns not between matchable.

In response to step 508 determining that new_start2 is an AND node, in step 512, the LCA technique determines whether new_start2 has any ancestor nodes. If not, in step 514, the LCA technique determines whether current_start has any ancestor nodes. If so, in step 516, current_start is set equal to the parent node of current_start, and step 516 proceeds to step 496. In response to determining that new_start2 has no ancestor nodes, step 518 returns not between matchable.

In response to step 512 determining that new_start2 has at least one ancestor node, in step 520, the LCA technique sets newer_new_start2 to the nearest ancestor node of new_start2, skipping any self nodes, and sets new_start2 equal to newer_new_start2. Step 520 proceeds to step 504.

Pseudo-code of an embodiment of an LCA technique is shown below in Table 3. The line number of each pseudo-code statement is shown in parentheses.

TABLE 3

Pseudo-code of an embodiment of the LCA technique

```
(1)   IF (start_1 = start_2)
(2)      RETURN BETWEEN MATCHABLE
(3)   ELSE
(4)      current_start = start_1
(5)   END IF
(6)   OUTER_LOOP:
(7)      If current_start is a self node, move current_start up to a new
         node, skipping self nodes
(8)      IF (current_start reaches a node that is not an AND)
(9)         RETURN NOT BETWEEN MATCHABLE
(10)     END IF
(11)     new_start2 = start_2
(12)     INNER_LOOP:
(13)        IF (new_start2 = current_start)
(14)           RETURN BETWEEN MATCHABLE
(15)        END IF
(16)        IF (new_start2 is not an AND node)
(17)           RETURN NOT BETWEEN MATCHABLE
(18)        END IF
(19)        move new_start2 up to another new_start2, skipping self nodes
(20)        GOTO INNER_LOOP
(21)     END INNER_LOOP
(22)     current_start = parent_node of current_start
(23)     GOTO OUTER_LOOP
(24)  END OUTER_LOOP
```

In the pseudo-code of Table 3, variables called start_1 and start_2 are initialized to the contents of the AND fields of a first between tuple called tuple_1 and a second between tuple called tuple_2, respectively. In the pseudo-code, lines (1) and (2) determine that if the AND fields of start_1 and start_2 are the same, then the singleton filters of the first and second between tuples are between matchable. For example this case occurs when the between tuples contain the filters of a path expression of a query such as "@attr_1>10 AND @attr_1<20", in which the filters are under the same AND node.

If start_1 and start_2 are not the same, in line (4) a new variable called current_start is initialized to start_1 and the outer loop is entered. The outer loop is implemented in lines (6) to (24).

The outer_loop (OUTER_LOOP) moves the current_start variable to obtain a new value for current_start. The inner loop (INNER_LOOP) determines if this new value of current_start lies on a path of the filter-less query tree, or alternately the query expression, from start_2 to the root.

In line (7), if current_start is a self: node, current_start is moved to a new current_start. When moving current_start, the LCA technique skips past self: nodes. In some embodiments, the filter-less query tree, and/or the input query tree, is associated with different levels such that the root node is at level 0, the next (first) child node is at level 1, the child node of the first child node is at level 2, and the nth successive child node is at level n.

In line (8), if current_start is not an AND node, the LCA technique determines that the two singleton filters of start_1 and start_2 are not connected by an AND node, and the LCA technique returns not between matchable.

Self::nodes are skipped because a query may have a path expression 210 as shown in FIG. 5. In this example, the nested filter "@attr1>2" and the outer filter "@attr1<4" are a between filter. If start_1 is initialized to the AND node in the nested portion of the path expression and start_2 is initialized to the AND node nearest to "@attr1<4" which is outside that nested portion of the path expression, then as the LCA technique moves up the filter-less query tree from start_1, the LCA technique will skip past the self nodes in line (7). For the example above, the equality test in line (13) is true and in line (14), the LCA technique returns an indicator that the singleton filters are between matchable.

For each value of current_start, the LCA technique attempts to determine if there is a path from start_2 to current_start, in which the path consists entirely of self nodes and "AND" nodes. The inner loop (INNER_LOOP) of lines (12) to (21) determines if there is such a path from start_2 to current_start. In the inner loop, the loop variable is new_start2; therefore new_start2 is initialized to start_2 before entering the inner loop in line (11).

In line (19) as new_start2 is moved, if there are no more ancestor nodes to which to move new_start2, the end of the inner loop is reached, and the LCA technique did not find a path consisting entirely of self nodes and "AND" nodes between start_2 and current_start. Therefore, the LCA technique breaks out of the inner loop. In line (22), current start is moved to its parent node, and the inner loop is repeated.

If the LCA technique finds a LCA AND node for start_1 and start_2, for which any nodes on the paths to the LCA AND node from start_1 and start_2 are only other AND nodes and self::nodes, then the singleton filters of the first and second between tuples are determined to be under the same top-level "AND", are therefore between matchable, and may form a between filter.

Various embodiments of step 376 of FIG. 19 of identifying at least one between filter will now be described. After identifying singleton filters that form between pairs, the between matching technique identifies those between pairs which form between filters, and associates at least one eligible index with the between filters.

Figure 29:
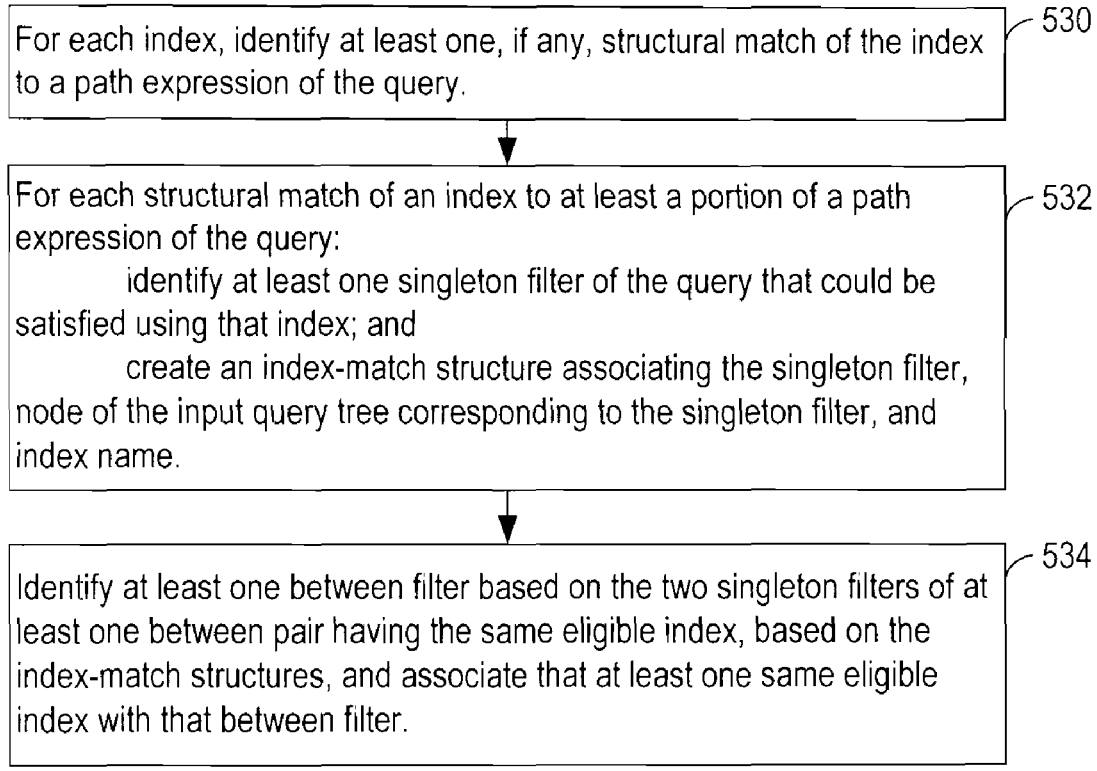
FIG. 29 depicts a flowchart of an embodiment of associating at least one index with a between filter.

FIG. 29 depicts a flowchart of an embodiment of identifying at least one between filter and associating at least one eligible index with the between filter. In various embodiments, the flowchart of FIG. 29 is performed in step 376 of FIG. 19 and step 362 of FIG. 18.

In step 530, the index matching component identifies, for each index, at least one, if any, structural match of the index to a path expression of the query. A structural match is a match between the path of the index to at least a portion of a path of the query. In various embodiments, the structural match is a match between the nodes of a path of the index to a portion of a query tree. In some embodiments, the index specifies node names which are to exactly match a node name at the same location in the path expression of the query. The index may also specify that an attribute is to be matched. In various embodiments, a wildcard "*" character is used to allow for a partial match or a match to anything. In various embodiments, to have a structural match, the index and path expression of the query have the same the path and compatible node names along that path. In some embodiments, an index matching technique of Balmin et al in U.S. patent application Ser. No. 10/698,622 is used. In various embodiments, an index matching technique described by Andrey Balmin, Fatma Ozcan, Kevin S. Beyer, Roberta J. Cochrane and Hamid Pirahesh in "A Framework for Using Materialized XPath Views in XML Query Processing", Proceedings of the 30th VLDB Conference, Toronto. Canada, 2004, is used, and incorporated by reference.

In step 532, for each structural match of an index to at least a portion of a path expression of the query, the index matching component identifies at least one singleton filter of the query that could be satisfied using that index and that index is an eligible index for the singleton filter. The index matching component creates an index-match structure associating the singleton filter, node of the filter-less query tree corresponding to the singleton filter, and index name.

The singleton filters of the between pairs in the list of between tuples may not have the same eligible index(es) because of data type considerations. Index matching considers the data type when identifying eligible index(es) for the filters. For example, if the index definition is an XPath expression such as "/a/*/b", then for a path expression of a query such as "a[y/b=10]/z/b", in step 530, an index matching technique identifies two structural matches. The two structural matches are "a[y/b]" and "a/z/b". In step 532, for each structural match, the index matching component searches for any singleton filters that could be satisfied by the index. In some embodiments, the filter-compare side of a singleton filter is also referred to as the indexable side. The probe side of a singleton filter contains the probe expression which will evaluate to a probe value. The singleton filter may have a probe value that cannot be found in the index because of a data type mismatch, or the indexable side of the filter may have a cast on it making it inappropriate for an index match. In some embodiments, if the singleton filter has a probe value that is in the index and no cast making it inappropriate for an index match, an index-match structure is created.

The index-match structure has a node field and filter field. If the node field and filter field of the index-match structure are the same as the node field and filter field of a between tuple, then the index-match structure, or alternately, a pointer to the index-match structure, is inserted into the IndexList (I) field for that between tuple. In this way, indexes that are eligible to satisfy a between filter can be identified later.

In step 534, at least one between filter is identified based on the two singleton filters of at least one between pair having at least one same eligible index, based on the index-match structures; and that same eligible index(es) is associated with that between filter. In various embodiments, the index-match structures are grouped by filter. In some embodiments, a single index-match structure is associated with a filter. In various embodiments, multiple index-match structures are associated with the filter.

Figure 30:
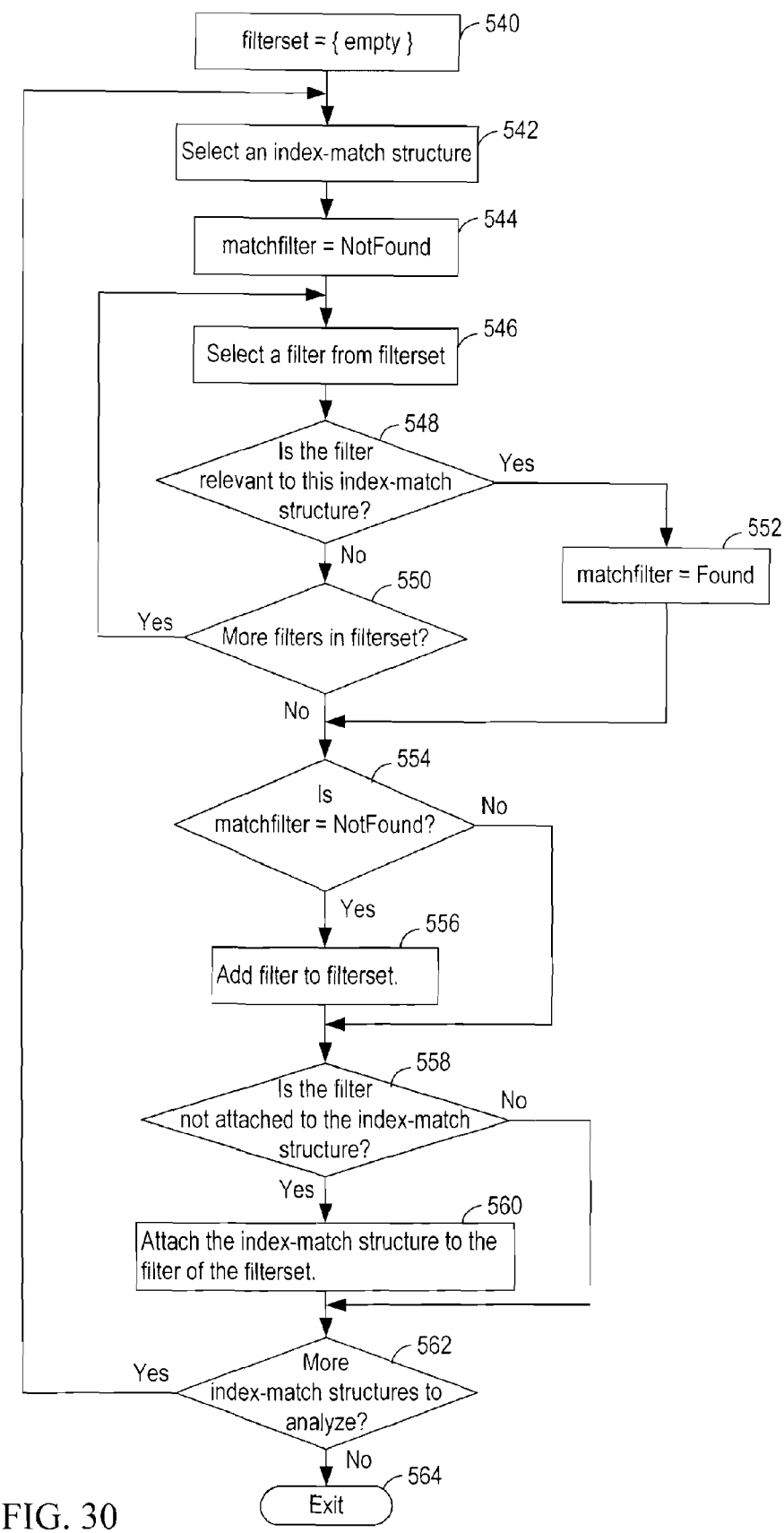
FIG. 30 depicts a flowchart of an embodiment of grouping indexes by filter.

FIG. 30 depicts a flowchart of an embodiment of grouping indexes by filter. In various embodiments, the flowchart of FIG. 30 is performed in step 534 of FIG. 29.

In step 540, the filterset is initialized to empty. The filterset is a data structure.

In step 542, an index-match structure is selected. In step 544, matchfilter is set to NotFound.

In step 546, a filter is selected from the filterset. Step 548 determines whether the filter is relevant to this index-match structure. If the selected filter is a singleton filter that is not part of a between pair, step 548 determines whether the selected filter is the same as the filter in the index-match structure. If the filters are the same, the filter is determined to be relevant to this index-match structure. The list of matched between tuples is searched for a between tuple containing the selected singleton filter, referred to as the current between tuple. The between tuple that is matched, referred to as the matched between tuple, to the current between tuple is retrieved. In addition to determining whether the index-match structure has the same filter as the filter in the filterset, the index-match structure(s) of the matched between tuple is(are) examined. The index list of the matched between tuple is retrieved. If the index list of the matched between tuple contains, or alternately points to, an index-match structure for the same index as the index-match structure of the selected filter, then the selected filter is determined to be part of a between filter and is determined to be relevant to this index-match structure; otherwise the selected filter is determined to be not relevant to the index-match structure.

In response to step 548 determining that the selected filter is not relevant to this index-match structure, step 550 determines if there are more filters in the filterset. If so, step 550 proceeds to step 546.

In response to step 550 determining that there are no more filters in the filterset, step 550 proceeds to step 554.

When the filterset is empty, step 548 determines that no filter is relevant to this index-match structure and step 550 determines that there are no more filters in the filterset and proceeds to step 554.

In response to step 548 determining that the filter is relevant to this index-match structure, in step 552, matchfilter is set to Found and step 552 proceeds to step 554.

Step 554 determines whether matchfilter is NotFound. If so, in step 556, the filter is added to the filterset. The filter is extracted from the current index-match structure and then added to the filterset. At least one of a start key and a stop key is also created and attached to a list of index-match structures. A start key and stop key is identified based on the form of the filter. For example, a filter such as "g>1" would have a start key of 1, and a filter such as "g<11" would have a stop key of 10. Each start and stop key is also part of the filterset. A between filter has both a start key and a stop key, whereas singleton filter has either a start key or a stop key. Step 554 proceeds to step 558.

In response to step 554 determining that the matchfilter is not NotFound, step 554 proceeds to step 558.

Step 558 determines whether the filter is not attached to the index-match structure. If so, in step 560, the index-match structure is attached to the filter of the filterset. If the filter is part of a between filter, a between filter indicator is set for this filter. In some embodiments, the between filter indicator is associated with the index-match structure. Step 560 proceeds to step 562.

In response to step 558 determining that the filter is not attached to the index-match structure, step 558 proceeds to step 562.

Step 562 determines whether there are more index-match structures to analyze. If so, step 562 proceeds to step 542 to select another index-match structure. In response to step 562 determining that there are not more index-match structures to analyze, in step 564, the flowchart exits.

Pseudo-code of an embodiment of the grouping of indexes by filters is shown below in Table 4. The line number of each pseudo-code statement is shown in parentheses.

TABLE 4

Pseudo-code of Grouping Indexes by Filters (1) filterset = {empty}
(2) FOR every index-match structure
(3)   matchfilter = NotFound
(4)   FOR every filter in filterset
(5)     IF (filter relevant to this index-match structure)
(6)       matchfilter = Found
(7)       break
(8)     END IF TABLE 4-continued Pseudo-code of Grouping Indexes by Filters

| (9)  | END FOR |
|------|---------|
| (10) | |
| (11) | IF (matchfilter NotFound) |
| (12) |    create a filter structure containing the filter and add it to filterset |
| (13) | END IF |
| (14) | IF (filter not attached to index-match structure) |
| (15) |    attach index-match structure to filter if it contains an index name different from that in any index-match structure previously attached to the filter |
| (16) | END IF |
| (17) | END FOR |

The pseudo-code of Table 4, above, produces the filterset, the elements of which are filters with at least one index-match structure attached to each filter having at least one eligible index. If a filter has no eligible index, no index-match structure is attached to that filter. In this description, the pseudo-code of Table 4 is referred to as the grouping pseudo-code.

In line (1) of the grouping pseudo-code of Table 4, the filterset is initialized to empty. Line (2) is the beginning of the loop which iterates through every index-match structure and attempts to attach that index-match structure to a filter. Starting at line (4), the grouping pseudo-code loops through the existing filters of the filterset to determine if the current index-match structure can be attached to a filter. The filters of the filterset are stored in a filter structure.

Line (5) determines whether the filter is relevant to the index-match structure. A filter of the filterset is determined to be relevant to the index-match structure if the filter of that index-match structure and the filter of the filterset are the same.

In line (5) of the grouping pseudo-code, in addition to determining whether the index-match structure has the same filter as the filter in filterset, the grouping pseudo-code searches the list of matched between tuples for a between tuple containing the filter; and if found examines the index-match structure(s) of the between tuple that is matched to the between tuple of the filter of the filterset. If the index list field of the matched between tuple contains, or alternately points to, the same index-match structure for the same index, then the grouping pseudo-code determines that this filter of the filterset is part of a between filter and that the filter is relevant to the index-match structure. In response to finding a relevant filter, the grouping pseudo-code breaks out of the inner loop at line (7).

At the end of the loop in line (12), if the grouping pseudo-code has not found a relevant filter, the pseudo-code creates a new filter structure containing the filter and adds the filter structure to the filterset. The start key and/or stop key is also identified and added to the filterset in line (12).

In line (14), the grouping pseudo-code determines whether the current index-match structure is to be added to the filter structure. The current index-match structure contains a name of an index, referred to as the current index name. In some cases, another index-match structure containing the current index name may already be attached to the filter of the filterset. If so, the current index-match structure is not attached to the filter. This typically occurs for between filters. For example, assume that "(attr>10" is one singleton filter of a between pair. When first processing an index-match structure for the "@attr>10" singleton filter, the index matching component determines that this singleton file is part of a between filter. Assume that the index matching component next encounters an index-match structure for "@attr<20", the other half of the between pair, the index matching component will not add this current index-match structure to the filterset.

If another index-match structure containing the current index name is not already attached to the filter of the filterset, the index-match structure having the current index name is attached to the filter of the filterset in line (15), To attach an index-match structure to a filter of the filterset, a pointer to that index-match structure is associated with the filter in the filterset. If the filter is part of a between filter, the grouping pseudo-code marks the index-match structure with a between filter indicator.

By way of example, the grouping technique of the flowchart of FIG. 30 and the pseudo-code of Table 4 will be described.

FIG. 31 depicts an exemplary path expression 570: "/a/b/c[(attr1>10 AND (attr1<20]" of a query.

FIG. 32 depicts an illustrative query tree 572 based on the path expression 570 of FIG. 31. The query tree 572 has nodes for the "a", "b", and "c" elements, 574, 576, 578, respectively, which are arranged hierarchically. The "c" node 578 has a child "AND" node 580. The "AND" node 580 has two child filter nodes 582 and 584.

In another embodiment, FIG. 32 depicts a portion of a query tree. In this embodiment, each node of a tree representing an XPath expression has four child nodes. A first child node is about the axis. A second child node is the kind of test that is being done. A third node is the root of the tree, if any. The fourth child node is the next node.

FIG. 33 depicts an illustrative filter-less query tree 592 based on the query tree 572 of FIG. 32 and the path expression 570 of FIG. 31. The filter-less query tree 592 has nodes for the "a", "b", and "c" elements, 594, 596, 598, respectively, which are arranged hierarchically. The "c" node 598 has a child "AND" node 600. The "AND" node 600 has two child nodes 602 and 604 which contain the attribute name "attr".

FIG. 34 depicts an illustrative list 610 of matched between tuples based on the exemplary path expression 570 of FIG. 31. The list of between tuples 610 comprise a first between tuple (BT1) 612 and a second between tuple (BT2) 614 which are associated with each other as a between pair.

FIG. 35 depicts illustrative between tuples 612 and 614 of the list of matched between tuples of FIG. 34. The first between tuple 612 has a node field containing a pointer 622 to the "@attr" node of the first singleton ("@attr>10") filter, a filter field containing "@attr>10" 624, an IndexList field 626, an attribute field 628 containing "Attribute", an AND field containing a pointer 630 containing a pointer to the AND node 600 of FIG. 33, and a compare field 632 of "attr".

The second between tuple 614 has a node field which contains a pointer to the @attr node of the second singleton ("@attr<20") filter, the filter field contains "@attr<20" 644, an IndexList field 646, an attribute field 648 of "Attribute", an AND field 650 that contains a pointer to the AND node 600 of FIG. 34, and a compare field 652 of "attr".

FIG. 36 illustratively depicts first and second indexes, 552 and 554, respectively. The first index 552 has an index definition of: "/a/*/c/@attr1" and the second index 554 has an index definition of "/a/b/c/@*".

FIG. 37 illustratively depicts first and second index paths, 556 and 558, of the first and second indexes, 552 and 554, respectively, of FIG. 37, using a tree representation.

Figure 38:
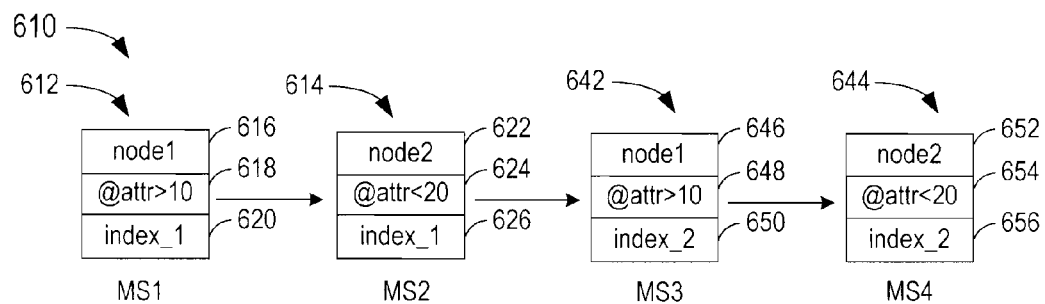
FIG. 38 illustratively depicts a list of exemplary index-match structures which are created based on the path expression of the query of FIG. 31 and the indexes of FIG. 30.

FIG. 38 illustratively depicts a list of index-match structures 610 based on the path expression 570 of FIG. 31 and the indexes 552, 554 of FIG. 36. With respect to the first index (index_1), two index-match structures, MS1 and MS2, 612 and 614, corresponding to the "@attr1>10" filter and the "@attr1<20", respectively, are created. The first index-match structure (MS1) 612 comprises a node field which refers to the "@attr" node, in this example, called "node1" 616, a filter field referencing the "@attr>10" filter 618, and an index field containing "index_1" 620. The second index-match structure (MS2) 614 comprises a node field referencing "node1" 622, a filter field referencing "@attr<20" 624, and an index field containing "index_1" 626.

Suppose that the grouping pseudo-code goes through the outer for loop with the index-match structure (MS1) for the "@attr1>10" filter. In this case, filterset is empty because this is the first time through that loop. The condition in line (11) will be true and the grouping pseudo-code creates the filter structure in line (12) and adds the filter to that filter structure of the filterset.

Figure 39:
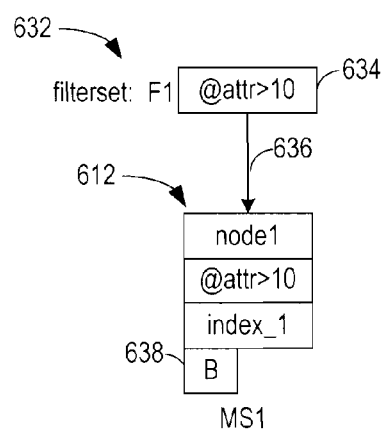
FIG. 39 depicts an exemplary filterset which contains the filter structure "F1" comprising the filter "@attr>10"

FIG. 39 depicts the illustrative filterset 632 which contains the filter structure "F1" 634 comprising the filter "@attr>10".

In line (14) of the grouping pseudo-code, the condition that the filter is not attached to the index-match structure is true because the grouping pseudo-code has not attached this newly created filter structure to the index-match structure. In line (15) the index-match structure is attached to the filter structure. In addition, the grouping pseudo-code searches for the filter in the list of matched between tuples, and in response to finding the filter, determines that this filter is part of is a between filter and marks the filter structure as a between filter. The marking may be performed in various manners. In some embodiments, the between filter mark is associated with the index-match structure that is attached to the filter structure. In other embodiments, the filter structure is marked.

In FIG. 39, the arrow 636 indicates that first matching structure, MS1 612, is attached to the filter structure 634, and the between filter mark 638 is shown.

The grouping pseudo-code processes the next index-match structure (MS2) 614 which represents the filter "@attr1<20" for index_1. At this point, the filterset is not empty, because the filterset contains the filter structure F1 634 of FIG. 39 created in the previous iteration. The filter "@attr1<20" is determined to be relevant to this index-match structure in line (5). In line (14), because the index-match structure MS2 614 has the same index as index-match structure MS1 612, which is already attached, MS2 is not attached to this existing filter F1 of the filterset. Because index-match structure MS1 of the filterset is marked as being part of a between filter, and because the current filter "@attr<20" represents the other half of the between filter based on finding the current filter in the list of matched between pairs, the current filter "@attr<20" is added to the filter F1 of the filterset. Therefore for this index-match structure no new filter structure is created in line (12) and the index-match structure MS2 624 is not attached to the filter structure for F1 634.

Referring back to FIG. 38, for index_2, the third and fourth index-match structures, MS3 and MS4, 642 and 644, are previously created for the "@attr1>10" filter and the "@attr1<20" filter, respectively. When iterating through the third index-match structure MS3 for the "@attr1>10" filter, the inner loop finds the previously created filter structure. The grouping pseudo-code determines that the filter is relevant to this index-match structure in line (5) and matchfilter is set to Found in line (6). In line (14), the grouping pseudo-code determines that this index-match structure (MS3) is not attached to the filter structure F1. In line (15), the grouping pseudo-code attaches this index-match structure (MS3) to the filter F1.

Figure 40:
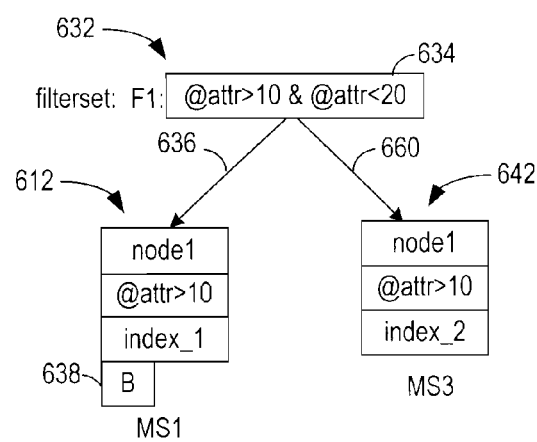
FIG. 40 depicts the exemplary filterset structure of FIG. 39 after additional processing is performed.

FIG. 40 depicts the illustrative filterset structure 632 after the above processing is performed. Filter structure F1 634 is a between filter comprising the two singleton filters of the index-match structures 612 and 614. Index-match structure MS1 612 is attached to the filter structure 634 as indicated by arrow 636. Index-match structure MS3 642 is attached to the filter structure 634 as indicated by arrow 660.

In FIG. 40, the index-match structure (MS3) 642 is not marked as a between filter because index-match structure (MS1) is already marked as a between filter.

When iterating through the grouping pseudo-code to process the next index-match structure (MS4) 644 (FIG. 38) which has an "@attr1<20" filter, the grouping pseudo-code finds that the same filter in the filter structure F1 of the filterset. In line (5), the grouping pseudo-code finds this filter to be relevant. In line (14), the grouping pseudo-code determines that the filter structure already has the "@attr1<20" filter attached and does not attach that singleton filter to the filter in the filter structure. The grouping pseudo-code also determines that an index-match structure for index_2 is already attached, therefore the grouping pseudo-code does not attach the current index-match structure (MS4) 644 (FIG. 38).

In another example, assume that the grouping pseudo-code now gets a new index-match structure which matches "@attr1>10" but not "@attr1<20". In line (5) the grouping pseudo-code will determine that this new index-match structure is not relevant to the existing filter structure. In line (5), the grouping pseudo-code performs a lookup based on the indexlist field of the matched between tuples of the list of matched between tuples. The grouping pseudo-code determines that the new index-match structure is in one of the between tuples and not in an index-match structure of the other between tuple of the between pair. Therefore, the grouping pseudo-code determines that the filter of the new index-match structure is not part of a between filter and is therefore not relevant (line (5)). A new filter structure F2 for the filter of the new index-match structure is created in line (12) and the new filter structure F2 is inserted into the filterset. The condition, that the filter is not attached to the index-match structure, in line (14) is true and this new index-match structure is attached to the new filter structure F2.

Embodiments of distributive between matching will now be described. Various embodiments of distributive between matching identify at least one between filter in a query having an arbitrary mixture of conjunctions and disjunctions. Some embodiments of distributive between matching identify at least one between filter in a query that comprises at least one path expression having an arbitrary mixture of "AND" and "OR" operators or nodes.

In one embodiment, the rewrite transformer rewrites a path expression of the query into its disjunctive normal form. A clause comprises at least one singleton filter, and typically comprises multiple singleton filters. A disjunctive normal form is a set of clauses connected by an "OR" operator(s); and within each individual clause that has multiple singleton filters, the singleton filters are connected by only an "AND" operator(s).

The following illustratively depicts an example of a path expression comprising a set of clauses in the disjunctive normal form:

(A AND B AND C) OR (D AND E) OR (F).

In the above path expression, A, B, C, D, E and F represent singleton filters. The path expression above has three clauses that are connected by an "OR" operator. The first clause is (A AND B AND C). The second clause is (D AND E). The third clause is (F). Within the first and second clauses, the singleton filters are connected only by the "AND" operator. The third clause only has one singleton filter F.

Once a path expression of the query is converted into the disjunctive normal form, the between matching technique described above can be applied to each of the individual clauses to identify any between filters. However, rewriting an arbitrary path expression of a query into its equivalent disjunctive normal form is expensive, in terms of resources consumed and execution time, Therefore, there is a need to identify a between filter in arbitrary path expression of a query without rewriting the path expression into its equivalent disjunctive normal form.

Figure 41:
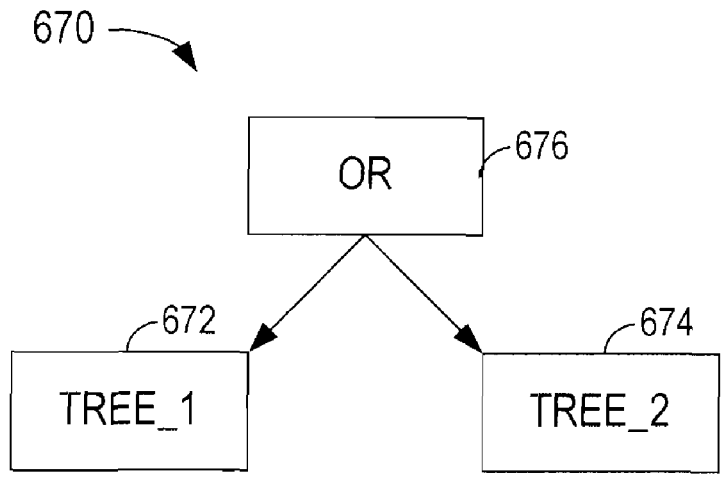
FIG. 41 depicts an illustrative arbitrary tree of a query which has two sub-trees, TREE_1 and TREE_2, respectively, connected by an "OR" node.

FIG. 41 depicts an illustrative arbitrary tree 670 representing a path expression of a query. The path expression has two sub-trees, TREE_1 and TREE_2, 672 and 674, respectively, connected by an "OR" node 676. If a first filter is selected from TREE_1 672 and a second filter is selected from TREE_2 674, it is not possible that the first filter and the second filter will be connected by an "AND" node if the entire query tree 670 is rewritten into the disjunctive normal form. TREE_1 672 is written in disjunctive normal form as follows:

$$\bigcup_{i=1}^{TREE\_1 clause\ func(i)} \bigcap_{j=1} filter_j^i \quad \text{(Eq. 1)}$$

In Equation 1 (Eq. 1) above, TREE_1clause represents the number of clauses of TREE_1 that are connected by "OR" nodes. For the ith clause, there are func(i) number of filters connected by an "AND" node.

TREE_2 is written in disjunctive normal form as follows:

$$\bigcup_{k=1}^{TREE\_2 clause\ func2(k)} \bigcap_{m=1} filter_m^k \quad \text{(Eq. 2)}$$

In Eq. 2 above, TREE_2 clause represents the number of clauses of TREE_2 that are connected by "OR" nodes. For the kth clause, there are func2(k) number of filters connected by an "AND" node. Therefore, the entire tree can be rewritten in disjunctive normal form as follows:

$$\left\{\bigcup_{i=1}^{TREE\_1 clause\ func(i)} \bigcap_{j=1} filter_j^i\right\} \cup \left\{\bigcup_{k=1}^{TREE\_2 clause\ func2(k)} \bigcap_{m=1} filter_m^k\right\} \quad \text{(Eq. 3)}$$

Eq. 3 is in disjunctive normal form. As shown by Eq. 3, the filters from the two sub-trees, TREE_1 and TREE_2, cannot appear together in the same clause connected by "AND" node.

Figure 42:
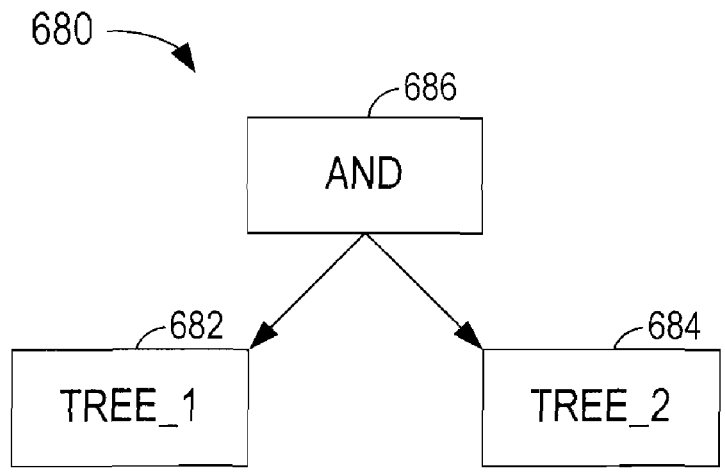
FIG. 42 depicts an illustrative arbitrary tree of a query which has two sub-trees, TREE_1 and TREE_2, respectively, connected by an "AND'" node.

FIG. 42 depicts an illustrative arbitrary tree 680 representing a path expression of a query that has two sub-trees, TREE_1 and TREE_2, 682 and 684, respectively, connected by an "AND" node 686. If a first filter is selected from TREE_1 682 and a second filter is selected from TREE_2 684, it is possible that the first filter and the second filter will be connected by an "AND" node if the entire query tree 680 is rewritten into the disjunctive normal form.

Assume that TREE_1 682 and TREE_2 684 of FIG. 42 have the disjunctive normal forms as described above in equations Eq. 1 and Eq. 2. The entire tree of FIG. 42 can be described using Eq. 4 below, which is not in disjunctive normal form:

$$\left\{\bigcup_{i=1}^{TREE\_1 clause\ func(i)} \bigcap_{j=1} filter_j^i\right\} \cap \left\{\bigcup_{k=1}^{TREE\_2 clause\ func2(k)} \bigcap_{m=1} filter_m^k\right\} \quad \text{(Eq. 4)}$$

A $filter_j^i$ from TREE_1 682 and $filter_m^k$ from TREE_2 684 can be re-distributed. Thus, any filter from TREE_1 682 and any filter from TREE_2 684 will be connected by an "AND" node in the re-written disjunctive normal form for the entire tree.

In various embodiments, the between matching technique described above is modified to perform distributive between matching. In various embodiments, the "AND" field of the between tuple is also used to store a pointer to an "OR" node, and a operator type field is added to the between tuple that indicates whether the "AND" field contains a pointer to an "AND" node or a pointer to an "OR" node.

Figure 43:
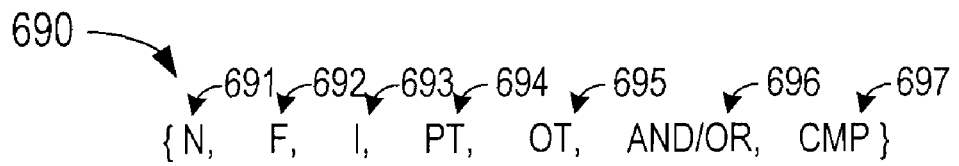
FIG. 43 depicts an embodiment of a between tuple used in various embodiments of distributive between matching.

FIG. 43 depicts an embodiment of a between tuple 690 used in various embodiments of distributive between matching. The fields are node (N) 691, filter (F) 692, list of indexes (I) 693, path type (PT) 694, operator type (OT) 695, pointer to an "AND/OR" node (AND/OR) 696, and compare (CMP) 697.

The pre-order traversal is modified to include both "AND" and "OR" nodes. In the flowchart of FIG. 26, step 454 creates a new between tuple that also comprises the operator type field 695, and the "AND/OR" field 696 of FIG. 43, rather than an "AND" field. In step 456 of FIG. 26, if the parent node of node N is an "OR" node, the "AND/OR" field is populated with the pointer to the "OR" node and the operator type field 695 is populated with an "OR" indicator that indicates that the "AND/OR" field 696 contains a pointer to an "OR" node. If the parent node of node N is an "AND" node, the "AND/OR" field is populated with the pointer to the "AND" node and the operator type field 695 is populated with an "AND" indicator that indicates that the "AND/OR" field 696 contains a pointer to an "AND" node.

The LCA technique of FIG. 28 and of the LCA pseudo-code of Table 3 are modified. The LCA technique for distributive between matching is also referred to as a distributive LCA technique.

Figure 44A:
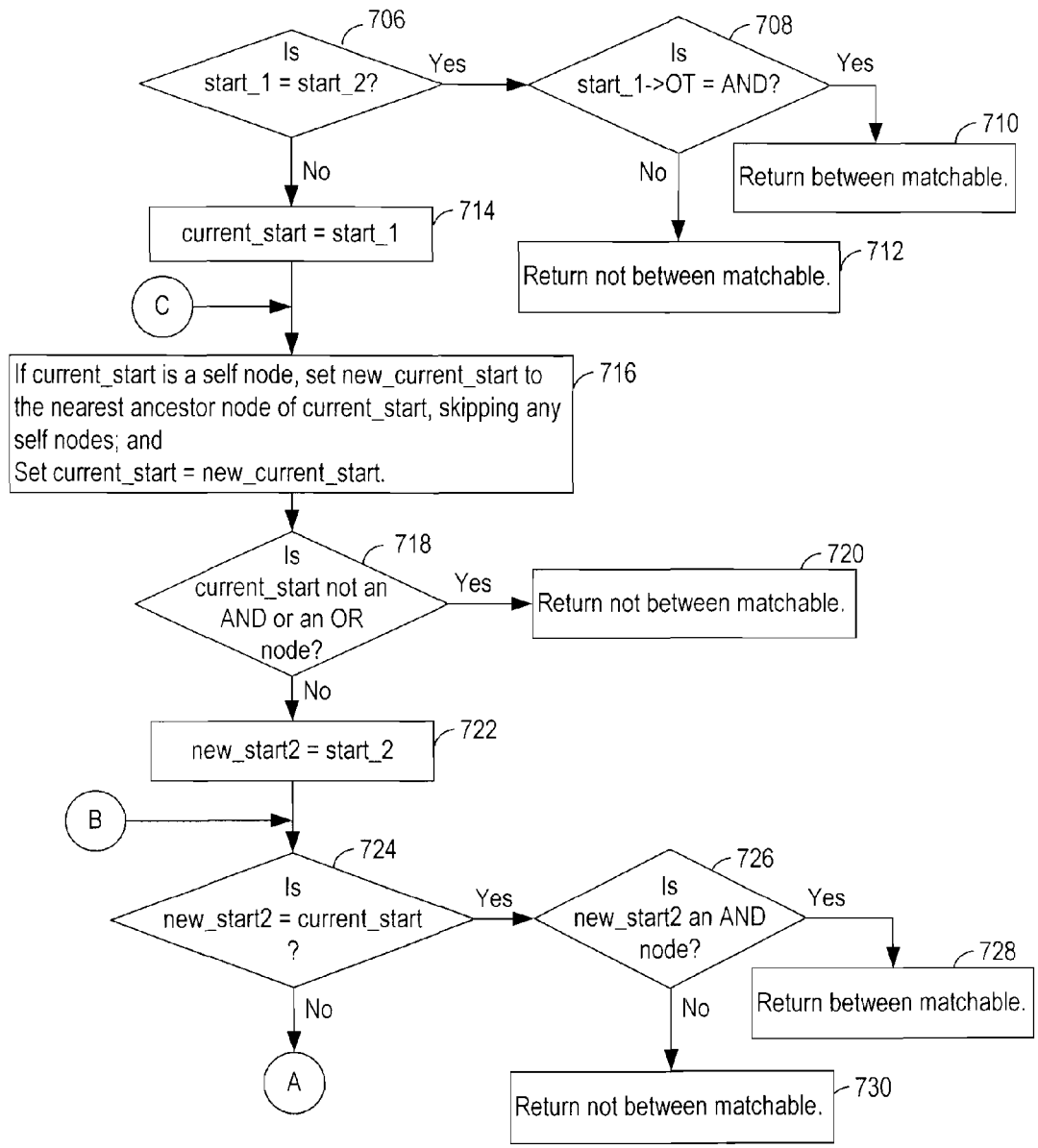
FIG. 44 comprises FIGS. 44A and 44B which collectively depict a flowchart of an embodiment of distributive between filter identification.
Figure 44B:
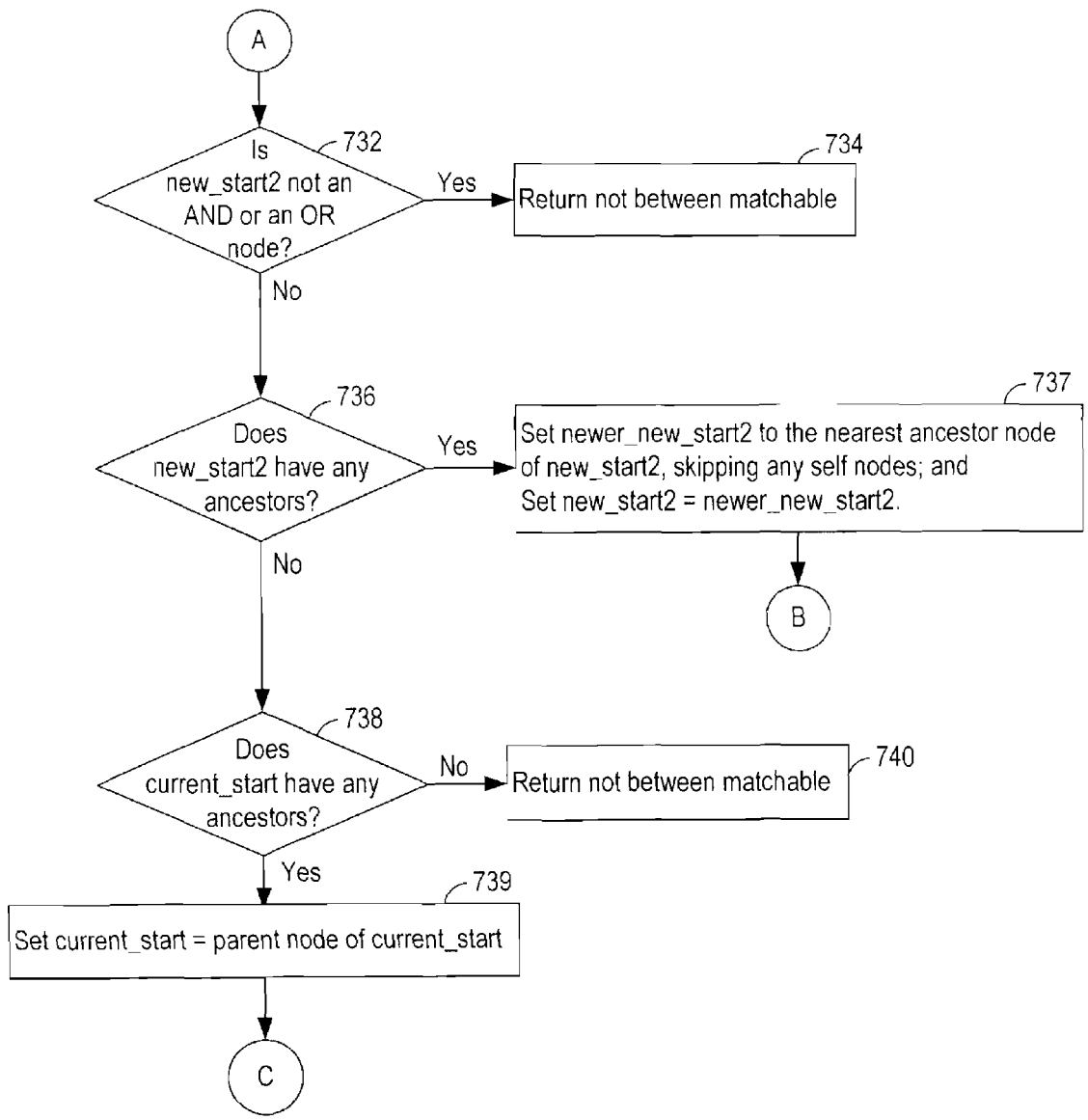

FIG. 44 comprises FIGS. 44A and 44B which collectively depict a flowchart of an embodiment of the distributive LCA technique. In some embodiments, the flowchart of FIG. 44 is performed in step 476 of FIG. 27. Prior to starting the flowchart of FIG. 44, the variables start_1 and start_2 are initialized with the contents of the AND/OR field of two between tuples having singleton filters that are being analyzed.

Step 706 determines whether start_1 is equal to start_2. If so, step 708 determines whether the operator type field (OT) of start_1 indicates "AND". If so, in step 710, between matchable is returned. If not, in step 712, not between matchable is returned.

In response to step 706 determining that start_1 is not equal to start_2, in step 714, current_start is set equal to start_1.

In step 716, if current_start is a self node, new_current_start is set to the nearest ancestor node of current_start, skipping any self nodes; and current_start is set equal to new_current_start.

Step 718 determines whether current_start is not an "AND" or an "OR" node. If so, step 720 returns not between matchable.

In response to step 718 determining that current_start is an "AND" or an "OR" node, in step 722, new_start2 is set equal to start_2.

Step 724 determines whether new_start2 is equal to current_start. If so, step 726 determines whether new_start2 is an "AND" node. If so, in step 728, between matchable is returned. If step 726 determines that new_start2 is not an "AND" node, in step 730, not between matchable is returned.

In response to step 724 determining that new_start2 is not equal to current_start, step 724 proceeds via Continuator A to step 732 of FIG. 44B.

Step 732 of FIG. 44B determines whether new_start2 is not an AND or an OR node. If so, in step 734, not between matchable is returned.

In response to step 732 determining that new_start2 is an AND or an OR node, step 736 determines whether new_start2 has any ancestors. If so, in step 737, newer_new_start2 is set to the nearest ancestor node of new_start2, skipping any self nodes; and new_start2 is set equal to newer_new_start2. Step 737 proceeds via Continuator B to step 716 of FIG. 44A.

In response to step 736 determining that new_start2 has no ancestors, step 738 determines whether current_start has any ancestors. If so, in step 739, current_start is set equal to the parent of current_start, and step 739 proceeds via Continuator C to step 716 of FIG. 44A. In response to step 738 determining that current_start has no ancestors, in step 740 not between matchable is returned.

In an embodiment of the distributive LCA technique, the LCA pseudo-code of Table 3 is modified to accommodate an OR node. Table 5, below, depicts pseudo-code of an embodiment of a distributive between matching technique. In various embodiments, the start_1 and start_2 variables are initialized with "AND/OR" fields associated with the singleton filters of two between tuples.

TABLE 5

Pseudo-code of an embodiment of a modified LCA technique for distributive between matching

```
(1)   IF (start_1 = start_2 )
(2)     IF (start1 -> OT = AND)
(3)       RETURN BETWEEN MATCHABLE
(4)     ELSE
(5)       RETURN NOT BETWEEN MATCHABLE
(6)     END IF
(7)   ELSE
(8)     current_start = start_1
(9)   END IF
(10)  OUTER_LOOP :
(11)    if current_start is a self node, move up from current_start
          to a new current_start skipping past self nodes
(12)    IF (current_start reaches a node that is not an AND or OR)
(13)      RETURN NOT BETWEEN MATCHABLE
(14)    END IF
(15)    new_start2 = start_2
(16)    INNER_LOOP :
(17)      IF (new_start2 = current_start)
(18)        IF (new_start2 = an AND node)
(19)          RETURN BETWEEN MATCHABLE
(20)        ELSE
(21)          RETURN NOT BETWEEN MATCHABLE
(22)        END IF
(23)      END IF
(24)      IF (new_start2 is not an AND or OR)
(25)        RETURN NOT BETWEEN MATCHABLE
(26)      END IF
(27)      move new_start2 up to another new_start2, skipping past
          self nodes
(28)      GOTO INNER_LOOP
(29)    END INNER_LOOP
(30)    current_start = parent_node of current_start
(31)    GOTO OUTER_LOOP
(32)  END OUTER_LOOP
```

In some embodiments, the filter-compare expression of the singleton filters of a between filter comprise a function. For example, the path expression "/a[xs:integer(@z)>1 and xs:integer(@z)<]" would be identified as a between filter. The function is "integer( )", and filter compare expression contains an attribute "z". In various embodiments, this expression is represented with two separate filters [$ref1>1] and [$ref2<10], where ref1 and ref2 are references to the first and second "@z", respectively. Various embodiments of the present invention identify this expression as a between filter because both filters reference attributes, have the same least common ancestor "AND" node, and have the same function.

Various embodiments of between matching may also with materialized views instead of indexes. Between matching may be used in materialized view matching to match a query to a materialized view which is used to process the query.

Between filters may have different forms. Some embodiments of the present invention identify between filters in views and/or queries and normalize the between filters to a predetermined form.

In an alternate embodiment, an XML query contains an explicit between predicate in a path expression. For example, an explicit between predicate may be implemented as (@attr Between (lower limit) and (upper limit)) where between "@attr" is an attribute. Alternately, a self::node may be specified rather than an attribute. However other embodiments of an explicit between predicate may be implemented. Various embodiments of index matching may also be used to identify at least one index that will satisfy the explicit between filter. In some embodiments, the explicit between filter is added to the filterset.

Various embodiments of generating index plans will now be described. In some embodiments, index plans are generated for path expressions of XML queries. In other embodiments, index plans are generated conventional queries of non-XML data such as SMALLINT, INTEGER, DECIMAL, FLOAT, DATE, TIME, TIMESTAMP, CHAR and VARCHAR. In yet other embodiments, index plans are generated for a query of a combination of XML data in an XML column and data in a column that contains non-XML data.

Various embodiments of the present invention perform distributive between matching without rewriting the path expression(s) of the query into the disjunctive normal form. If a path expression of a query is not in the disjunctive normal form, it may be difficult for the optimizer to determine whether an index plan will not omit any qualified data from the query result. In various embodiments, an index plan is generated based on the eligible index(es) that satisfy the filters of the path expression which produces a superset comprising the data which is qualified by the original path expression and which upon further evaluation that superset will produce the query result. In this way, qualified data will not be omitted from the query result.

For a path expression in the disjunctive normal form, at least one index satisfying one of the filters of each of the clauses of the path expression can be used to generate an index plan. For example, a path expression such as (A AND B AND C) OR (D AND E) OR (F) is in the disjunctive normal form and has three clauses. The first clause is (A AND B AND C). The second clause is (D AND E). The third clause is (F). If there is at least one index satisfying either A or B or C of the first clause, an index plan can be generated for the first clause. If there is at least one index satisfying either D or E of the second clause, an index plan can be generated for the second clause. If there is at least one index satisfying F of the third clause, an index plan can be generated for the third clause. Because there is at least one an index that can be used to generate an index plan for each clause of the path expression of the query, an index plan can be generated to process the query or at least a portion of the query.

Consider an expression tree, P, for example, of a query, whose leaf nodes are filters and the internal nodes are either "AND" or "OR". In some embodiments, the expression tree represents a path expression. In other embodiments, the expression tree P represents a non-path expression of a query. In various embodiments, the optimizer generates an index plan for the expression tree P if and only if all the index matches that are identified for the singleton filters along with all the index matches for the between filters can be combined to generate a superset comprising the data that is qualified by the given expression tree P.

In various embodiments, a relaxed disjunctive normal form is computed, rather than rewriting the expression tree P to its equivalent disjunctive normal form. In some embodiments, the relaxed disjunctive normal form is computed in terms of rows qualified. In various embodiments, the relaxed disjunctive normal form is computed in terms of documents qualified. In some embodiments, the relaxed disjunctive normal form is computed in terms of nodes qualified.

For an expression tree P, let the disjunctive normal form of the expression P be given by Eq. 5 as follows:

$$\bigcup_{i=1}^{m} C_i \text{ where each of the } C_i \text{ contains only "AND"s.} \qquad (Eq.\ 5)$$

A relaxed disjunctive normal form for the expression P is given by Eq. 6 as follows:

$$\bigcup_{j=1}^{n} \tilde{C}_j \text{ where } \forall\ C_i \exists\ \tilde{C}_j \text{ such that } C_i \subseteq \tilde{C}_j. \qquad (Eq.\ 6)$$

For each clause $C_i$ in the original disjunctive normal form of Eq. 5, there is at least one clause $\tilde{C}_j$ in the relaxed disjunctive normal form of Eq. 6 such that the data qualified by $\tilde{C}_j$ form a superset of the data qualified by $C_i$. Thus the relaxed disjunctive normal form produces a superset of data qualified by the expression P or its equivalent disjunctive norm form. For example, an expression whose disjunctive normal form is as follows:

(A AND B AND C) OR (D AND E) or (F)   (Eq. 7)

has a relaxed disjunctive normal form of:

(A AND B) OR C OR (D AND E) or (F).   (Eq. 8)

The relaxed disjunctive normal form of the original expression of Eq. 8 is in the disjunctive normal form, except that expression of Eq. 8 is not the exact disjunctive normal form of the original expression of Eq. 7. Every clause in the exact disjunctive normal form of the example of Eq. 7 is covered by one or more clauses in the relaxed disjunctive normal form of Eq. 8.

Given that $$\bigcup_{j=1}^{n} \tilde{C}_j$$

is also a disjunctive normal form, an index plan that produces a superset of data which includes all data qualified by the original expression can be generated.

Let $\{f_i\}$ be the set of singleton filters of the expression tree or expression P. The relaxed disjunctive normal form of P is computed based on the expression given by Eq. 9 as follows:

$$\bigcup_{i=1}^{n} f_i \qquad (Eq.\ 9)$$

The relaxed disjunctive normal expression provided by the relaxed disjunctive normal form of Eq. 9 has no identified between filters and identified indexes for the between filters, and an index plan based on the expression in the relaxed disjunctive normal form of Eq. 9 may produce significantly more data than the original query will qualify.

In various embodiments, starting with an expression in the relaxed disjunctive normal form of Eq. 9, the filters of the relaxed disjunctive normal expression are grouped or merged to form larger clauses in stages, and the larger clauses remain in the relaxed disjunctive normal form at every stage. In various embodiments, the merging stops when no more merging can be done. In some embodiments, the merging stops when there is no reduction in cost from additional merging.

In the disjunctive normal form of Eq. 5, a filter $f_i$ may belong to multiple clauses. In various embodiments, in the relaxed disjunctive normal form, a filter $f_i$ is restricted to belonging to only one clause. The initial relaxed disjunctive normal form of the expression in accordance with Eq. 9 has the property that each filter $f_i$ belong to only one clause.

Because the relaxed disjunctive normal form of the original expression is refined in successive stages and the individual clauses of the relaxed disjunctive normal form change, various embodiments take a filter oriented view and use a partition class. A partition class $p_j$ comprises filters $f_j$'s all of which belong to one clause in the relaxed disjunctive normal form. For the initial relaxed disjunctive normal form of Eq. 9, a partition class for a filter $f_i$ is a singleton containing the filter $f_i$ itself. Therefore, initially Partition($f_i$) $\{f_i\}$.

Figures 45, 46:
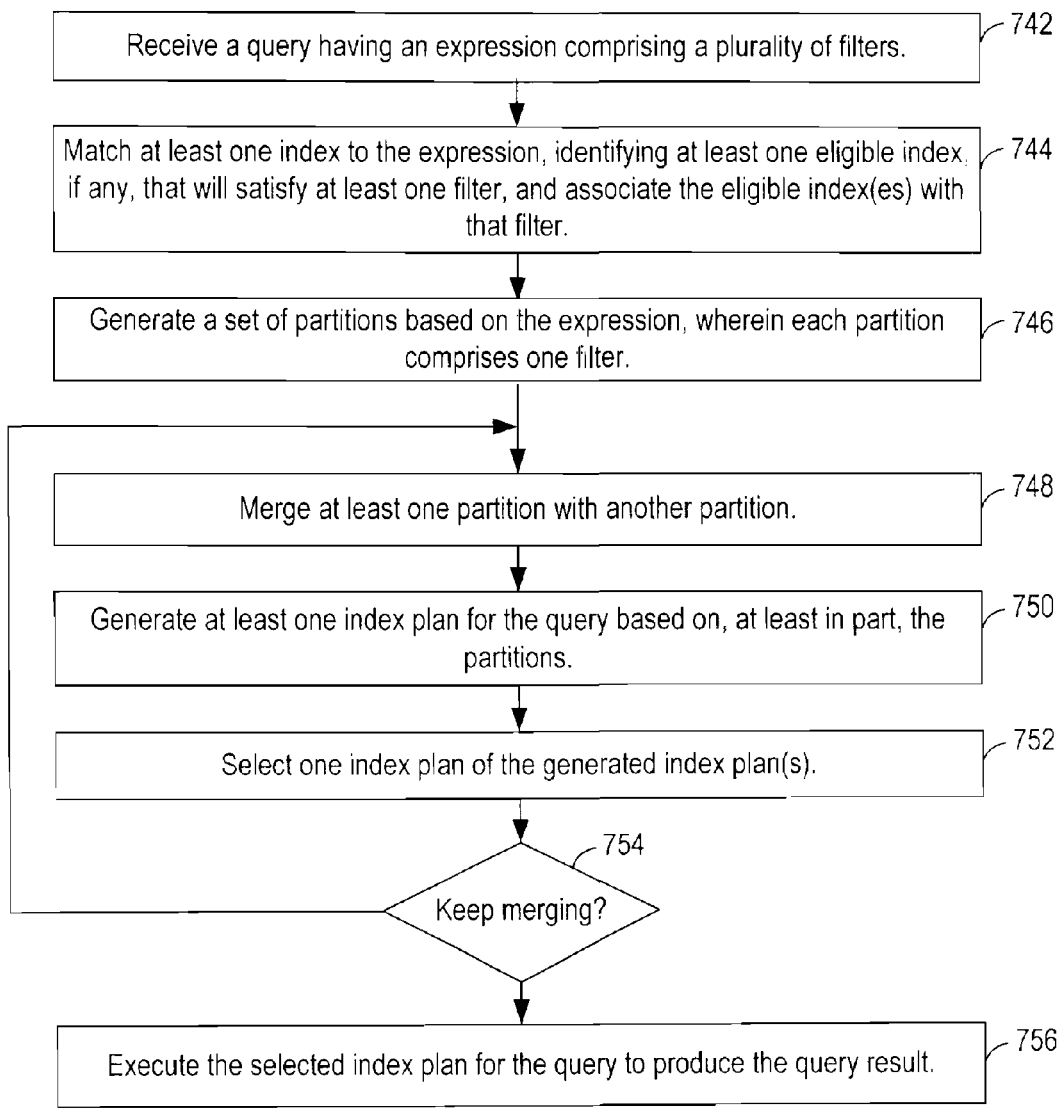
FIG. 45 depicts an embodiment of criterion for merging two partition classes.
FIG. 46 depicts a high-level flowchart of processing a query based on a relaxed disjunctive normal form.

FIG. 45 depicts an embodiment of a criterion 741 for merging two partition classes. The criterion for merging two partition classes $p_i$ and $p_j$ is also shown below in equation 10 as follows:

$$\forall f_i \epsilon p_i \text{ and } f_j \epsilon p_j,\ LCA(f_i, f_j) \text{ is an AND node} \qquad (Eq.\ 10)$$

Based on Eq. 10, for each filter $f_1$ belonging to partition $p_i$ and filter $f_j$ belonging to partition $p_j$, partitions $p_i$ and $p_j$ are merged if the least common ancestor of $f_i$ and $f_j$ is an AND node. The merging criterion of Eq. 10 maintains the property that if an expression is in the relaxed disjunctive normal form prior to merging, the resulting merged expression remains in the relaxed disjunctive normal form after merging if the partitions that are merged satisfy the condition in Eq. 10. The merging criterion of Eq. 10 also maintains the property that a filter can belong to one and only one partition class.

FIG. 46 depicts a high-level flowchart of processing a query based on the relaxed disjunctive normal form. In step 742, the query processor receives a query having an expression comprising a plurality of filters. In some embodiments, the query is an XML query having a path expression. In other embodiments, the query is not an XML query, and the expression is not a path expression.

In step 744, the index matching component matches at least one index to the expression, identifying at least one eligible index, if any, that will satisfy at least one filter, and associates the eligible index(es) with that filter. In some embodiments, the index matching component also identifies at least one between filter and at least one eligible index for a between filter.

In step 746, the optimizer generates a set of partitions based on the expression, wherein each partition comprises one filter. In various embodiments, the set of partitions comprises only the singleton filters of the query in accordance with Eq. 9. In an alternate embodiment, the set of partitions comprises both between filters and non-between singleton filters, wherein a distinct between filter belongs to a distinct partition.

In step 748, the optimizer merges at least one partition with another partition.

In step 750, the optimizer generates at least one index plan for the query based on, at least in part, the partitions. In some embodiments, a cost is calculated for each index plan.

In step 752, the optimizer selects one index plan of the generated index plan(s). In some embodiments, the lowest cost index plan is selected.

In step 754, the optimizer determines whether to keep merging. The optimizer will stop merging if there is only one partition. In some embodiments, the optimizer will stop merging if there is no further reduction in the cost of the generated index plans. In response to, in step 754, the optimizer determining to keep merging, the optimizer proceeds to step 748.

In response to, in step 754, the optimizer determining not to keep merging, in step 756, the query processor executes the selected index plan to produce a query result.

Figure 47A:
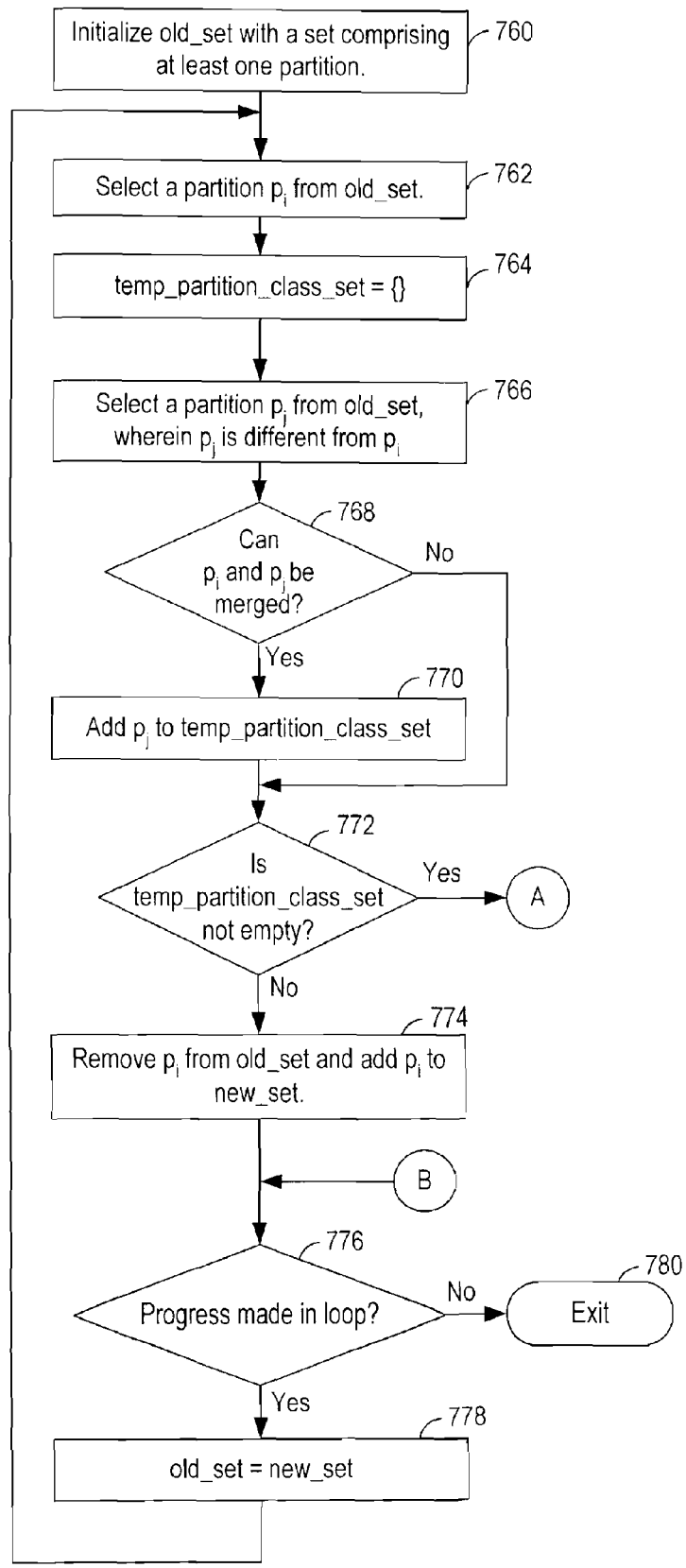
FIG. 47 comprises FIGS. 47A and 47B which collectively depict a flowchart of an embodiment of generating an index plan based on the relaxed disjunctive normal form.
Figure 47B:
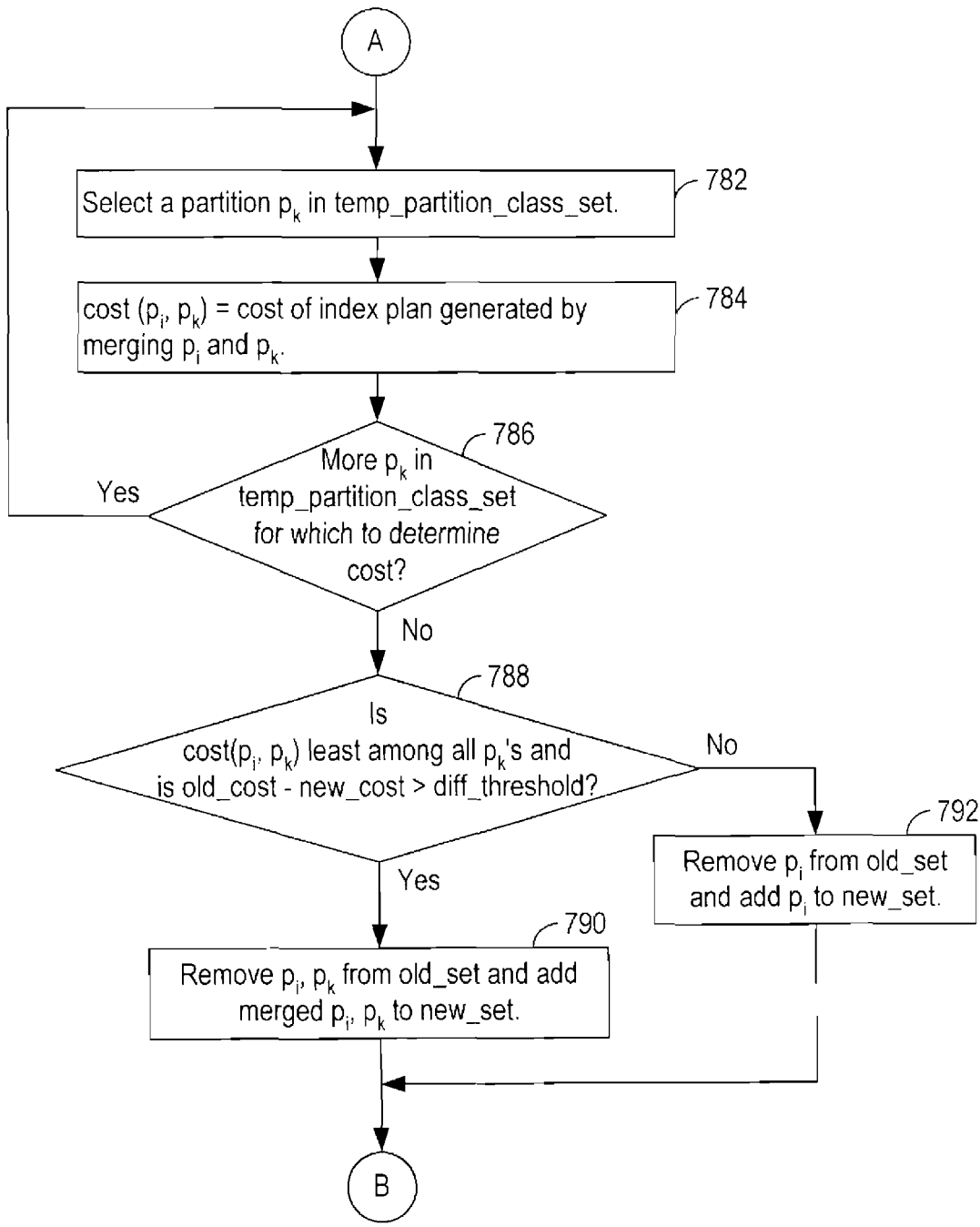

FIG. 47 comprises FIGS. 47A and 47B which collectively depict a flowchart of an embodiment of generating an index plan based on the relaxed disjunctive normal form. In various embodiments, the flowchart of FIG. 47 is implemented in the optimizer 176 of FIG. 3, and in some embodiments, step 198 of FIG. 4, and in various embodiments, steps 746 to 754 of FIG. 46.

In step 760, old_set is initialized with a set of partitions. In some embodiments, each partition comprises one singleton filter. In other embodiments, at least one partition comprises a between filter. In some embodiments, step 760 corresponds to step 746 of FIG. 46.

In step 762, a partition $p_i$ is selected from old_set.

In step 764, temp_partition_class_set is set to empty.

In step 766, a partition $p_j$ is selected from old set, wherein $p_j$ is different from $p_i$.

Step 768 determines whether partitions $p_i$ and $p_j$ are mergeable. In various embodiments, the criterion of FIG. 45 which is also shown in Eq. 10 is applied to determine whether partitions $p_i$ and $p_j$ are mergeable. In various embodiments, the distributive between identification technique of FIG. 44, or alternately, the pseudo-code of Table 5, is used to determine whether a between tuple comprising a filter from partition $p_i$ and a between tuple comprising a filter from partition $p_j$ have a least common ancestor that is an "AND" node. If the between tuples comprising the filters are determined to be between matchable, the filters of the partitions are determined to have a least common ancestor that satisfies the criterion of FIG. 45 and are therefore mergeable.

In some embodiments, the LCA technique of FIG. 28 is used to determine whether partitions $p_i$ and $p_j$ are mergeable. The variables start_1 and start_2 are initialized to point to the nearest ancestor AND node of a filter of $p_i$ and a filter of $p_j$, respectively, and the LCA technique is performed. The filters associated with start_1 and start_2 are determined to have a least common ancestor that satisfies the criteria of FIG. 45 in response to a determination of between matchable, and are therefore mergeable. The filters associated with start_1 and start_2 are determined to not have a least common ancestor that satisfies the criteria of FIG. 45 in response to a determination of not between matchable, and are therefore not mergeable.

In response to step 768 determining that partitions $p_i$ and $p_j$ are mergeable, in step 770, partition $p_j$ is added to temp_partition_class_set, and step 770 proceeds to step 772.

In response to step 768 determining that partitions $p_i$ and $p_j$ are not mergeable, step 768 proceeds to step 772.

Step 772 determines whether temp_partition_class_set is not empty. If not, in step 774, partition $p_i$ is removed from old_set, and $p_i$ is added to new_set.

Step 776 determines whether progress is made in the loop. In some embodiments, step 776 determines that progress is made if new_set is not empty. If step 776 determines that progress is made in the loop, in step 778, old_set is set equal to new_set, and step 778 proceeds to step 762.

In response to step 776 determining that progress is not made in the loop, in step 780, the flowchart exits.

In response to step 772 determining that temp_partition_class_set is not empty, step 772 proceeds via Continuator A to step 782 of FIG. 47B.

In FIG. 47B, in step 782, a partition $P_k$ in the temp_partition_class_set is selected. In step 784, the optimizer calculates a cost($p_i$, $P_k$) of an index plan that is generated by merging $p_i$ and $P_k$.

Step 786 determines whether there is at least one more partition $P_k$ in temp_partition_class_set for which to determine the cost. If so, step 786 proceeds to step 782.

In response to step 786 determining that are no more $P_k$ in temp_partition_class_set for which to determine the cost, step 788 determines whether the cost($p_i$, $P_k$) is the least among all $p_k$'s and whether (old_cost−new_cost) is greater than a difference threshold (diff_threshold). If so, in step 790, $p_i$ and $P_k$ are removed from old_set, and merged $p_i$, $P_k$ is added to new_set. Step 790 proceeds via Continuator B to step 776 of FIG. 47A.

In response to step 788 determining that the cost($p_i$, $P_k$) is not the least cost among all $P_k$'s or that (old_cost−new_cost) is not greater than a difference threshold (diff_threshold), in step 792, $p_i$ is removed from old_set, and $p_i$ is added to new_set. Step 792 proceeds via Continuator B to step 776 of FIG. 47A.

In some embodiments, in the first iteration, the partitions which contain the singleton filters associated with any previously identified between filters are merged, and no cost is calculated. In addition, any non-between singleton filters are attempted to be merged based on the criterion of FIG. 45A without calculating the cost. After the first iteration, in step 760 of FIG. 47A, the old_set is initialized with the set of merged partitions that is produced at the second iteration. Because between matches are included in the first iteration, some embodiments stop at the end of the first iteration, and other embodiments continue processing.

Exemplary pseudo-code of an embodiment for generating an index plan is shown in Table 6. The pseudo-code of Table 6 is also referred to as the partitioning pseudo-code. Index plans are generated while merging partition classes. Let $\{P\}$ be the set of partitions which is initialized with partitions that are singleton sets $\{f_i\}$ for every filter of an expression. This set of partitions $\{P\}$ changes with every iteration of the outer for loop of the partitioning pseudo-code as a result of merging partitions, and forming at least one larger partition.

The partitioning pseudo-code exits when no new merged partitions are created in an iteration of the outer for loop. In the partitioning pseudo-code, each filter $f_i$ belongs to one and only one partition $p_i$.

The partitioning pseudo-code maintains two sets of partitions called old_set and new_set. At the beginning of the outer for loop new_set is empty. At the end of the iteration new_set accumulates all the merged partitions as well as the partitions that are not merged. The new_set is then assigned to the old_set in line (22) of the partitioning pseudo-code, if progress is made, the iteration is repeated. The outer for loop iterates over the old_set. In line (0) the old_set is initialized to a set of partitions in which each individual partition is a singleton set that has a single filter, and this initial set of partitions corresponds to the initial relaxed disjunctive normal form.

Table 6 depicts an embodiment of pseudo-code that generates an index plan using partitioning. In some embodiments, the set of partitions $\{P\}$ is initialized with one singleton filters in each partition $p_i$.

TABLE 6

Pseudo-code of an embodiment that generates an index plan using partitioning

```
(0)   old_set = initial {P}
(1)   FOR p_i in old_set
(2)       temp_partition_class_set = { }
(3)       FOR p_j in {old_set \ p_i }
(4)           IF p_i and p_j are mergeable
(5)               Add p_j to temp_partition_class_set
(6)           END IF
(7)       END FOR
(8)       IF temp_partition_class_set is non-empty
(9)           FOR p_k in temp_partition_class_set
(10)              cost (p_i , p_k) = cost of index plan generated by merging p_i , p_k
(11)          END FOR
(12)          IF cost (p_i , p_k) is the least cost among all p_k 's and
                  ((old_cost − new_cost) > diff_threshold)
(13)              remove p_i , p_k from old_set and add merged (p_i , p_k) to
                  new_set
(14)          ELSE
(15)              remove p_i from old_set and add p_i to new_set
(16)          END IF
(17)      ELSE /* temp_partition_class_set is empty */
(18)          remove p_i from old_set and add p_i to new_set
(19)      END IF
(20)   END FOR /* end of outer for */
(21)   IF progress made in loop
(22)       old_set = new_set and goto line 1
(23)   END IF
```

In the pseudo-code of Table 6, for a partition $p_i$, the optimizer identifies a list of partitions that the partition $p_i$ can be merged with in lines (3) to (7). Line (3) means for partition $p_j$ in old_set, excluding partition $p_i$. In line (8), if this list of partitions is not empty, in lines (9) to (16) the optimizer determines what partition that $p_i$ is to be merged in a greedy fashion. The optimizer selects the partition that has the greatest impact on reducing cost. In other embodiments, the optimizer uses other selection criteria. In yet other embodiments, the optimizer uses other selection techniques such as dynamic programming.

After the optimizer selects a partition to merge with $p_i$, the optimizer removes the partition $p_i$ and the selected partition from the old_set and adds the merged partition which comprises the filters of $p_i$ and the selected partition to the new_set (line (13)). If no suitable partition is found for merging, then the original partition is removed from old_set and added to new_set (line (15)).

If the temp_partition_class_set is empty (else clause in line (17)), the optimizer removes the partition that could not be merged from the old_set and adds that partition to the new_set. If the optimizer determines that progress is made in the for loop, the optimizer assigns the new_set to old_set, and re-iterates.

A singleton partition contains one filter which may be a singleton filter. The index(es) that are eligible to satisfy a filter are considered to be eligible to satisfy the partition containing that filter.

A partition has at least one eligible index if at least one filter belonging to that partition has at least one eligible index. After merging partitions, if any of the partitions is a singleton partition for which there is no eligible index, the optimizer cannot generate an index plan.

A partition is considered to be covered if has at least one eligible index, and otherwise the partition is considered to be uncovered. In various embodiments, if the set of partitions has any singleton partition without any index covering that singleton partition, the optimizer attempts to merge that singleton partition with a partition class that has an index and therefore an index plan covering it. In some embodiments after the first iteration is performed, at line (1) of the partitioning pseudo-code, the optimizer selects an uncovered singleton partition to determine whether that partition can be merged with any partition that is covered. In this way, the optimizer attempts to merge all the uncovered partitions with covered partitions. If the optimizer succeeds in merging all uncovered singleton partitions, the optimizer can generate an index plan.

In some embodiments, during the first iteration when all partitions are singleton set partitions, $p_i$ and $p_j$ are merged if they form a between match based on satisfying the criterion of FIG. 45. In various embodiments, the first iteration does not make a cost based merging decision, and the cost is not calculated for the first iteration. In some embodiments, the flowchart of FIG. 46, or the pseudo-code of Table 6 are performed after the first iteration. In these embodiments, the cost based merging decision is made starting with second iteration and partitions are merged if the new cost is less than the old cost by a predefined threshold from the index plan without the merging those partitions.

Various embodiments of generating a maximal-index-satisfiable query tree will now be described.

To generate an index plan using a conventional technique, the optimizer traverses the query tree and identifies those portions of the query tree for which an index plan can be used. Various embodiments provide a maximal-index-satisfiable query tree which is a version of the query expression that contains all the index matches; and is maximal in that it does not contain any branch that does not have an index match. In some embodiments, the optimizer traverses the maximal-index-satisfiable query tree to identify those portions of the query tree for which an index plan can be generated. In this way, because the maximal-index-satisfiable query tree does not contain any branches that do not have an index match, the amount of time to process the query may be reduced.

Figure 48:
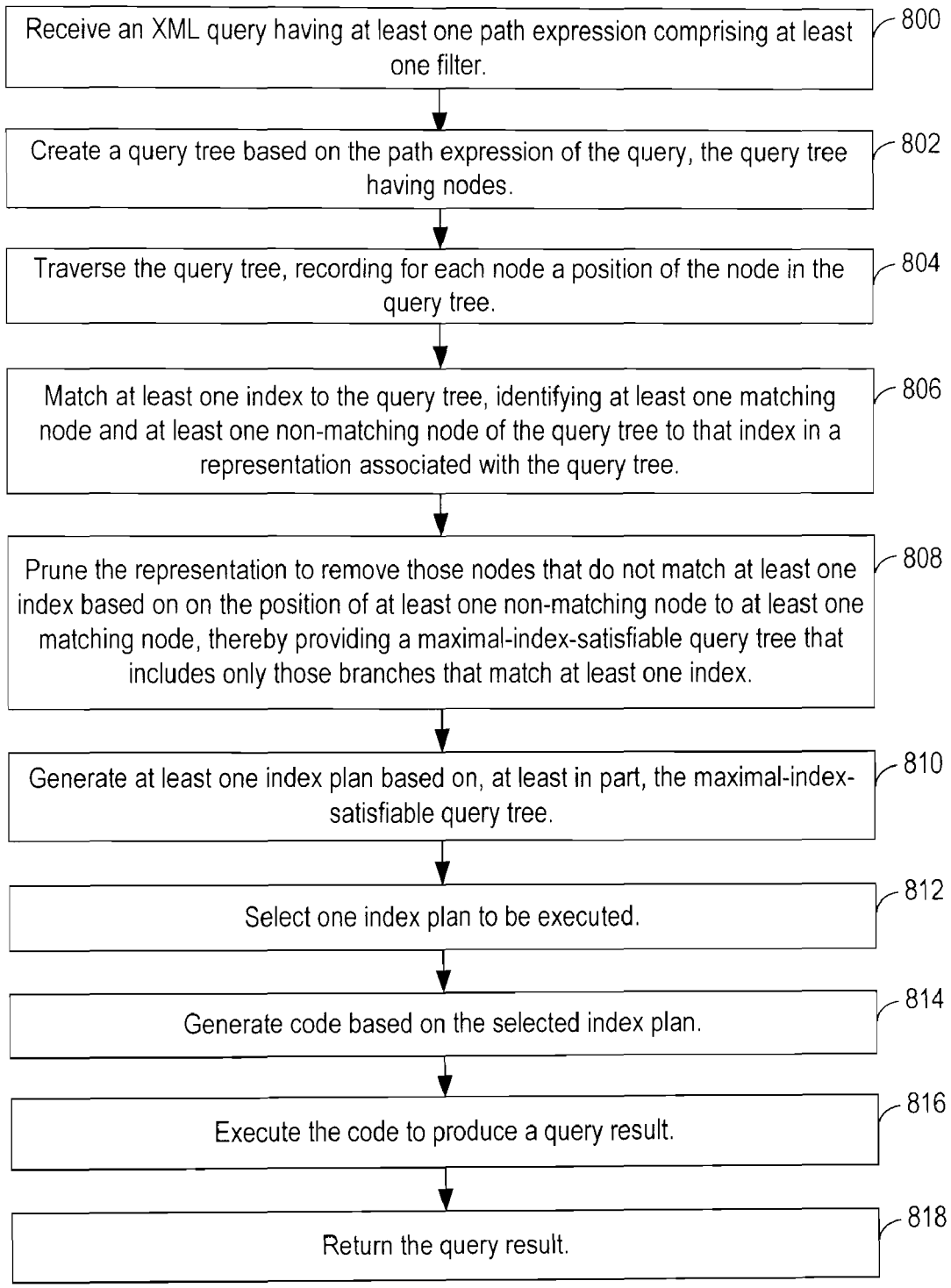
FIG. 48 depicts a flowchart of an embodiment of processing a query using a maximal-index-satisfiable query tree.

FIG. 48 depicts a flowchart of an embodiment of processing a query using the maximal-index-satisfiable query tree. In various embodiments, the flowchart of FIG. 48 is implemented in the query processor of FIG. 3.

In step 800, an XML query having at least one path expression comprising at least one filter is received.

In step 802, a query tree is generated based on the path expression of the query, the tree having nodes. In some embodiments, the query tree is a filter-less tree, in other embodiments, the query tree also comprises filters.

In step 804, the query tree is traversed, recording for each node a position of the node in the tree.

In step 806, the index matching component matches at least one index to the query tree, identifying at least one matching node and at least one non-matching node of the query tree to that index in a representation associated with the query tree.

In step 808, the index matching component prunes the representation to remove those nodes that do not match at least one index based on the position of at least one non-matching node to at least one matching node, thereby providing a maximal-index-satisfiable query tree that includes only those branches of the query tree that match at least one index.

In step 810, at least one index plan is generated based on, at least in part, the maximal-index-satisfiable query tree.

In step 812, one index plan is selected to be executed.

In step 814, code is generated based on the at least one index plan. In step 816, the code is executed to produce a query result. In step 818, the query result is returned.

FIG. 49 depicts an exemplary index expression 842. The index expression 842 is "//a//*". The index expression 842 has a wildcard "*" node 850. In the index expression 842, the "//*" refers to any descendent, for example the fifth or the one-hundredth descendant.

FIG. 50 depicts an exemplary path expression 852 of a query, which is also referred to as a query expression, and a tree representation 854 of a filter-less representation of the query expression 852. The query expression 852 is "/a/b/[self::node="abcd"]/c[self::node=10]". The filter-less tree 854 comprises an "a" node 856 and a "b" node 858. The "b" node 858 has child "self::node" node 860 that corresponds to the filter "self::node="abcd", and another child "c" node 862. The "c" node 862 has a child "self::node" 864 that corresponds to the filter "self::node=10".

In this example, the index 842 of FIG. 49 has two structural matches with the representation of the path expression 854 of FIG. 50. The two structural matches are: "/a/b/self: node" and "/a/b/c/self: node."

FIG. 51 depicts trees illustrating the structural matches 865 and 866 of the index 842 of FIG. 49 with the tree representation 854 of the query expression 852 of FIG. 50.

In various embodiments, in step 806 of FIG. 48, the representation associated with the tree is a match matrix. Various embodiments of index matching record every structural match between a node of an index expression and a node of a filter-less query expression in the match matrix.

The match matrix comprises cells which are organized into rows and columns. In the match matrix, each row corresponds to a node of an index, and each column corresponds to a node of the filter-less query tree. In an alternate embodiment of a match matrix, each column corresponds to a node of an index, and each row corresponds to a node of the filter-less query tree.

The nodes of the query expression are stored in a query-node array and the nodes of an index expression are stored in an index-node array. For a particular index node query node combination, to identify the corresponding cell of the match matrix, the query processor determines the particular index node and particular query node in the index-node and query-node arrays, respectively. The value corresponding to the position of the particular index node in the index-node array and the value corresponding to the position of the particular query node in the query-node array are used to identify the match matrix cell corresponding to that combination of the particular index node and the particular query node.

A separate match matrix is generated for each index. If multiple indexes structurally match the path expression of a query, a plurality of match matrixes are created, one match matrix for each index.

The cells of a match matrix record whether there is a match between the nodes of the filter-less query tree and the nodes of the index expression. For each node in the filter-less query tree and each node in the index expression, the match matrix records whether there is a match, a superset of a match, or no match between those nodes.

For example, an index expression "//*" matches every node of a query tree and produces a superset of nodes. In another example, using an index based on the index expression "//a//*" of FIG. 49 to satisfy the query expression of FIG. 50 also produces a superset of nodes.

FIG. 52 depicts an illustrative match matrix 870 that will be used to illustrate the structural matches between the index 842 of FIG. 49 and the path expression 852 of the query of FIG. 50. In the match matrix 870, the nodes of the path expression of the query are shown at the top of each column, the "/a" node column 872, the "/b" node column 874, the "self::node" node column 876, the "/c" node column 878, and the "self::node" 880. Illustrative nodes for the index (I) are shown at the start of each row, comprising a first level "//a" node row 882 and a second level "//*" node row 884.

Initially, the match matrix is empty. In FIG. 52, a structural match between a node of the index tree and a node of the query tree is indicated by a "T" which represents a Boolean true in a cell. An empty cell indicates no match, also referred to as a non-structural match or a non-match. In some embodiments, a Boolean false indicates that a node of the index tree does not match a node of the query tree.

Even if a query node has a structural match to an index node in a match matrix for an index, that index may not be able to be used to satisfy the query. If the query node has a filter, additional analysis is performed to determine whether that index can be used to satisfy the filter.

For example, assume that the index values of the index expression of FIG. 49 of "//*" have a data type of VARCHAR. As described above, the index has two structural matches with the paths of the query of FIG. 50. The structural matches are "/a/b/self::node" and "/a/b/c/self::node." Because the index values of the index expression have a data type of VARCHAR, only the structural match of "self::node" 860 of FIG. 50 with the filter of "(self::node="abcd")" can be satisfied by the index. Therefore, the match matrix has a non matching query node "/a/b/c/self::node" and a matching query node "/a/b/self::node". Because "/a/b/self::node" is the matching query node, in this example, the maximal match query expression is "/a/b[self::node="abcd"]".

In general a path expression or a query expression could be arbitrarily complex with an arbitrarily complex distribution of matching and non-matching nodes over various indexes. Therefore there is a need for a technique to determine a maximal-index-satisfiable query tree that is applicable to arbitrarily complex query expressions.

In various embodiments, a maximal match technique is provided which updates the match matrix to include only those branches that have index matches and to prune those branches which do not have any index matches. It is also desirable that the maximal match technique not prune query nodes having valid index matches. For example in the exemplary query above of FIG. 50, if nodes are pruned between the "c" node matching "//*" and the "b" node, then the maximal-index-satisfiable query tree and expression could not be constructed because the "b" node 858 would not be present.

For example, to update the match matrix of FIG. 52, the cells inside the region 888 are changed from true "T" to false "F". In this way, the nodes of the branch that does not have a valid index match are pruned.

In various embodiments in step 804 of FIG. 48, the maximal tree determination technique stores additional information in the query-node arrays that will be used to facilitate the determination of an ancestor-descendent relationship between query nodes. The additional information comprises the node number, the level, and the right-most-leaf node number for a node. In various embodiments, the additional information is stored during the pre-order traversal of the query tree.

The node number represents the order in which the node is visited. For example, the root node has a node number equal to zero because the root node is the first to be visited. In various embodiments, a node-number counter is maintained and used to determine the node number of the current node being visited while traversing the tree. The node-number counter is incremented with each new node that is visited.

The level has a value representing the level in the tree where the current node being visited is located. For example, the root node is at level 0. The value of the level increases with respect to the distance of the current node being visited from the root node. The value of the level increases while traversing down the tree following child pointers. The value of the level decreases while traversing up the tree following parent pointers.

The value of the right-most-leaf node number represents the right most leaf node of the sub-tree rooted at the current node being visited. In various embodiments, the right-most-leaf node number is stored while traversing up the parent pointer having visited each node in a sub-tree or when traversing sideways, at the same level, indicating that all nodes in the left sub-tree are visited.

In a maximal tree determination technique, a node m is determined to be an ancestor of node n, if m is visited before m. A node m is determined to be an ancestor of node n, if m's node number is lower than n's node number, and if the node number of the right-most leaf of the tree rooted at m is greater than or equal to the node number of the right-most leaf of the tree rooted at n.

Figure 53A:
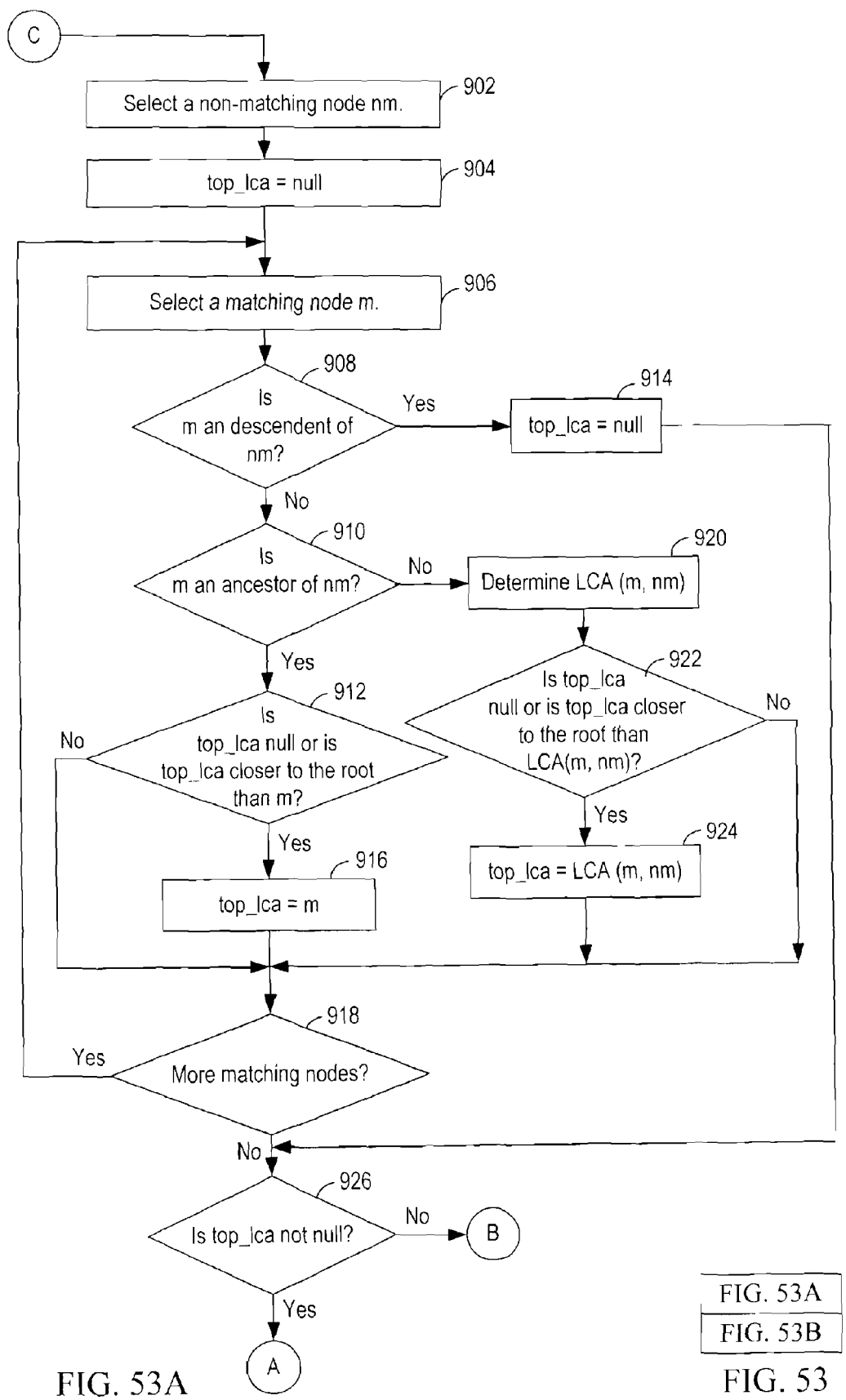
FIG. 53 comprises FIGS. 53A and 53B which collectively depict a flowchart of an embodiment of generating a maximal-index-satisfiable query tree.
Figure 53B:
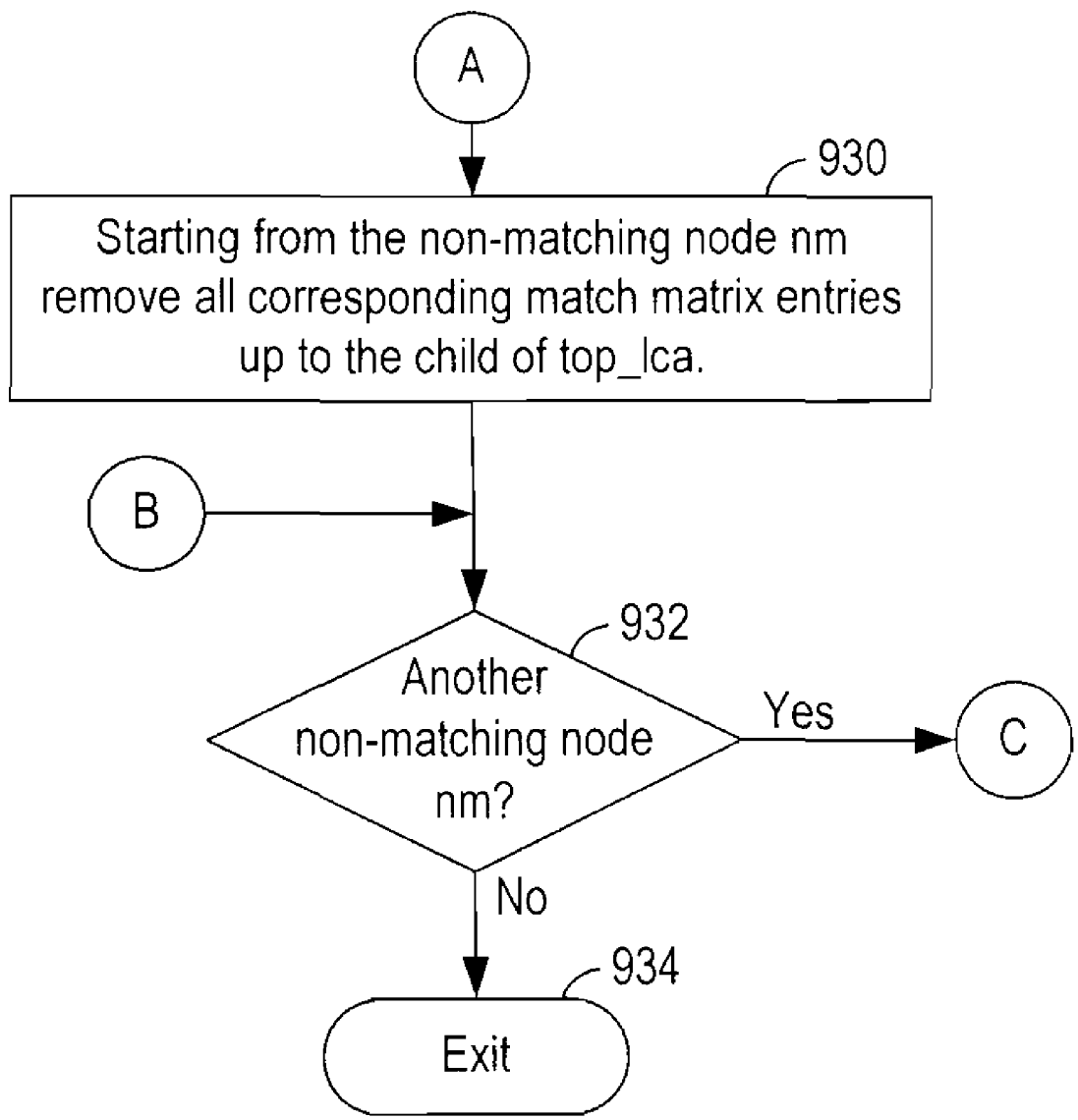

FIG. 53 comprises FIGS. 53A and 53B which collectively depict a flowchart of an embodiment of generating a maximal-index-satisfiable query tree. In various embodiments, the flowchart of FIG. 53 is implemented in step 808 of FIG. 48. Because each index has its own match matrix with its own set of matching and not matching query nodes, the flowchart of FIG. 53 is performed for every index.

In step 902, a non-matching node, nm, is selected. The non-matching node is one of the nodes of the query tree. The non-matching node nm is selected based on the match matrix indicating that there is no structural match for that node.

In step 904, top_lca is set equal to null. In step 906, a matching node m is selected. The matching node is one of the nodes of the query tree. The matching node m is selected based on the match matrix indicating that there is a structural match for that node.

Step 908 determines whether m is a descendent of nm. If not, step 910 determines whether m is an ancestor of nm. If so, step 910 proceeds to step 912.

In response to step 908 determining that m is a descendent of nm, in step 914, top_lca is set equal to null, and step 914 proceeds to step 926.

Step 912 determines whether top_lca is null or if top_lca is closer to the root than m. If so, in step 916, top_lca is set equal to m, and proceeds to step 918. In response to step determining that top_lca is not null and that top_lca is not closer to the root than m, step 912 proceeds to step 918.

Step 918 determines whether there are more matching nodes. If so, step 918 proceeds to step 906.

In response to step 910 determining that m is not an ancestor of nm, in step 920, the least common ancestor of m and nm (LCA(m, nm)) is determined. Step 922 determines whether top_lca is null or if the top_lca is closer to the root than LCA(m, nm) which is computed in step 920. If so, in step 924, top_lca is set equal to the LCA (m, nm), and step 924 proceeds to step 918.

In response to step 922 determining that top_lca is not null or that the top_lca is not closer to the root than the LCA(m, nm), step 922 proceeds to step 918.

In response to step 918 determining that there are no more matching nodes to analyze, step 926 determines whether top_lca is not null. In response to step 926 determining that top_lca is not null, step 926 proceeds via Continuator A to step 930 of FIG. 53B.

In response to step 926 determining that top_lca is null, step 926 proceeds via Continuator B to step 932 of FIG. 53B.

In step 930 of FIG. 53B, starting from the non-matching node nm, all corresponding match matrix entries up to the child of top_lca are removed. In various embodiments, the cells corresponding to the non-matching node nm to the cell corresponding to the child of the top_lca of the match matrix are set to null, or alternately, a Boolean false.

Step 932 determines whether there is another non-matching node mn. If so, step 932 proceeds via Continuator C to step 902 of FIG. 53A. In response to step 932 determining that there is not another non-matching node nm, in step 934, the flowchart exits.

Pseudo-code of an embodiment of generating a maximal-index-satisfiable query tree that is satisfiable by at least one index based on the relative position of a non-matching node with respect to all the matching nodes of the query tree is shown below in Table 7. In some embodiments, the pseudo-code of Table 7 is implemented in step 808 of FIG. 48.

TABLE 7

Pseudo-code of an embodiment of generating a maximal-index-satisfiable query tree

| | |
|---|---|
| (1) | FOR each non-matching node nm |
| (2) |    top_lca = null |
| (3) |    FOR each matching node m |
| (4) |       IF m is below nm /* m is a descendent of nm */ |
| (5) |          top_lca = null |
| (6) |          break |
| (7) |       END IF |
| (8) |       IF m is above nm /* m is an ancestor of nm */ |
| (9) |          IF top_lca is null or top_lca's level is lower than m's level |
| (10) |             top_lca = m |
| (11) |       END IF |
| (12) |       ELSE /* else of if m is above m */ |
| (13) |          compute lca (m, nm). |
| (14) |          IF top_lca is null or top_lca is closer to the root than lca(m, nm) |
| (15) |             top_lca = lca (m, nm) |
| (16) |          END IF |
| (17) |       END IF /* end of else */ |
| (18) |    END FOR /* end of for each matching node m */ |
| (19) |    IF top_lca is not null |
| (20) |       starting from the non-matching node nm, |
| (21) |       go up to the child of top_lca and remove all corresponding match matrix entries |
| (22) |    END IF |
| (23) | END FOR /* end of for every matching node m */ |

In some embodiments, because each index has its own match matrix indicating matching and not matching query nodes, the pseudo-code of Table 7 is executed for each index.

In line (4) of the pseudo-code of Table 7, if the non-matching query node lies on a path between a matching query node and the root of the query tree, the non-matching query node is not removed.

The pseudo-code of Table 7 determines how many, if any, nodes can be removed based on Eq. 11 below. Eq. 11 determines the lowest least common ancestor (LCA) between a non-matching node nm, and all matching nodes m, as follows:

$$lca_k = \max_k \{level\ (lca_k) \mid lca_k = LCA(nm, m_k)\} \quad \text{(Eq. 11)}$$

where $nm$ = non-matching node and $m_k = k^{th}$ matching node.

Given a non-matching node nm, the LCA of node nm is determined with respect to every matching node $m_k$, and the node having the highest value of the level, which is the node that is farthest from the root is chosen as the least common ancestor of nodes nm and $m_k$. This LCA determination is performed in lines (3) to (18) of the pseudo-code of Table 7. Nodes are removed starting from the non-matching node nm up to and including the child node of the LCA node. In this way, the match matrix, and therefore, a version of the query tree, is pruned.

In line (4), the pseudo-code of Table 7 determines whether the matching node m is above the non-matching node nm. If so, the non-matching node is removed because that non-matching node lies on a path from the matching node to the root. The variable top_lca is used to store the computed value of the LCA in Eq. 11. Since in this case, no branches can be pruned, top_lca is set to null and the pseudo-code breaks out of the inner for loop.

In line (8), the pseudo-code of Table 7 determines whether the matching node is an ancestor of the non-matching node. If so, the LCA (m, nm)=m.

In line (9), the pseudo-code of Table 7 determines whether an LCA has been calculated. If not, the LCA is null and the LCA is set to m. If the pseudo-code of Table 7 has already determined a current node up to which branches can be pruned, in this case the top_lca is not null, the pseudo-code of Table 7 determines compares the levels to determine the least common ancestor (lca) with the maximum level.

If the current lca has a level that is higher than the already computed lca, in line (10), the pseudo-code of Table 7 updates the current lca.

The else clause starting in line (12) is reached if m is neither an ancestor nor a descendent of the non-matching node nm. Therefore, the LCA is determined in line (13).

In line (14), the pseudo-code of Table 7 determines whether a top_lca is null or if the top_lca is closer to the root than lca(m, nm). If so, in line (15), the pseudo-code of Table 7 updates the top_lca.

After processing all matching nodes, the expression of Eq. 11 is computed, and the pseudo-code determines whether the result of Eq. 11 is a non-null top_lca. If a non-null top_lca is computed, in lines (19) to (22), the pseudo-code removes all the matches from non-matching node nm up to the child of top_lca from the match matrix.

Various embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, various embodiments of the invention can take the form of a computer program product accessible from a computer usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital video disk (DVD).

Figure 54:
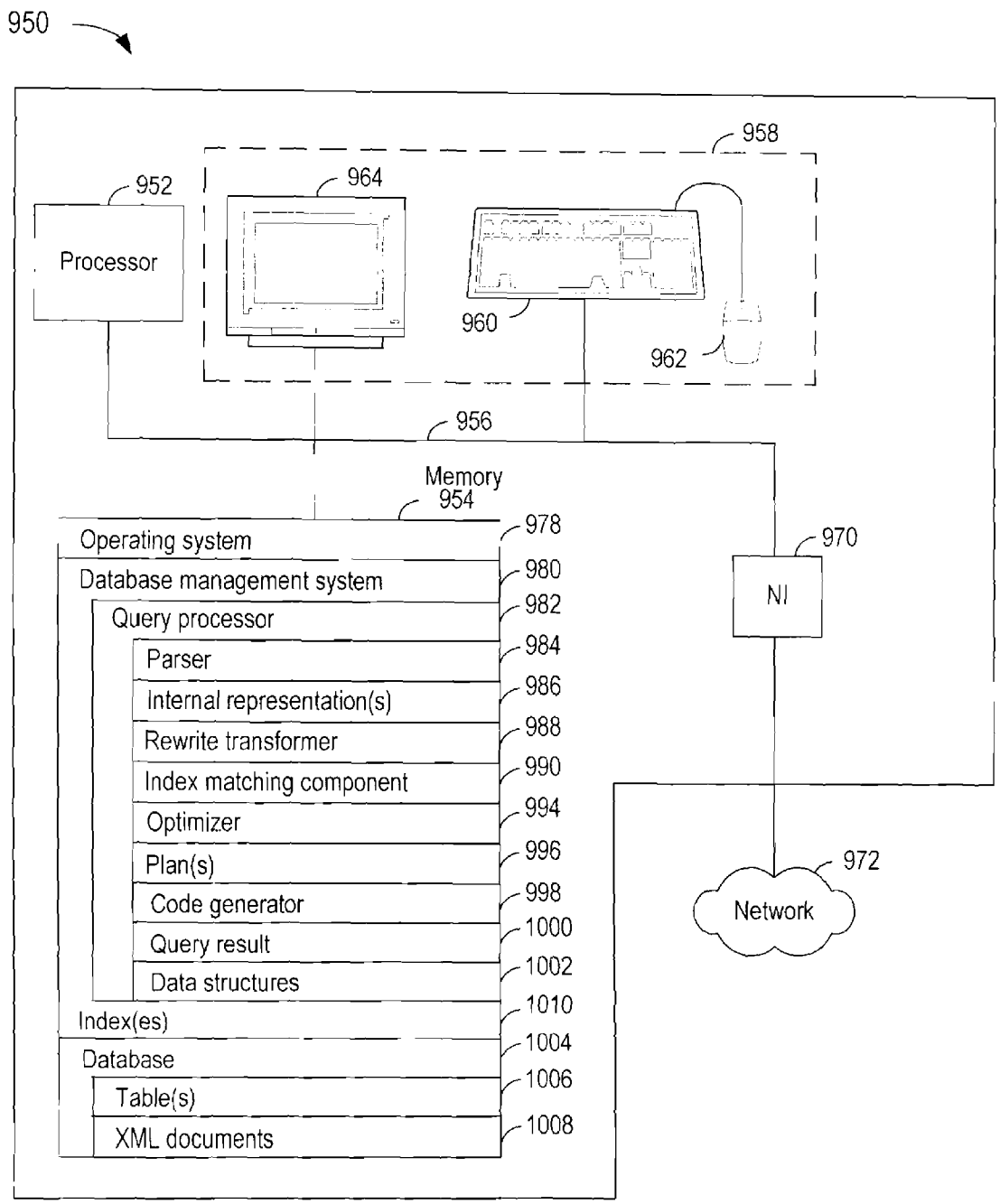
FIG. 54 depicts an illustrative data processing system which uses various embodiments of the present invention.

FIG. 54 depicts an illustrative data processing system 950 which uses various embodiments of the present invention. The data processing system 950 suitable for storing and/or executing program code will include at least one processor 952 coupled directly or indirectly to memory elements 954 through a system bus 956. The memory elements 954 can include local memory employed during actual execution of the program code, bulk storage, and cache memories which provide temporary storage of at least some program code in order to reduce the number of times code is retrieved from bulk storage during execution.

Input/output or I/O devices 958 (including but not limited to, for example, a keyboard 960, pointing device such as a mouse 962, a display 964, a printer, etc.) can be coupled to the system bus 956 either directly or through intervening I/O controllers.

Network adapters, such as a network interface (NI) 970, may also be coupled to the system bus 956 to enable the data processing system to become coupled to other data processing systems or remote printers or storage devices through intervening private or public networks 972. Modems, cable modem and Ethernet cards are just a few of the currently available types of network adapters. The network adapter may be coupled to the network via a network transmission line, for example twisted pair, coaxial cable or fiber optic cable, or a wireless interface that uses a wireless transmission medium. In addition, the software in which various embodiments are implemented may be accessible through the transmission medium, for example, from a server over the network.

The memory elements 954 store an operating system 978, database management system 980, and database 1004. The database management system 980 has a query processor 982 and one or more indexes 1010. In various embodiments, the indexes 1010 comprise at least one XML index. In some embodiments, the indexes comprise at least one non-XML index. The query processor 982 comprises a parser 984, internal representation(s) 986, rewrite transformer 988, index matching component 990, optimizer 994, plans(s) 996, code generator 998, and query result 1000. The plans(s) 996 comprise at least one index plan. In some embodiments, the internal representation(s) 986 comprises a query graph model and a query tree. In some embodiments, the memory elements 954 store data structures 1002 comprising at least one of: a query tree, a filter-less query tree, a mapping structure, index-match structures, between tuples, a list of matched between tuples, a list of unmatched between tuples, a filterset, partitions and match matrixes. In various embodiments, the memory elements 954 store index plan(s) 1012.

In various embodiments, the database 1004 comprises one or more tables 1006. In some embodiments, at least one table comprises XML documents. In various embodiments, at least one table does not comprise any XML documents. In some embodiments, the database 1004 is a native XML database that comprises XML documents. In various embodiments, the database management system is the IBM DB2 database management system. However, the invention is not meant to be limited to the DB2 database management system, and in other embodiments, the invention may be used in other database management systems.

The operating system 978 may be implemented by any conventional operating system such as z/OS® (Registered Trademark of International Business Machines Corporation), MVS® (Registered Trademark of International Business Machines Corporation), OS/390® (Registered Trademark of International Business Machines Corporation), AIX® (Registered Trademark of International Business Machines Corporation), UNIX® (UNIX is a registered trademark of the Open Group in the United States and other countries), WINDOWS® (Registered Trademark of Microsoft Corporation), LINUX® (Registered trademark of Linus Torvalds), Solaris® (Registered trademark of Sun Microsystems Inc.) and HP-UX® (Registered trademark of Hewlett-Packard Development Company, L.P.).

The exemplary data processing system 950 that is illustrated in FIG. 54 is not intended to limit the present invention. Other alternative hardware environments may be used without departing from the scope of the present invention.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-implemented method comprising:
   receiving a query of a database, said query having an expression, said expression comprising a plurality of filters, said expression comprising at least one AND operator and at least one OR operator connecting said plurality of filters;
   providing a tree representing said expression, said tree comprising a plurality of nodes, said at least one AND operator being associated with at least one AND node of said plurality of nodes, respectively; said at least one OR operator being associated with at least one OR node of said plurality of nodes, respectively;
   matching at least one index to at least a portion of said expression, wherein said matching identifies at least one eligible index to satisfy a particular filter of said plurality of filters;
   creating a partition set comprising a plurality of partitions, each partition of said plurality of partitions comprising at least one filter of said plurality of filters;
   merging one partition of said partition set with another partition of said partition set based on a determination that a filter of said one partition and a filter of said another partition have a least common ancestor that is an AND node of said plurality of nodes, wherein said merging reduces a number of said plurality of partitions of said partition set; and
   generating an index plan based on, at least in part, said at least one eligible index and a particular partition of said partition set, said particular partition comprising said particular filter.

2. The method of claim 1 wherein said query is a mark-up language query, said database is a mark-up language database, and said expression is a path expression.

3. The method of claim 1 wherein a first node of said plurality of nodes is associated with said filter of said one partition, wherein a first path is from said first node to said least common ancestor; wherein a second node of said plurality of nodes is associated with said filter of said another partition, wherein a second path is from said second node to said least common ancestor; wherein said merging comprises:
   determining that said one partition is to be merged with said another partition based on said first path comprising at least one of an OR node and another AND node, and said second path comprising at least one of another OR node and a different AND node.

4. The method of claim 1 wherein each filter of said plurality of filters belongs to only one partition of said plurality of partitions.

5. The method of claim 1, further comprising:
   repeating said merging until said partition set comprises one partition.

6. The method of claim 1 further comprising:
   repeating said merging until at least one partition of said partition set cannot be merged with any other partition of said partition set based on each filter of said at least one partition not having a least common ancestor that is an AND node with each filter of said any other partition.

7. The method of claim 1 wherein said merging further comprises:
   determining a cost of merging said one partition with at least one other partition of said plurality of partitions,
   wherein said one partition is merged with said another partition based on said cost.

8. The method of claim 7 further comprising:
   repeating said merging until a difference in said cost of merging said one partition and a previous cost of merging said one partition is less than a threshold value.

9. The method of claim 7 further comprising:
   repeating said merging until said cost of merging said one partition is greater than a previous cost of merging said one partition.

10. A computer program product comprising a computer readable storage medium having computer readable program code embodied therewith, said computer readable program code comprising:
    computer readable program code configured to receive a query of a mark-up language (ML) database, said query having a path expression, said path expression comprising a plurality of filters, said path expression comprising at least one AND operator and at least one OR operator connecting said plurality of filters;
    computer readable program code configured to provide a tree representing said path expression, said tree comprising a plurality of nodes, said at least one AND operator being associated with at least one AND node of said plurality of nodes, respectively; said at least one OR operator being associated with at least one OR node of said plurality of nodes, respectively;
    computer readable program code configured to match at least one ML index to at least a portion of said path expression, wherein said computer readable program code configured to match identifies at least one eligible index to satisfy a particular filter of said plurality of filters;

computer readable program code configured to create a partition set comprising a plurality of partitions, each partition of said plurality of partitions comprising at least one filter of said plurality of filters;

computer readable program code configured to merge one partition of said partition set with another partition of said partition set based on a determination that a filter of said one partition and a filter of said another partition have a least common ancestor that is an AND node of said plurality of nodes, wherein said computer readable program code configured to merge reduces a number of said plurality of partitions of said partition set; and computer readable program code configured to generate an index plan based on, at least in part, said at least one eligible index and a particular partition of said partition set, said particular partition comprising said particular filter.

11. The computer program product of claim 10, further comprising:

computer readable program code configured to repeat said computer readable program code configured to merge until said partition set comprises one partition.

12. The computer program product of claim 10, further comprising:

computer readable program code configured to repeat said computer readable program code configured to merge until at least one partition of said partition set cannot be merged with any other partition of said partition set based on each filter of said at least one partition not having a least common ancestor that is an AND node with each filter of said any other partition.

13. The computer program product of claim 10 wherein a partition of said partition set that does not comprise any filter that has any eligible index is merged with said particular partition.

14. A computer-implemented method comprising:

receiving a query of a database comprising a plurality of mark-up language documents, said query having an expression comprising at least one filter;

creating a tree based on said expression, said tree comprising a plurality of nodes;

matching an index to said tree, wherein a plurality of matching nodes and a plurality of non-matching nodes of said tree to said index are identified, wherein said plurality of matching nodes indicate structural matches between said index and said tree;

pruning a representation of said tree to remove at least one particular matching node of said plurality of matching nodes, wherein said at least one filter comprises a particular filter, wherein said index does not satisfy said particular filter, said at least one particular matching node being associated with said particular filter, said pruning being based on a position of said at least one particular matching node in said tree and a position of another matching node of said plurality of matching nodes in said tree; and generating at least one index plan based on, at least in part, said pruned representation of said tree.

15. The method of claim 14 further comprising:
traversing said tree; and
recording positions of said plurality of nodes, wherein said positions indicate levels of said plurality of nodes in said query tree; and storing an order in which each node of said plurality of nodes is visited using a right-most-node number of a right-most leaf of a sub-tree rooted at said each node.

16. The method of claim 14 wherein said representation comprises at least one match matrix, each match matrix being associated with a distinct index, each match matrix having cells, each cell corresponding to a node of said index and a node of said expression, said cell corresponding to a node of said index that is matched to a node of said expression having a match indication.

17. The method of claim 16 wherein said pruning comprises setting, in said each match matrix, said match indication associated with said at least one particular matching node to a non-match indication.

18. A computer program product comprising a computer readable storage medium having computer readable program code embodied therewith, said computer readable program code comprising:

computer readable program code configured to receive a query of a database comprising a plurality of mark-up language documents, said query having a path expression comprising at least one filter;

computer readable program code configured to create a tree based on said path expression, said tree comprising a plurality of nodes;

computer readable program code configured to match an index to said tree, wherein a plurality of matching nodes and a plurality of non-matching nodes of said tree to said index are identified, wherein said plurality of matching nodes indicate structural matches between said index and said tree;

computer readable program code configured to prune a representation of said tree to remove at least one particular matching node of said plurality of matching nodes, wherein said at least one filter comprises a particular filter, wherein said index does not satisfy said particular filter, said pruning being based on a position of said at least one particular matching node in said tree and a position of another matching node of said plurality of matching nodes in said tree; and computer readable program code configured to generate at least one index plan based on, at least in part, said pruned representation of said tree.

19. The computer program product of claim 18 further comprising:

computer readable program code configured to traverse said tree;

computer readable program code to record positions of said plurality of nodes, wherein said positions indicate levels of said plurality of nodes in said query tree; and computer readable program code configured to store an order in which a node is visited using a right-most-node number of a right-most leaf of a sub-tree rooted at said node.

20. The computer program product of claim 18 wherein said representation comprises at least one match matrix, each match matrix being associated with a distinct index, each match matrix having cells, each cell corresponding to a node of said index and a node of said path expression, said cell corresponding to a node of said index that is matched to a node of said path expression having a match indication.

21. A data processing system comprising:
a processor; and
a memory storing instructions, said instructions being executable by said processor, said instructions comprising:
  instructions that receive a query of a database, said query having an expression, said expression comprising a plurality of filters, said expression comprising at least one AND operator and at least one OR operator connecting said plurality of filters;
  instructions that provide a tree representing said expression, said tree comprising a plurality of nodes, said at least one AND operator being associated with at least one AND node of said plurality of nodes, respectively; said at least one OR operator being associated with at least one OR node of said plurality of nodes, respectively;
  instructions that match at least one index to at least a portion of said expression, wherein said instructions that match identify at least one eligible index to satisfy a particular filter of said plurality of filters;
  instructions that create a partition set comprising a plurality of partitions, each partition of said plurality of partitions comprising at least one filter of said plurality of filters;
  instructions that merge one partition of said partition set with another partition of said partition set based on a determination that a filter of said one partition and a filter of said another partition have a least common ancestor that is an AND node of said plurality of nodes, wherein said instructions that merge reduce a number of said plurality of partitions of said partition set; and
  instructions that generate an index plan based on, at least in part, said at least one eligible index and a particular partition of said partition set, said particular partition comprising said particular filter.

* * * * *